US012799235B2

(12) United States Patent
Figueroa et al.

(10) Patent No.: US 12,799,235 B2
(45) **Date of Patent: *Nov. 17, 2026**

(54) BIPHENYLPHENOL POLYMERIZATION CATALYSTS

(71) Applicant: Dow Global Technologies LLC, Midland, MI (US)

(72) Inventors: Ruth Figueroa, Midland, MI (US); Angela I. Padilla-Acevedo, Lake Jackson, TX (US); Andrew J. Young, Houston, TX (US); Roger L. Kuhlman, Lake Jackson, TX (US); Susan Brown, Pearland, TX (US); Matthew E. Belowich, Midland, MI (US); David R. Neithamer, Midland, MI (US); Jerzy Klosin, Midland, MI (US); David M. Pearson, Lake Jackson, TX (US); Leslie E. O'Leary, Sugar Land, TX (US); Mari S. Rosen, Midland, MI (US); Joseph F. DeWilde, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 573 days.

This patent is subject to a terminal disclaimer.

(21) Appl. No.: 18/277,331

(22) PCT Filed: Feb. 10, 2022

(86) PCT No.: PCT/US2022/015918

§ 371 (c)(1),
(2) Date: Aug. 15, 2023

(87) PCT Pub. No.: WO2022/173905

PCT Pub. Date: Aug. 18, 2022

(65) Prior Publication Data

US 2024/0150502 A1 May 9, 2024

Related U.S. Application Data

(60) Provisional application No. 63/149,497, filed on Feb. 15, 2021.

(51) Int. Cl.

| | |
|---|---|
| ***C08F 4/62*** | (2006.01) |
| ***C08F 4/02*** | (2006.01) |
| ***C08F 4/64*** | (2006.01) |
| ***C08F 4/642*** | (2006.01) |
| ***C08F 4/659*** | (2006.01) |
| ***C08F 210/02*** | (2006.01) |

(52) U.S. Cl.

CPC .......... *C08F 4/62193* (2013.01); *C08F 4/025* (2013.01); *C08F 4/64193* (2013.01); *C08F 4/6428* (2013.01); *C08F 4/65912* (2013.01); *C08F 4/65916* (2013.01); *C08F 210/02* (2013.01)

(58) Field of Classification Search

None

See application file for complete search history.

(56) References Cited

U.S. PATENT DOCUMENTS

| | | | | |
|---|---|---|---|---|
| 8,067,511 | B2 | 11/2011 | Shin et al. | |
| 8,088,704 | B2 | 1/2012 | Kolb et al. | |
| 8,586,497 | B2 | 11/2013 | Kolb et al. | |
| 8,835,577 | B2 | 9/2014 | Rix et al. | |
| 9,234,060 | B2 | 1/2016 | Kao et al. | |
| 10,195,589 | B2 | 2/2019 | Faler et al. | |
| 11,041,027 | B2 | 6/2021 | Figueroa et al. | |
| 12,338,301 | B2 | 6/2025 | Young et al. | |
| 12,428,504 | B2 * | 9/2025 | Padilla-Acevedo | .... C08F 10/02 |
| 2015/0344601 | A1 | 12/2015 | Demirors et al. | |
| 2022/0411546 | A1 | 12/2022 | Young et al. | |

FOREIGN PATENT DOCUMENTS

| | | | | |
|---|---|---|---|---|
| WO | WO-2014105413 | A1 * | 7/2014 | ............ C08F 210/16 |
| WO | WO-2018170208 | A1 * | 9/2018 | ............ C08F 210/16 |
| WO | 2019123028 | A1 | 6/2019 | |
| WO | WO-2021242792 | A1 * | 12/2021 | ............ C08F 210/16 |

OTHER PUBLICATIONS

International Preliminary Report on Patentability for related PCT Application PCT/US2022/015918, mailed Aug. 24, 2023 (11 pgs).

* cited by examiner

*Primary Examiner* — Richard A. Huhn

(57) ABSTRACT

Embodiments are directed towards a use of a supported biphenylphenol polymerization catalyst to make a polymer via a slurry-phase polymerization process, where the supported biphenylphenol polymerization catalyst is made from a biphenylphenol polymerization precatalyst of Formula I.

4 Claims, No Drawings

BIPHENYLPHENOL POLYMERIZATION CATALYSTS

This application is a National Stage Application under 35 U.S.C. § 371 of International Application Number PCT/US2022/015918, filed Feb. 10, 2022, and published as WO 2022/173905 on Aug. 18, 2022, which claims the benefit to U.S. Provisional Application 63/149,497, filed Feb. 15, 2021, the entire contents of which are incorporated herein by reference in its entirety.

FIELD OF DISCLOSURE

Embodiments of the present disclosure are directed towards biphenylphenol polymerization catalysts, more specifically, biphenylphenol polymerization catalysts that may be utilized to make a polymer via a slurry-phase polymerization process.

BACKGROUND

Polymers may be utilized for a number of products including as films, fibers, nonwoven and/or woven fabrics, extruded articles, and/or molded articles, among others. Polymers can be made by reacting one or more types of monomer in a polymerization reaction in the presence of a polymerization catalyst.

SUMMARY

The present disclosure provides various embodiments, including:

A use of a supported biphenylphenol polymerization catalyst to make a polymer via a slurry-phase polymerization process, where the supported biphenylphenol polymerization catalyst is made from a biphenylphenol polymerization precatalyst of Formula I:

(Formula I)

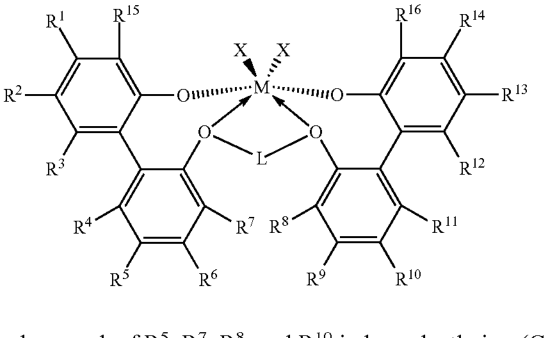

where each of $R^5$, $R^7$, $R^8$, and $R^{10}$ independently is a ($C_1$ to $C_{20}$)alkyl, aryl, aralkyl, halogen, or a hydrogen; where each of $R^4$ and $R^{11}$ independently is a halogen or a hydrogen; where each of $R^2$ and $R^{13}$ independently is a ($C_1$ to $C_{20}$)alkyl, aryl or aralkyl or a hydrogen; where each of $R^{15}$ and $R^{16}$ independently is a 2,7-disubstituted carbazol-9-yl or a 3,6-disubstituted carbazol-9-yl; where L is a $C_3$ alkylene or $C_4$ alkylene that forms a bridge between the two oxygen atoms to which L is covalently bonded; where each of $R^1$, $R^3$, $R^{12}$, and $R^{14}$ independently is a ($C_1$-$C_8$)alkyl, halogen, or a hydrogen; where each of $R^6$ and $R^9$ is a hydrogen, ($C_1$-$C_8$) alkyl, or halogen optionally, $R^6$ can be linked with $R^7$ and $R^8$ can be linked to $R^9$ to form a cyclic structure; where each X independently is a halogen, a hydrogen, a ($C_1$-$C_{20}$)alkyl, a ($C_7$-$C_{20}$)aralkyl, a ($C_1$-$C_6$)alkyl-substituted ($C_6$-$C_{12}$)aryl, or a ($C_1$-$C_6$)alkyl-substituted benzyl, —$CH_2Si(R^C)_3$, where $R^C$ is ($C_1$-$C_{12}$)hydrocarbon; and where M is zirconium (Zr) or hafnium (Hf).

DETAILED DESCRIPTION

A supported biphenylphenol polymerization catalyst which can be used make a polymer via a slurry-phase polymerization process is made from a biphenylphenol polymerization precatalyst of Formula I:

(Formula I)

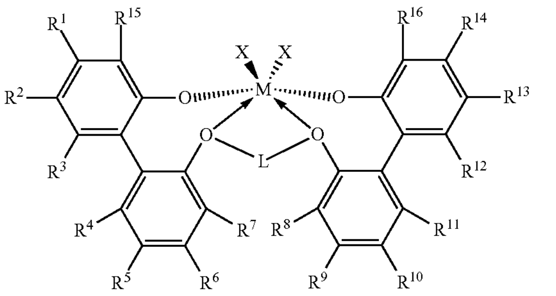

where each of $R^5$, $R^7$, $R^8$, and $R^{10}$ independently is a ($C_1$ to $C_{20}$)alkyl, aryl, aralkyl, halogen, or a hydrogen; where each of $R^4$ and $R^{11}$ independently is a halogen or a hydrogen; where each of $R^2$ and $R^{13}$ independently is a ($C_1$ to $C_{20}$)alkyl, aryl or aralkyl or a hydrogen; where each of $R^{15}$ and $R^{16}$ independently is a 2,7-disubstituted carbazol-9-yl or a 3,6-disubstituted carbazol-9-yl; where L is a $C_3$ alkylene or $C_4$ alkylene that forms a bridge between the two oxygen atoms to which L is covalently bonded; where each of $R^1$, $R^3$, $R^{12}$, and $R^{14}$ independently is a ($C_1$-$C_8$)alkyl, halogen, or a hydrogen; where each of $R^6$ and $R^9$ is a hydrogen, ($C_1$-$C_8$) alkyl, or halogen optionally, $R^6$ can be linked with $R^7$ and $R^8$ can be linked to $R^9$ to form a cyclic structure; where each X independently is a halogen, a hydrogen, a ($C_1$-$C_{20}$)alkyl, a ($C_7$-$C_{20}$)aralkyl, a ($C_1$-$C_6$)alkyl-substituted ($C_6$-$C_{12}$)aryl, or a ($C_1$-$C_6$)alkyl-substituted benzyl, —$CH_2Si(R^C)_3$, where $R^C$ is ($C_1$-$C_{12}$)hydrocarbon; and where M is Zr or Hf.

The biphenylphenol polymerization precatalyst represented by the Formula I (i.e., the biphenylphenol polymerization precatalyst), as described herein, may be utilized to make a biphenylphenol polymerization catalysts. For instance, the biphenylphenol polymerization precatalyst represent by the Formula I may be contacted, under activating conditions, with an activator so as to activate the biphenylphenol polymerization precatalyst represent by the Formula I, thereby making the biphenylphenol polymerization catalyst.

As mentioned, each of $R^5$, $R^7$, $R^8$, and $R^{10}$, as shown in Formula I, can independently be a ($C_1$ to $C_{20}$)alkyl, aryl, aralkyl, halogen, or a hydrogen. One or more embodiments provide that at least one of $R^5$, $R^7$, $R^8$, and $R^{10}$ is a halogen such as fluorine. One or more embodiments provide that each of $R^5$, $R^7$, $R^8$, and $R^{10}$ is a halogen such as fluorine. One or more embodiments provide that each of $R^5$ and $R^{10}$ is a halogen such as fluorine. One or more embodiments provide that each of $R^5$ and $R^{10}$ is chlorine. One or more embodiments provide that each of $R^5$ and $R^{10}$ is a methyl. One or more embodiments provide that at least one of $R^5$ and $R^{10}$ is an alkyl- or aryl-substituted silyl. One or more embodiments provide that each of $R^5$ and $R^{10}$ is a di-alkyl or tri-alkyl substituted silyl. One or more embodiments provide that each of $R^5$ and $R^{10}$ is an octyl dimethyl silyl.

One or more embodiments provide that each of $R^7$ and $R^8$ is independently a hydrogen or a methyl. One or more embodiments provide that at least one of $R^7$ and $R^8$ is a hydrogen. One or more embodiments provide that each of $R^7$ and $R^8$ is a hydrogen. One or more embodiments provide that at least one of $R^7$ and $R^8$ is a $C_1$ alkyl, e.g. methyl. One or more embodiments provide that each of $R^7$ and $R^8$ is a methyl.

One or more embodiments provide that each of $R^1$, $R^3$, $R^{12}$, and $R^{14}$ independently is a $(C_1\text{-}C_8)$alkyl, halogen, or a hydrogen. One or more embodiments provide that at least one of $R^1$, $R^3$, $R^{12}$, and $R^{14}$ is a hydrogen. One or more embodiments provide that each of $R^1$, $R^3$, $R^{12}$, and $R^{14}$ is a hydrogen.

One or more embodiments provide that each of $R^6$ and $R^9$ is a hydrogen, $(C_1\text{-}C_8)$alkyl, or halogen such as fluorine optionally, $R^6$ can be linked with $R^7$ and $R^8$ can be linked to $R^9$ to form a cyclic structure. One or more embodiments provide that each of $R^6$ and $R^9$ is a hydrogen or a halogen such as fluorine. One or more embodiments provide that each of $R^6$ and $R^9$ is a hydrogen. One or more embodiments provide that each of $R^6$ and $R^9$ is a halogen such as fluorine. One or more embodiments provide that $R^6$ can be linked with $R^7$ and $R^8$ can be linked to $R^9$ to form a cyclic structure.

As used herein, an "alkyl" includes linear, branched and cyclic paraffin radicals that are deficient by one hydrogen. Thus, for example, a $CH_3$ group ("methyl") and a $CH_3CH_2$ group ("ethyl") are examples of alkyls.

As used herein, "aryl" includes phenyl, naphthyl, pyridyl and other radicals whose molecules have the ring structure characteristic of benzene, naphthylene, phenanthrene, anthracene, etc. It is understood that an "aryl" can be a $C_6$ to $C_{20}$ aryl. For example, a $C_6H_5$—aromatic structure is a "phenyl", a $C_6H_4$—aromatic structure is a "phenylene." As used herein, an "aralkyl," which can also be called an "arylalkyl," is an alkyl having an aryl pendant therefrom. It is understood that an aralkyl can be a $C_7$ to $C_{20}$ aralkyl. An "alkylaryl" is an aryl having one or more alkyls pendant therefrom. As used herein, a "hydrocarbyl" includes aliphatic, cyclic, olefinic, acetylenic and aromatic radicals (i.e., hydrocarbon radicals) comprising hydrogen and carbon that are deficient by one hydrogen.

As mentioned, each of $R^4$ and $R^{11}$ as shown in Formula I, can independently be a hydrogen or a halogen such as fluorine. For instance, one or more embodiments provide that each of $R^4$ and $R^{11}$ is a hydrogen. One or more embodiments provide that each of $R^4$ and $R^{11}$ is fluorine.

As mentioned, each of $R^2$ and $R^{13}$ as shown in Formula I, can independently be a $(C_1$ to $C_{20})$alkyl, aryl or aralkyl or a hydrogen. One or more embodiments provide that each of $R^2$ and $R^{13}$ is a $(C_3\text{-}C_4)$alkyl such as n-butyl, t-butyl, or 2-methyl-pentyl. One or more embodiments provide that each of $R^2$ and $R^{13}$ is a 1,1,3,3-tetramethylbutyl. One or more embodiments provide that each of $R^2$ and $R^{13}$ is a $(C_1)$alkyl i.e., a methyl.

As mentioned, each of $R^{15}$ and $R^{16}$ as shown in Formula I, can be a 2,7-disubstituted carbazol-9-yl or a 3,6-disubstituted carbazol-9-yl. For instance, one or more embodiments provide that each of $R^{15}$ and $R^{16}$ is a 2,7-disubstituted carbazol-9-yl selected from a group consisting of a 2,7-di-t-butylcarbazol-9-yl, a 2,7-diethylcarbazol-9-yl, a 2,7-dimethylcarbazol-9-yl, and a 2,7-bis(diisopropyl(n-octyl)silyl)-carbazol-9-yl. One or more embodiments provide that each of $R^{15}$ and $R^{16}$ is a 3,6-disubstituted carbazol-9-yl selected from a group consisting of a 3,6-di-t-butylcarbazol-9-yl, a 3,6-diethylcarbazol-9-yl, a 3,6-dimethylcarbazol-9-yl, and a 3,6-bis(diisopropyl(n-octyl)silyl)-carbazol-9-yl.

As mentioned, L, as shown in Formula I, can be a $C_3$ alkylene or $C_4$ alkylene that forms a bridge between the two oxygen atoms to which L is covalently bonded. For instance, in one or more embodiments L can be a saturated $(C_3\text{-}C_4)$ alkyl that forms a 3-carbon or 4-carbon bridge between the two oxygen atoms to which L is bonded. For instance, one or more embodiments provide that L is a saturated $(C_3)$alkyl that forms a bridge between the two oxygen atoms to which L is bonded. The term "saturated" means lacking carbon-carbon double bonds, carbon-carbon triple bonds, and (in heteroatom-containing groups) carbon-nitrogen, carbon-phosphorous, and carbon-silicon double or triple bonds. One or more embodiments provide that L is a saturated $(C_4)$alkyl that forms a bridge between the two oxygen atoms to which L is bonded.

As mentioned, each X, as shown in Formula I, can independently be a halogen, a hydrogen, a $(C_1\text{-}C_{20})$alkyl, a $(C_7\text{-}C_{20})$aralkyl, a $(C_1\text{-}C_6)$alkyl-substituted $(C_6\text{-}C_{12})$aryl, or a $(C_1\text{-}C_6)$alkyl-substituted benzyl, $—CH_2Si(R^C)_3$, where $R^C$ is $(C_1\text{-}C_{12})$hydrocarbon. For instance, one or more embodiments provide that each X is a $(C_1)$alkyl.

As mentioned, M, as shown in Formula I, is a heteroatom such as a metal atom. In some embodiments, M can be selected from a group consisting of Zr and Hf. One or more embodiments provide that M is zirconium. One or more embodiments provide that M is hafnium.

Each of the R groups ($R^1$-$R^{16}$) and the X's of Formula I, as described herein, can independently be substituted or unsubstituted. For instance, in some embodiments, each of the X's of Formula I can independently be a $(C_1\text{-}C_6)$alkyl-substituted $(C_6\text{-}C_{12})$aryl, or a $(C_1\text{-}C_6)$alkyl-substituted benzyl. As used herein, "substituted" indicates that the group following that term possesses at least one moiety in place of one or more hydrogens in any position, the moieties selected from such groups as halogen radicals, hydroxyl groups, carbonyl groups, carboxyl groups, amine groups, phosphine groups, alkoxy groups, phenyl groups, naphthyl groups, $(C_1$ to $C_{20})$alkyl groups, $(C_2$ to $C_{10})$alkenyl groups, and combinations thereof. Being "disubstituted" refers to the presence of two or more substituent groups in any position, the moieties selected from such groups as halogen radicals, hydroxyl groups, carbonyl groups, carboxyl groups, amine groups, phosphine groups, alkoxy groups, phenyl groups, naphthyl groups, $(C_1$ to $C_{20})$alkyl groups, $(C_2$ to $C_{10})$alkenyl groups, and combinations thereof.

The metallocene olefin polymerization catalyst and a biphenylphenol polymerization catalyst made from a biphenylphenol polymerization precatalyst herein can be made utilizing reactants mentioned herein. The metallocene olefin polymerization catalyst and a biphenylphenol polymerization catalyst made from a biphenylphenol polymerization precatalyst herein can be made by a number of processes, e.g. with conventional solvents, reaction conditions, reaction times, and isolation procedures, utilized for making known catalysts such as known metallocene olefin polymerization catalysts.

One or more embodiments provide a polymerization catalyst, namely a biphenylphenol polymerization catalyst made from a biphenylphenol polymerization precatalyst of Formula I. The biphenylphenol polymerization catalyst can be made by contacting, under activating conditions, the biphenylphenol polymerization precatalysts and an activator to provide the biphenylphenol polymerization catalyst, e.g., an activated biphenylphenol polymerization precatalyst. Activating conditions are well known in the art.

As used herein, "activator" refers to any compound or combination of compounds, supported, or unsupported, which can activate a complex or a catalyst component, such as by creating a cationic species of the catalyst component. For example, this can include the abstraction of at least one leaving group, e.g., the "X" group described herein, from the metal center of the complex/catalyst component, e.g., the metal complex of Formula I. As used herein, "leaving group" refers to one or more chemical moieties bound to a metal atom and that can be abstracted by an activator, thus producing a species active towards olefin polymerization.

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-$(CF_3)_2$phenyl)borate, Triphenylcarbenium tetrakis(3,5-$(CF_3)_2$phenyl)borate, Dimethylanilinium tetrakis(perfluoronapthyl)borate, Triphenylcarbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl) boron, a tris(perfluoronaphthyl)boron, tris(perfluorophenyl) aluminum, a tris(perfluoronaphthyl)aluminum or any combinations thereof.

Aluminoxanes can be described as oligomeric aluminum compounds having —Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxane ("MMAO") type 3A (commercially available from Akzo Chemicals, Inc. under the trade name Modified Methylaluminoxane type 3A, discussed in U.S. Pat. No. 5,041,584). A source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and combinations thereof.

The metallocene olefin polymerization catalyst can be any metallocene olefin polymerization catalyst. In one or more embodiments, the metallocene olefin polymerization catalyst is selected from the group consisting of: (pentamethylcyclopentadienyl)(propylcyclopentadienyl)$MX_2$, (tetramethylcyclopentadienyl)(propylcyclopentadienyl)$MX_2$, (tetramethylcyclopentadienyl)(butylcyclopentadienyl)$MX_2$, $Me_2Si$(indenyl)$_2MX_2$, $Me_2Si$(tetrahydroindenyl)$_2MX_2$, (n-propyl cyclopentadienyl)$_2MX_2$, (n-butylcyclopentadienyl)$_2MX_2$, (1-methyl, 3-butyl cyclopentadienyl)$_2MX_2$, $HN(CH_2CH_2N(2,4,6\text{-}Me_3C_6H_2))_2MX_2$, $HN(CH_2CH_2N(2,3,4,5,6\text{-}Me_5C_6))_2MX_2$, (propyl cyclopentadienyl)(tetramethylcyclopentadienyl)$MX_2$, (butyl cyclopentadienyl)$_2MX_2$, (propyl cyclopentadienyl)$_2MX_2$, and mixtures thereof, where M is Zr or Hf, and X is selected from F, Cl, Br, I, Me, benzyl, $CH_2SiMe_3$, and ($C_1$ to $C_5$)alkyls or alkenyls. In one or more embodiments the metallocene olefin polymerization catalyst is selected from the group consisting of bis(indenyl) zirconium dichloride, (pentamethylcyclopentadienyl)(n-propylcyclopentadienyl)zirconium dichloride, or (tetramethylcyclopentadienyl)(n-propylcyclopentadienyl) zirconium dichloride.

A polymerization catalyst system comprising a metallocene olefin polymerization catalyst; and a biphenylphenol polymerization catalyst made from a biphenylphenol polymerization precatalyst, can be utilized to make a polymer. For instance, the polymerization catalyst system and an olefin can be contacted under polymerization conditions in a slurry-phase polymerization reactor to make a polymer, e.g., a polyolefin polymer.

As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. As used herein a "polymerization process" is a process that is utilized to make a polymer.

Embodiments provide that the polymer can be a polyolefin polymer. As used herein an "olefin," which may be referred to as an "alkene," refers to a linear, branched, or cyclic compound including carbon and hydrogen and having at least one double bond. As used herein, when a polymer or copolymer is referred to as comprising, e.g., being made from, an olefin, the olefin present in such polymer or copolymer is the polymerized form of the olefin. For example, when a copolymer is said to have an ethylene content of 1 wt % to 99 wt %, it is understood that the polymer unit in the copolymer is derived from ethylene in the polymerization reaction and the derived units are present at 1 wt % to 99 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a slurry-phase polymerization process. In another embodiment, ethylene and/or propylene can be polymerized with at least two different comonomers, optionally one of which may be a diene, to make a terpolymer.

One or more embodiments provide that the polymer can include from 1 to 100 wt % of units derived from ethylene based on a total weight of the polymer. All individual values and subranges from 1 to 100 wt % are included; for example, the polymer can include from a lower limit of 1, 5, 10, or 50 wt % of units derived from ethylene to an upper limit of 100, 95, 90, 85, or 75 wt % of units derived from ethylene based on the total weight of the polymer.

The polymerization catalyst system including a biphenylphenol polymerization catalyst made from a biphenylphenol polymerization precatalyst of Formula I can help to provide polymers via a polymerization process in a single slurry-phase reactor. In one or more embodiments, the resultant polymers can have at least a high molecular weight polyethylene component and a low molecular weight polyethylene component, as detailed herein. In one or more embodiments the resultant polymer can be a multimodal polymer such as a bimodal polyethylene composition comprising a high molecular weight polyethylene component and a low molecular weight polyethylene component, where the high and low molecular weight polyethylene components are formed together in a single slurry-phase reactor via a polymerization process employing the polymerization catalyst system. Having a high molecular weight polyethylene component and a low molecular weight polyethylene component is desirable in some applications.

Surprisingly, the polymerization catalyst system including a biphenylphenol polymerization catalyst made from a biphenylphenol polymerization precatalyst of Formula I of the disclosure can make polymers including high molecular weight polyethylene components that has a lower molecular weight as compared to high molecular weight components in polymers formed with other (non-inventive) polymerization catalysts at similar polymerization conditions, as detailed herein. High molecular weight polyethylene components having a lower molecular weight than other high molecular weight polyethylene components are desirable in some applications.

Embodiments provide that the polymer can have an Mn (number average molecular weight) from 8,000 to 400,000. All individual values and subranges from 8,000 to 400,000 are included; for example, the polymer can have an Mn from a lower limit of 8,000; 10,000; 12,000; 40,000, or 84,000; to an upper limit of 400,000; 300,000; 250,000; 200,000; 150,000; or 100,000. In some embodiments the Mn can be in a range from 40,300 to 207,200.

Embodiments provide that the polymer can have a Mw (weight average molecular weight) from about 150,000 to about 800,000 at B-conditions and/or a molecular weight of less than about 500,000 Daltons at K-conditions. All individual values and subranges from 150,000 to 800,000 are included; for example, the polymer can have an Mw from a lower limit of about 50,000; about 100,000; about 150,000; or about 200,000; to an upper limit of about 800,000, about 700,000 or about 600,000 at K-conditions. Some embodiments provide that the polymer can have an Mw (weight average molecular weight) from 150,000 to 800,000 at B-conditions and/or a molecular weight of less than 500,000 Daltons at K-conditions. All individual values and subranges from 150,000 to 800,000 are included; for example, the polymer can have an Mw from a lower limit of 150,000 or 200,000; to an upper limit of 800,000 700,000, or 600,000 at K-conditions. In some examples the polymer can have an Mw from 50,000 to 500,000 at K-conditions or from 100,000 to 500,000 at K-conditions. As used herein, B-conditions are as follows: Temperature=100 °C; Ethylene=100 pounds per square inch (psi); $H_2/C_2$=0.0017; $C_6/C_2$=0.4. As used herein, K-conditions are as follows: Temperature=100 °C; Ethylene=100 psi; $H_2/C_2$=0.0068; $C_6/C_2$=0.4

Embodiments provide that the polymer can have a Mz (z-average molecular weight) from 200,000 to 10,000,000. All individual values and subranges from 200,000 to 10,000,000 are included; for example, the polymer can have a Mz from a lower limit of 200,000; 700,000; or 900,000; to an upper limit of 10,000,000; 5,000,000; or 3,000,000.

Embodiments provide that the polymer can have a Mz to Mw ratio in a range of from 2.00 to 20.00. All individual values and subranges from 2.00 to 20.00 are included; for example, the polymer can have a Mz to Mw ratio from a lower limit of 2.00; 3.00; or 4.00 to an upper limit of 20.00, 15.00, or 10.00.

In some embodiments, the polymer can have a value of Mw to Mn ratio that is greater than 2.00, greater than 3.00, greater than 4.00, or greater than 5.00. Some embodiments provide that the polymer can have an Mw to Mn ratio in a range of from 5.00 to 75.00. All individual values and subranges from 5.00 to 75.00 are included; for example, the polymer can have a Mw to Mn ratio from a lower limit of 2.00; 3.00; 4.00; 5.00; 6.00; or 7.00 to an upper limit of 75.00, 60.00, 50.00 or 20.00.

Embodiments provide that the polymer can have a Mz to Mw ratio that is less than a Mw to Mn ratio of the polymer.

Embodiments provide that the polymer can have a melt index ($I_{21}$) as measured by ASTM D1238 (at 190 °C, 21 kg load) in the range from 0.001 dg/1 min to 1000 dg/1 min. All individual values and subranges from 0.001 dg/1 min to 1000 dg/1 min are included.

Embodiments provide that the polymer made utilizing a gas-phase polymerization reactor can have melt temperature (Tm) from 110 to 135 degrees Celsius (°C). All individual values and subranges from 118 to 135 °C are included; for example, the polymer can have a Tm from a lower limit of 110, 113, 118, 119, or 120 to an upper limit of 135, 133, 132, 130, or 128 °C. Melt temperature (i.e., Tm) can be determined via Differential Scanning calorimetry according to ASTM D 3418-08. For instance, using a scan rate of 10 °C/min on a sample of 10 mg and using the second heating cycle.

Embodiments provide that the polymer can have a density of from 0.890 g/cm$^3$ to 0.970 g/cm$^3$. All individual values and subranges from 0.890 to 0.970 g/cm$^3$ are included; for example, the polymer can have a density from a lower limit of 0.890, 0.900, 0.910, 0.920, or 0.940 g/cm$^3$ to an upper limit of 0.970, 0.960, or 0.950 g/cm$^3$. Density can be determined in accordance with ASTM D-792-13, *Standard Test Methods for Density and Specific Gravity* (*Relative*

*Density) of Plastics by Displacement*, Method B (for testing solid plastics in liquids other than water, e.g., in liquid 2-propanol). Report results in units of grams per cubic centimeter ($g/cm^3$).

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160 °C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160 °C with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X+1} + \frac{a_{PS}+1}{a_X+1}\log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_x/K_x$=0.695/0.000579. For polypropylenes $a_x/K_x$=0.705/0.0002288. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

The polymer can be utilized for a number of articles such as films, fibers, nonwoven and/or woven fabrics, extruded articles, and/or molded articles, among others.

Provided is polymerization catalyst system to make a polymer via a slurry-phase polymerization process, the polymerization catalyst system comprising: a metallocene olefin polymerization catalyst; and the supported biphenylphenol polymerization catalyst made from the biphenylphenol polymerization precatalyst of Formula I, as detailed herein.

The metallocene olefin polymerization catalyst and/or a biphenylphenol polymerization catalyst made from a biphenylphenol polymerization precatalyst of Formula I, as well as other components discussed herein such as the activator, may be utilized with a support. A "support", which may also be referred to as a "carrier", refers to any support material, including a porous support material, such as talc, inorganic oxides, and inorganic chlorides.

The metallocene olefin polymerization catalyst and/or a biphenylphenol polymerization catalyst made from a biphenylphenol polymerization precatalyst of Formula I, as well as other components discussed herein, can be supported on the same or separate supports, or one or more of the components may be used in an unsupported form. Utilizing the support may be accomplished by any technique used in the art. One or more embodiments provide that a spray dry process is utilized. Spray dry processes are well known in the art. The support may be functionalized.

The support may be a porous support material, for example, talc, an inorganic oxide, or an inorganic chloride. Other support materials include resinous support materials, e.g., polystyrene, functionalized or crosslinked organic supports, such as polystyrene divinyl benzene polyolefins or polymeric compounds, zeolites, clays, or any other organic or inorganic support material and the like, or mixtures thereof.

Support materials include inorganic oxides that include Group 2, 3, 4, 5, 13 or 14 metal oxides. Some preferred supports include silica, fumed silica, alumina, silica-alumina, and mixtures thereof. Some other supports include magnesia, titania, zirconia, magnesium chloride, montmorillonite, phyllosilicate, zeolites, talc, clays) and the like. Also, combinations of these support materials may be used, for example, silica-chromium, silica-alumina, silica-titania and the like. Additional support materials may include porous acrylic polymers, nanocomposites, aerogels, spherulites, and polymeric beads.

An example of a support is fumed silica available under the trade name Cabosil™ TS-610, or other TS- or TG-series supports, available from Cabot Corporation. Fumed silica is typically a silica with particles 7 to 30 nanometers in size that has been treated with dimethylsilyldichloride such that a majority of the surface hydroxyl groups are capped.

The support material may have a surface area in the range of from about 10 to about 700 $m^2/g$, pore volume in the range of from about 0.1 to about 4.0 $g/cm^3$ and average particle size in the range of from about 5 to about 500 μm. More preferably, the surface area of the support material is in the range of from about 50 to about 500 $m^2/g$, pore volume of from about 0.5 to about 3.5 $g/cm^3$ and average particle size of from about 10 to about 200 μm. Most preferably the surface area of the support material is in the range is from about 100 to about 400 $m^2/g$, pore volume from about 0.8 to about 3.0 $g/cm^3$ and average particle size is from about 5 to about 100 μm. The average pore size of the carrier typically has pore size in the range of from 10 to 1000 A, preferably 50 to about 500 A, and most preferably 75 to about 350 A.

The metallocene olefin polymerization catalyst and/or a biphenylphenol polymerization catalyst made from a biphenylphenol polymerization precatalyst of Formula I, as well as other components discussed herein such as the activator, may be slurried. Slurries are well known in the art. The slurry may include the metallocene olefin polymerization catalyst and/or a biphenylphenol polymerization catalyst made from a biphenylphenol polymerization precatalyst of Formula I, an activator, and a support, for instance.

A molar ratio of metal in the activator to metal in a metallocene olefin polymerization catalyst or the biphenylphenol polymerization catalyst made from a biphenylphenol polymerization precatalyst of Formula I in the slurry may be 20,000:1 to 0.5:1, 20,000:1 to 2000:1, 20,000:1 to 5,000:1, 20,000:1 to 10,000:1, 1000:1 to 0.5:1, 300:1 to 1:1, or 150:1 to 1:1. One or more diluents, e.g., fluids, can be used to facilitate the combination of any two or more components in the slurry. For example, the metallocene olefin polymerization catalyst and/or a biphenylphenol polymerization catalyst made from a biphenylphenol polymerization precatalyst of Formula I, and the activator can be combined together in the presence of toluene or another non-reactive hydrocarbon or hydrocarbon mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the mixture or the metal-ligand complex/activator can be added to the support. The slurry may be fed to the reactor for the polymerization process, and/or the slurry may be dried, e.g., spray-dried, prior to being fed to the reactor for the polymerization process.

As mentioned, the polymerization process may be a slurry-phase polymerization process via a slurry-phase polymerization reactor. The polymerization process may utilize known equipment and reaction conditions, e.g., known polymerization conditions. As an example, polymerization temperatures may range from about 0 °C to about 300 °C at atmospheric, sub-atmospheric, or super-atmospheric pressures. Embodiments provide a method of making a polyolefin polymer the method comprising: contacting, under polymerization conditions, an olefin with the polymerization catalyst system, as described herein, to polymerize the olefin, thereby making a polyolefin polymer.

One or more embodiments provide that the polymers may be formed via a slurry-phase polymerization system, at super-atmospheric pressures in the range from 0.07 to 68.9 bar, from 3.45 to 27.6 bar, or from 6.89 to 24.1 bar, and a temperature in the range from 30 °C to 130 °C, from 65 °C to 110 °C, from 75 °C to 120 °C, or from 80 °C to 120 °C. Stirred and/or fluidized bed slurry-phase polymerization systems may be utilized.

Generally, a conventional slurry-phase fluidized bed polymerization process can be conducted by passing a stream containing one or more olefin monomers continuously through a fluidized bed reactor under reaction conditions and in the presence of a catalytic composition, e.g., a composition including the polymerization catalyst system (a metallocene olefin polymerization catalyst and a biphenylphenol polymerization catalyst made from a biphenylphenol polymerization precatalyst of Formula I) and the activator, at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalytic composition and reactants may also be present in the gas stream. The polymerization system may include a single reactor or two or more reactors in series, for example.

Feed streams for the polymerization process may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single or multiple and different locations.

For the polymerization process, polymerization catalyst (a metallocene olefin polymerization catalyst and/or a biphenylphenol polymerization catalyst made from a biphenylphenol polymerization precatalyst of Formula I) may be continuously fed to the reactor.

For the polymerization process, hydrogen may be utilized at a gas mole ratio of hydrogen to ethylene in the reactor that can be in a range of about 0.0 to 3.5, 0.0 to 1.0, in a range of 0.01 to 0.7, in a range of 0.03 to 0.5, in a range of 0.005 to 0.3, or in a range in a range of 0.0017 to 0.0068. A number of embodiments utilize hydrogen gas.

A number of aspects of the present disclosure are provided as follows.

Aspect 1 provides a use of a supported biphenylphenol polymerization catalyst to make a polymer via a slurry-phase polymerization process, where the supported biphenylphenol polymerization catalyst is made from a biphenylphenol polymerization precatalyst of Formula I:

(Formula I)

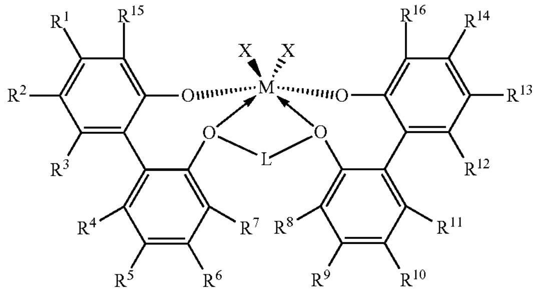

where each of $R^5$, $R^7$, $R^8$, and $R^{10}$ independently is a ($C_1$ to $C_{20}$)alkyl, aryl, aralkyl, halogen, or a hydrogen; where each of $R^4$ and $R^{11}$ independently is a halogen or a hydrogen; where each of $R^2$ and $R^{13}$ independently is a ($C_1$ to $C_{20}$)alkyl, aryl or aralkyl or a hydrogen; where each of $R^{15}$ and $R^{16}$ independently is a 2,7-disubstituted carbazol-9-yl or a 3,6-disubstituted carbazol-9-yl; where L is a $C_3$ alkylene or $C_4$ alkylene that forms a bridge between the two oxygen atoms to which L is covalently bonded; where each of $R^1$, $R^3$, $R^{12}$, and $R^{14}$ independently is a ($C_1$-$C_8$)alkyl, halogen, or a hydrogen; where each of $R^6$ and $R^9$ is a hydrogen, ($C_1$-$C_8$) alkyl, or halogen optionally, $R^6$ can be linked with $R^7$ and $R^8$ can be linked to $R^9$ to form a cyclic structure; where each X independently is a halogen, a hydrogen, a ($C_1$-$C_{20}$)alkyl, a ($C_7$-$C_{20}$)aralkyl, a ($C_1$-$C_6$)alkyl-substituted ($C_6$-$C_{12}$)aryl, or a ($C_1$-$C_6$)alkyl-substituted benzyl, —$CH_2Si(R^C)_3$, where $R^C$ is ($C_1$-$C_{12}$)hydrocarbon; and where M is zirconium (Zr) or hafnium (Hf)

Aspect 2 provides the use of Aspect 1, where the biphenylphenol polymerization precatalyst of Formula I is selected from a group consisting of the structures of (i), (ii), (iii), (iv), (v), (vi), (vii), (viii), (ix), (x), (xi), (xii), (xiii), (xiv), and (xv), as described herein.

Aspect 3 provides the use of Aspect where the polymer formed at B-conditions ($H_2/C_2$=0.0017 and $C_6/C_2$=0.4 at 100 °C and 100 pounds per square inch (psi) ethylene) has a molecular weight (Mw) in a range of from about 150,000 Daltons to about 800,000 Daltons.

Aspect 4 provides the use of Aspect 1, where the polymer formed at K-conditions ($H_2/C_2$=0.0068 and $C_6/C_2$=0.4 at 100 °C and 100 psi) has a molecular weight (Mw) of less than about 500,000 Daltons. That is, in one or more embodiments, the polymer has a molecular weight in a range of from about 150,000 Daltons to about 800,000 Daltons at B-conditions or a molecular weight of less than about 500,000 at K-conditions.

Aspect 5 provides a polymerization catalyst system to make a polymer via a slurry-phase polymerization process, the polymerization catalyst system comprising: a metallocene olefin polymerization catalyst; and the supported biphenylphenol polymerization catalyst made from the biphenylphenol polymerization precatalyst of Aspect 1.

Aspect 6 provides a slurry-phase polymerization method to make a polymer, the method comprising: polymerizing an olefin monomer in a slurry-phase polymerization reactor in presence of the polymerization catalyst system of Aspect 5 to make the polymer. In various embodiments, part or all of a polymerization catalyst system (e.g., the metallocene and/or the biphenylphenol polymerization precatalyst/catalyst) is provided as a trim solution. For example, a portion of the metallocene catalyst may be provided as a trim solution. Alternatively, a portion of the biphenylphenol polymerization precatalyst/catalyst may be provided as a trim solution.

Aspect 7 provides the polymerization catalyst system of Aspect 5 or the slurry-phase polymerization method of Aspect 6, where each of $R^{15}$ and $R^{16}$ is a 3,6-di-t-butylcarbazol-9-yl.

Aspect 8 provides the polymerization catalyst system of Aspect 5 or the slurry-phase polymerization method of Aspect 6, where each of $R^{15}$ and $R^{16}$ is a 2,7-di-t-butylcarbazol-9-yl.

Aspect 9 provides the polymerization catalyst system of Aspect 5 or the slurry-phase polymerization method of Aspect 6, where the metallocene olefin polymerization catalyst is selected from the group consisting of:

(pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
(methylcyclopentadienyl)(1,3-dimethyl-tetrahydroindenyl)$MX_2$,
(cyclopentadienyl)(1,3-dimethyl-tetrahydroindenyl)$MX_2$,
(cyclopentadienyl)(4,7-dimethylindenyl)$MX_2$,
(cyclopentadienyl)(1,5-dimethylindenyl)$MX_2$,
(cyclopentadienyl)(1,4-dimethylindenyl)$MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
$HN(CH_2CH_2N(2,4,6\text{-}Me_3phenyl))_2MX_2$,
$HN(CH_2CH_2N(2,3,4,5,6\text{-}Me_5phenyl))_2MX_2$,
(butyl cyclopentadienyl)$_2MX_2$,
(propyl cyclopentadienyl)$_2MX_2$, and mixtures thereof, where M is Zr or Hf, and X is selected from F, Cl, Br, I, Me, benzyl, $CH_2SiMe_3$, and ($C_1$ to $C_5$)alkyls or alkenyls.

Aspect 10 provides polyethylene composition comprising a high molecular weight polyethylene component and a low molecular weight polyethylene component, where the high and low molecular weight polyethylene components are made together in a single slurry-phase reactor via a polymerization process employing the polymerization catalyst system of Aspect 5.

EXAMPLES

Biphenylphenol polymerization catalysts made from the biphenylphenol polymerization precatalyst of Formula (I), polymerization catalyst systems including the biphenylphenol polymerization catalysts, and comparative polymerization catalysts (other than those made from polymerization precatalyst of Formula (I) were prepared as follows.

Biphenylphenol polymerization catalysts made from the biphenylphenol polymerization precatalyst of Formula (I) and polymerization catalyst system s including the biphenylphenol polymerization catalysts were prepared as follows.

Biphenylphenol polymerization precatalyst of structure (i) was prepared as follows.

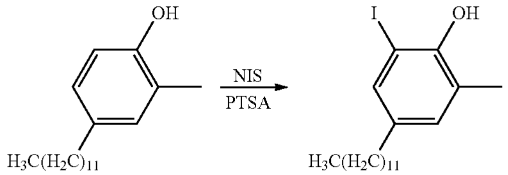

Preparation of 4-dodecyl-2-iodo-6-methylphenol: To acetonitrile (25 mL) was added 4-dodecyl-2-methylphenol (2.12 g, 7.688 mmol) and p-toluenesulfonic acid monohydrate (1.48 g, 7.78 mmol) and stirred for about 15 minutes at 0-10 °C. (ice water bath) at which time N-iodosuccinimide (1.73 g, 7.668 mmol) was added. The reaction mixture became a thick slurry so additional acetonitrile (25 mL) was added and stirring resumed. The reaction mixture was allowed to warm up to room temperature and stirred for 24 hours after which time approximately 16% of starting material remained. Therefore, an additional 0.3 equivalents of N-iodosuccinimide (0.52 g, 2.30 mmol) was added to the reaction and stirred at room temperature for 5 hours. The reaction mixture was concentrated to dryness, dissolved in methylene chloride (50 mL), washed with 10 wt. % aqueous sodium thiosulfate (3×50 mL), washed with water then brine (50 mL each), dried over anhydrous MgSO4, filtered through a pad of silica gel then concentrated to give 2.80 g of crude compound ~95% pure by GCMS as an off white solid. The product was recrystallized from hexanes (8 mL) to obtain 1.79 g (58.0%) of clean product.

$^1H$ NMR (400 MHz, $CDCl_3$) δ7.29 (s, 1H), 6.89 (s, 1H), 2.46 (t, 2H), 2.28 (s, 3H), 1.55 (br s, 2H), 1.27 (br s, 18H), 0.89 (t, 3H).

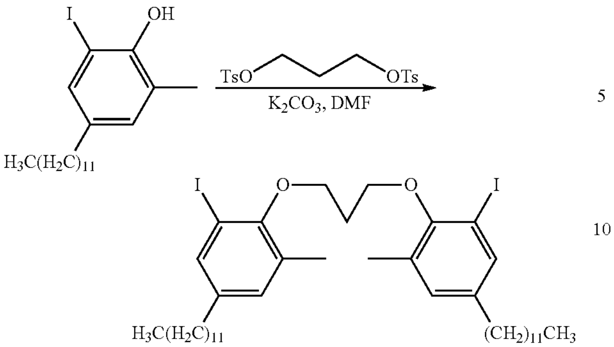

Preparation of 1,3-bis(4-dodecyl-2-iodo-6-methylphenoxy)propane: To dimethylformamide (25 mL) was added 4-dodecyl-2-iodo-6-methylphenol (1.63 g, 4.05 mmol), K2CO3 (1.19 g, 8.61 mmol) and propane-1,3-diyl bis(4-methylbenzenesulfonate (0.78 g, 2.03 mmol). The reaction mixture was heated at 100 °C for 30 minutes at which time it was cooled and concentrated to dryness by rotary evaporation. The residue was dissolved in 1:1 methylene chloride and water (100 mL) and extracted into methylene chloride (3×50 mL). The combined organic phases were washed with 200 mL each of 2N NaOH, water then brine, dried over anhydrous MgSO4, filtered through a small pad of silica gel and concentrated to give 1.6 g of compound as a brown oil. This crude was recrystallized from hexanes (10 mL) to afford 1.32 g (77.1%) of product as a white fluffy powder.

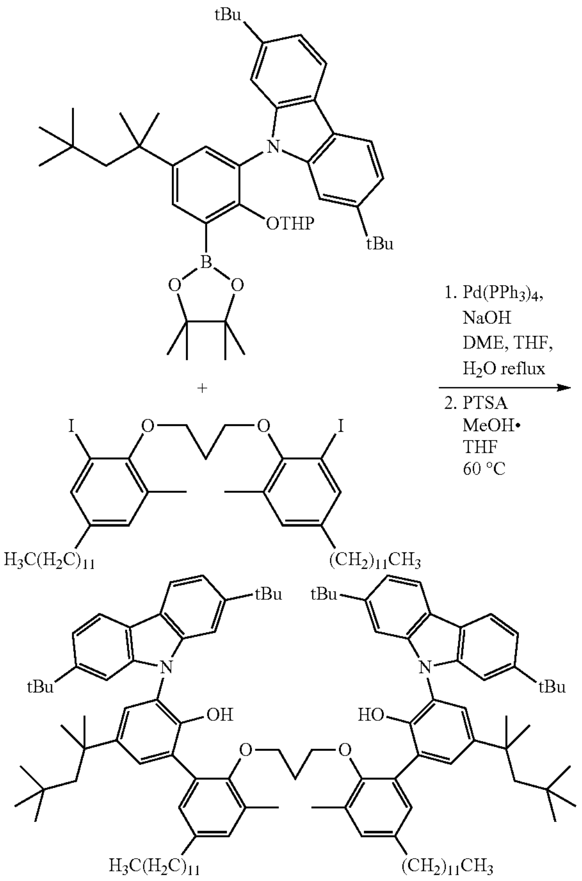

To 40 mL of dimethylether was added 2.35 g of 94.2% pure (3.19 mmol) 2,7-di-tert-butyl-9-(2-((tetrahy dro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (prepared as described in WO 2017/004462 A1), 1.274 g (1.508 mmol) of 1,3-bis(4-dodecyl-2-iodo-6-methylphenoxy)propane, 0.447 g of NaOH (11.2 mmol) in 11 mL of water and 15 mL of THF. The reaction mixture was sparged with N2 for about 15 minutes then 112 mg (0.097 mmol) of Pd(PPh3)4 was added and heated to 85 °C for 48 hours then cooled. Once cooled a precipitate had formed which was isolated by vacuum filtration and dried under high vacuum for about 2 hours. This crude protected product was used as is in the next step. To the crude protected ligand was added 150 mL of 1:1 methanol/THF and approximately 100 mg of PTSA. The solution was heated to 60 °C for 6 hours the cooled and concentrated. The crude ligand was taken up in methylene chloride, washed with brine, dried over anhydrous magnesium sulfate, filtered through a pad of silica gel then concentrated to afford the crude ligand. This crude was taken up in hexane and purified by flash chromatography using an ISCO purification system (2% ethyl acetate in hexanes; isocratic) to afford 2.30 g (97.5%) of pure ligand. To the crude protected ligand was added 150 mL of 1:1 methanol/THF and approximately 100 mg of PTSA. The solution was heated to 60 °C for 6 hours the cooled and concentrated. The crude ligand was taken up in methylene chloride, washed with brine, dried over anhydrous magnesium sulfate, filtered through a pad of silica gel then concentrated to afford the crude ligand. This crude was taken up in hexane and purified by flash chromatography using an ISCO purification system (2% ethyl acetate in hexanes; isocratic) to afford 2.30 g (97.5%) of pure ligand.

$^1$H NMR (400 MHz, CDC13) δ8.05 (d, 4H), 7.46 (dd, 4H), 7.33 (dd, 4H), 7.15 (d, 4H), 7.10 (d, 2H), 6.98 (d, 2H), 6.38 (br s, 2H), 3.72 (t, 4H), 2.63 (t, 4H), 2.00 (s, 6H), 1.79 (br s, 6H), 1.68 (quint, 4H), 1.32 (br m, 86H), 0.93 (t, 6H), 0.85 (s, 18H).

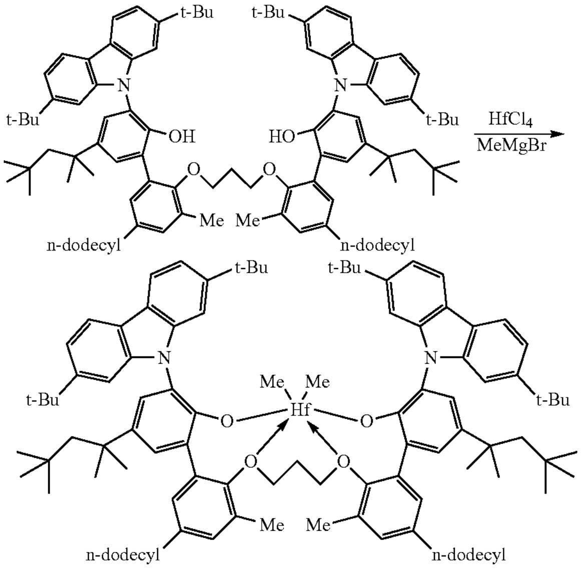

To a jar equipped with a stir bar in a nitrogen-purged glovebox was added $HfCl_4$ (0.0516 g, 0.161 mmol) and toluene (10 mL). The resulting slurry was cooled in a glovebox freezer at −30 °C. To the stirring cooled slurry was added methylmagnesium bromide in diethyl ether (3.0 M, 0.22 mL, 0.66 mmol). The mixture was vigorously stirred for about 4 minutes. The solid went into solution and the mixture turned to a light yellow color. To this mixture was then added the ligand (0.2500 g, 0.161 mmol) as a solid. The resulting mixture was stirred at ambient temperature for 2 hours. To the mixture was then added hexane (10 mL) and the mixture was filtered the next day. The colorless solid was concentrated under vacuum to afford 0.2145 g of the structure i product as a white solid (yield=75.8%).

$^1$H NMR (400 MHz, $C_6D_6$) δ8.24 (d, 2H), 8.06 (d, 2H), 8.01 (d, 2H), 7.88 (d, 2H), 7.80 (d, 2H), 7.58 (d, 2H), 7.54 (dd, 2H), 7.35 (dd, 2H), 7.12 (d, 2H), 6.51 (d, 2H), 3.64 (quint, 2H), 3.40 (quint, 2H), 2.24 (t, 4H), 1.80 (d, 2H), 1.65 (d, 2H), 1.62 (s, 18H), 1.28 (m, 90H), 0.93 (s, 30H), -0.78 (s, 6H).

(Structure i)

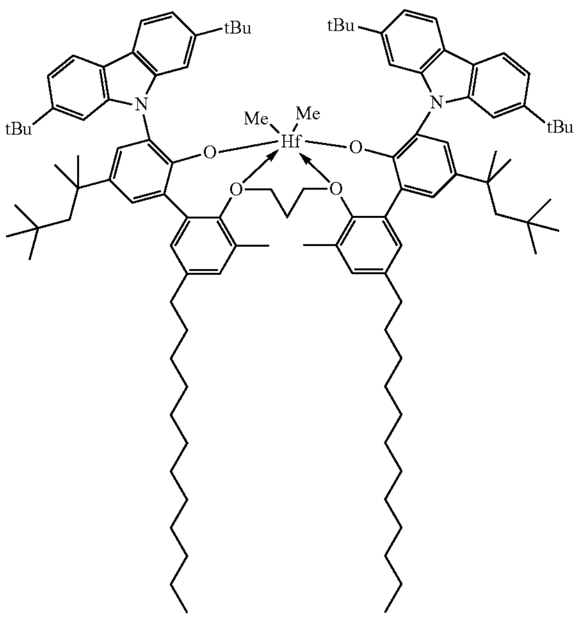

As used herein, "Me" refers to methyl, "Et" refers to ethyl, "n-Oct" refers to n-$C_8H_{17}$, "tBu" refers to tert-butyl, and "n-Pr" refers to n-$C_3H_7$.

Biphenylphenol polymerization precatalyst of structure (ii) was prepared as follows.

Ligand prepared as described above in the synthesis of Structure i.

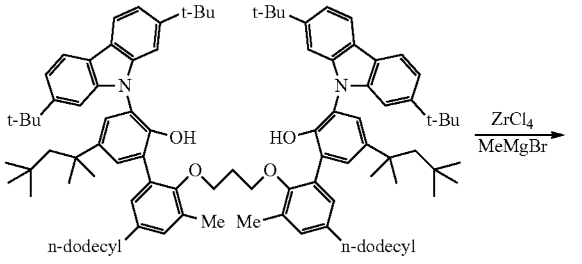

-continued

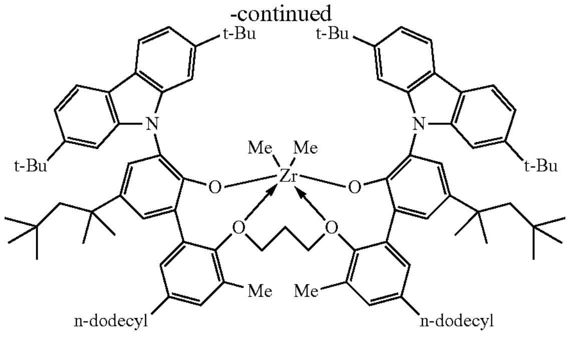

To a jar equipped with a stir bar in a nitrogen-purged glovebox was added $ZrCl_4$ (0.0376 g, 0.161 mmol) and toluene (10 mL). The resulting slurry was cooled in a glovebox freezer at −30 °C. To the stirring cooled slurry was added methylmagnesium bromide in diethyl ether (3.0 M, 0.23 mL, 0.69 mmol). The mixture was vigorously stirred for about 4 minutes. The solid went into solution and the mixture turned to a light yellow color. To this mixture was then added the ligand (0.2505 g, 0.161 mmol) as a solid. The resulting mixture was stirred at ambient temperature for 2 hours. To the mixture was then added hexane (10 mL) and the mixture was filtered the next day. The colorless solid was concentrated under vacuum to afford 0.2640 g of the structure ii product as a white solid (yield=97.9%).

$^1$H NMR (400 MHz, $C_6D_6$) δ8.24 (d, 2H), 8.05 (d, 2H), 8.01 (d, 2H), 7.85 (d, 2H), 7.58 (d, 2H), 7.54 (dd, 2H), 7.34 (dd, 2H), 7.13 (d, 2H), 6.50 (d, 2H), 3.55 (quint, 2H), 3.40 (quint, 2H), 2.24 (t, 4H), 1.81 (d, 2H), 1.66 (d, 2H), 1.61 (s, 18H), 1.28 (m, 100H), 0.94 (s, 18H), −0.58.

(Structure ii)

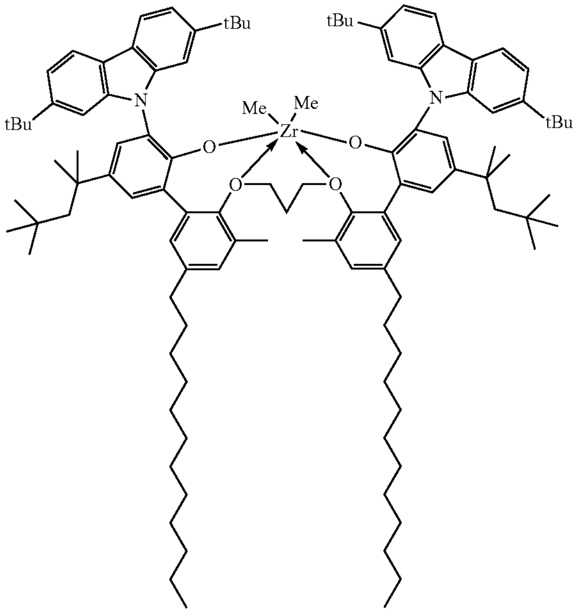

Biphenylphenol polymerization precatalyst of structure (iii) was prepared as follows.

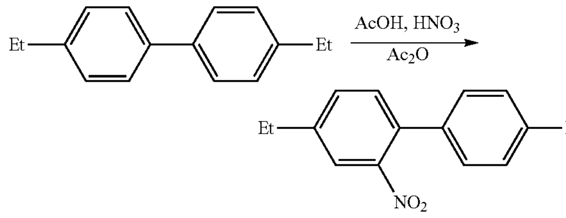

Preparation of 4,4'-diethyl-2-nitro-1,1'-biphenyl: A three-necked round bottom flask was equipped with a magnetic stir bar, a thermowell, an addition funnel, and septa. The flask was charged with 4,4'-diethylbiphenyl (15.0089 g, 71.366 mmol) and acetic anhydride (382 mL, 4041 mmol). The solution was cooled using an ice water bath (internal temperature 2.9 °C). A mixture of nitric acid (12.0 mL, 209.4 mmol) and acetic acid (6.5 mL, 152.7 mmol) was added dropwise continuously for ten minutes. The internal temperature was monitored not to exceed 10 °C. The temperature at the end of the addition was 8.6 °C and the highest temperature reached was 10.0 °C. The mixture was sampled by GC/MS after 10 minutes which showed the reaction complete. At 20 minutes, the reaction mixture was poured into a beaker containing ~2 L of ice-water (mostly ice) and stirred for 1.5 hours. A yellow oil separated from the aqueous phase. The mixture was transferred to a separatory funnel and dichloromethane (285 mL) was added to the mixture. The mixture was mixed well and allowed to separate. The organic phase was separated and washed with water (230 mL) and 1M aqueous NaOH (230 mL). The yellow solution was dried over anhydrous magnesium sulfate and filtered. The solution was concentrated by rotary evaporation with the bath temperature starting at 35 °C and eventually reaching 50 °C to afford a yellow oil (22.46 g) as a crude. The oil was chromatographed on a 330 g silica gel Grace column on the Isco CombiFlash system using a gradient from 10-20% dichloromethane in hexanes until product eluted. The fractions were analyzed by GC/MS and TLC (5% ethyl acetate in hexanes). The pure fractions were combined, concentrated by rotary evaporation and dried under high vacuum to afford 15.75 g (86.5%) of the product as a yellow oil.

$^1$H NMR (400 MHz, $CDCl_3$) δ7.64 (d, J=1.7 Hz, 1H), 7.40 (dd, J=7.9, 1.8 Hz, 1H), 7.32 (d, J=7.9 Hz, 1H), 7.25-7.20 (m, 4H), 2.73 (q, J=7.6 Hz, 2H), 2.68 (q, J=7.6 Hz, 2H), 1.28 (t, J=7.6 Hz, 3H), 1.26 (t, J=7.6 Hz, 3H). $^{13}$C NMR (101 MHz, $CDCl_3$) δ149.22, 144.50, 143.95, 134.54, 133.42, 131.68, 131.64, 128.04, 127.73, 123.02, 28.43, 28.04, 15.21, 14.96.

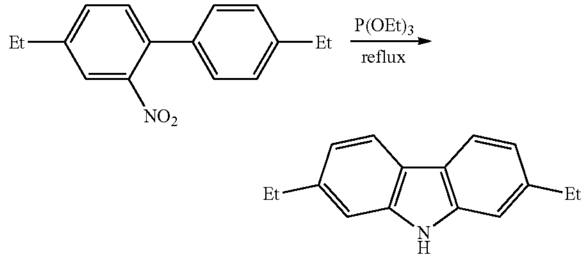

Preparation of 2,7-diethyl-9H-carbazole: A three-necked round bottom flask equipped with a magnetic stir bar was taken to a glove box under nitrogen atmosphere. The flask was charged with 4,4'-diethyl-2-nitro-1,1'-biphenyl (20.580 g, 80.608 mmol) and triethylphosphite (81 mL). The flask was closed with septa and taken to the fume hood where it was equipped with a condenser and a nitrogen gas inlet. The yellow solution was heated to reflux (175 °C heating mantle temperature) and sampled for GC/MS analysis (0.1 mL of sample diluted in dichloromethane) after 2 hours and 4 hours of refluxing. After 4 hours, only traces of the starting material were observed. A major peak with molecular weight of the desired product was observed. Therefore, the reaction mixture was allowed to cool to room temperature. A white crystalline precipitate was observed. The reaction mixture was stored in the freeze overnight. The white crystalline solid (crop 1) was collected by vacuum filtration while cold and washed with five 20-mL portions of cold ethanol. The solid was left to dry. The filtrate was placed back in the freezer overnight. The crystalline solid (crop 2) that precipitated in the mother liquor was collected by vacuum filtration while cold and washed with five 10-mL portions of cold ethanol. Both solids were transferred to vials and were placed under high vacuum to afford 8.2640 g of the crystalline solid from crop 1 and 2.3351 g of the crystalline solid from crop 2. The overall yield was 10.5991 g (58.9%) of the product.

$^1$H NMR (400 MHz, DMSO-$d_6$) δ7.93 (d, J=7.9 Hz, 2H), 7.78 (s, 1H), 7.19 (dd, J=1.5, 0.7 Hz, 2H), 7.08 (ddd, J=8.0, 1.3, 0.6 Hz, 2H), 2.82 (q, J=7.7 Hz, 4H), 1.33 (t, J=7.6 Hz, 6H). $^{13}$C NMR (101 MHz, DMSO-$d_6$) δ140.94, 140.27, 120.51, 119.54, 118.75, 109.55, 28.80, 16.15.

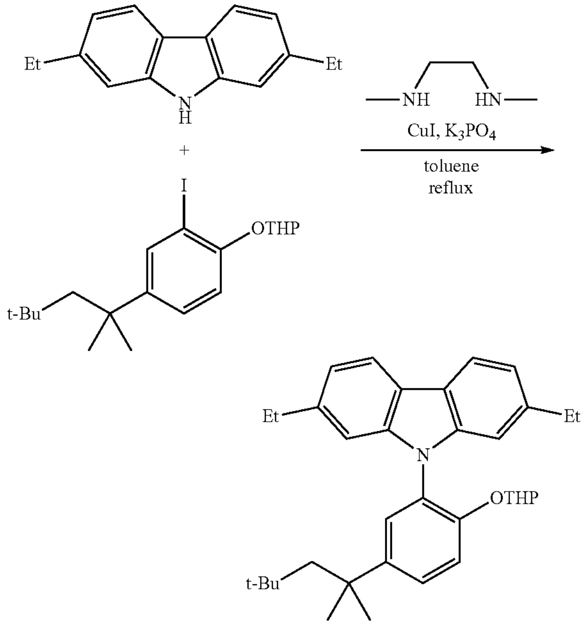

Preparation of 2,7-diethyl-9-(2-((tetrahydro-2H-pyran-2-yl)oxy)-5-(2,4,4-trimethylpentan-2-yl)phenyl)-9H-carbazole: A three-necked round bottom flask equipped was equipped with a stir bar and was taken to a glove box under nitrogen atmosphere. The flask was charged with 2-(2-iodo-4-(2,4,4-trimethylpentan-2-yl)phenoxy)tetrahydro-2H-pyran (24.48 g, 58.798 mmol), 2,7-diethyl-9H-carbazole (9.595 g, 42.965 mmol), potassium phosphate tribasic (31.04 g, 146.229 mmol), and dried toluene (114 mL). In a glove box, copper iodide (0.2860 g, 1.502 mmol) was added to a 20 mL vial and diluted with toluene (1 mL). The flask and vial containing the copper iodide solution were taken out of the glove box to a fume hood. The flask was equipped with a nitrogen gas inlet and a condenser. N,N-dimethylethylenediamine (0.602 mL, 5.593 mmol) was added to the copper iodide solution and the now slurried solution was added to the reaction mixture. The mixture was heated at 125 °C. (heating mantle temperature). After 24 hours, GC analysis showed about 84.74% conversion with 15.26% of carbazole remaining therefore additional anhydrous copper iodide (0.2827 g, 1.484 mmol) slurry in dried toluene (1 mL) and N,N-dimethylethylenediamine (0.602 mL, 5.593 mmol) was added. The reaction continued to stir at 125 °C for an additional 24 hours. After 48 hours, GC analysis showed about 97.60% conversion with 2.40% of carbazole. The reaction was allowed to cool to room temperature, filtered through a small silica plug, washed with three 75-mL portions of tetrahydrofuran, and concentrated by rotary evaporation to give a crude product as a dark brown oil (35.15 g) which eventually turned to a solid. The solid would not recrystallize from hexanes (75 mL) so the solution was concentrated by rotary evaporation to afford the dark brown oil which eventually turned to a solid. The material was dissolved in hot hexanes (25 mL), filtered hot through cotton using a glass funnel, and recrystallized. The resulting slurry was too concentrated. The slurry was warmed up to dissolve solids and the resulting solution was concentrated by rotary evaporation to afford a dark brown oil which eventually turned to a solid. The solid was recrystallized from hexanes (50 mL) to afford light brown crystals. The crystals were collected by vacuum filtration, washed with two 10-mL portions of cold hexanes, and dried under high vacuum to afford 14.2792 g (64.9%) of the product as light brown crystals.

$^1$H NMR (400 MHz, $CDCl_3$+TMS) δ7.95 (d, J=7.9 Hz, 2H), 7.47 (d, J=2.4 Hz, 1H), 7.42 (dd, J=8.7, 2.5 Hz, 1H), 7.33 (d, J=8.6 Hz, 1H), 7.06 (dt, J=8.0, 1.2 Hz, 2H), 7.06-7.00 (m, 1H), 6.99-6.93 (m, 1H), 5.26 (t, J=2.9 Hz, 1H), 3.70 (td, J=11.1, 2.9 Hz, 1H), 3.46 (dt, J=11.2, 3.7 Hz, 1H), 2.73 (q, J=7.6 Hz, 4H), 1.74 (s, 2H), 1.45-1.34 (m overlapping with two singlet at 1.38 and 1.37 ppm, 2H), 1.38 (s, 3H), 1.37 (s, 3H), 1.25 (t, J=7.6, Hz, 8H), 1.15-1.09 (m, 2H), 0.82 (s, 9H). $^{13}$C NMR (101 MHz, $CDCl_3$+TMS) δ151.07, 144.12, 142.07, 142.03, 141.55, 141.53, 127.76, 126.69, 126.30, 121.29, 121.16, 119.61, 119.57, 119.48, 119.41, 116.29, 109.53, 108.95, 96.85, 61.47, 57.07, 38.19, 32.38, 31.85, 31.62, 31.46, 29.99, 29.49, 25.06, 17.66, 16.11, 16.07.

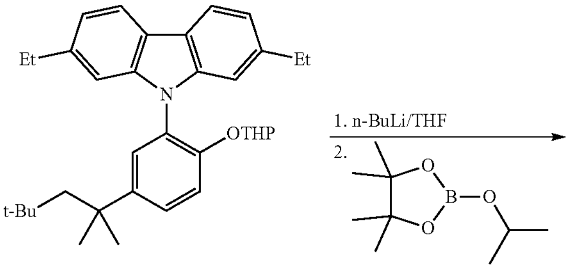

-continued

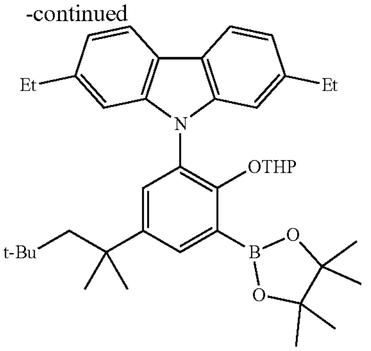

Preparation of 2,7-diethyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole: A three-necked round bottom flask was equipped with a magnetic stir bar, septa, and a nitrogen gas inlet. The flask was charged with 2,7-diethyl-9-(2-((tetrahydro-2H-pyran-2-yl)oxy)-5-(2,4,4-trimethylpentan-2-yl)phenyl)-9H-carbazole (10.0012 g, 19.544 mmol) and dried tetrahydrofuran (130 mL). This solution was cooled to 0-10 °C using an ice-water bath for about 15 minutes and 2.5 M n-butyllithium in hexanes (20.500 mL, 51.250 mmol) was added slowly. The color of the solution changed from a clear light yellow to a clear dark yellow. After stirring for 4 hours, 2-iso-propoxy-4,4,5,5-tetramethyl-1,3,2-dioxaborolane (10.200 mL, 49.9967 mmol) was added slowly. The solution changed from a clear dark yellow to a murky light yellow color. The mixture was stirred for one hour at 0-10 °C before allowing the reaction to warm to room temperature and stir overnight. To the reaction mixture was added cold saturated aqueous sodium bicarbonate (110 mL). The aqueous phase was extracted with four 75-mL portions of dichloromethane. The organic phases were combined, washed with cold saturated aqueous sodium bicarbonate (290 mL), washed with brine (290 mL), then dried over anhydrous magnesium sulfate, and filtered by vacuum filtration. The filtrate was concentrated by rotary evaporation and placed under high vacuum to afford a crude product as a light yellow foam (13.76 g). The foam was slurried in acetonitrile (50 mL) and then allowed to stir for 30 min. at room temperature before isolating the white solids by vacuum filtration. The solids were washed with two 20-mL portions of cold acetonitrile and dried under high vacuum to afford 7.8165 g (62.7%) of the product as an off white solid.

$^1$H NMR (400 MHz, $CDCl_3$) δ7.93 (d, J=7.9 Hz, 2H), 7.93 (d, J=7.9 Hz, 2H), 7.84 (dd, J=2.6, 0.8 Hz, 1H), 7.45 (dd, J=2.5, 0.8 Hz, 1H), 7.06 (d, J=8.0 Hz, 2H), 7.05 (d, J=8.0 Hz, 2H), 7.02 (s, 1H), 7.00 (s, 1H), 5.00-4.96 (m, 1H), 2.81-2.69 (m, 5H), 2.62 (dt, J=11.2, 3.9 Hz, 1H), 1.72 (s, 2H), 1.67-1.62 (m, 1H), 1.42-1.34 (m, 18H), 1.27-1.05 (m, 8H), 1.21-1.06 (m, 1H), 1.04-0.92 (m, 1H), 0.83-0.77 (m, 9H). $^{13}$C NMR (101 MHz, $CDCl_3$) δ156.44, 145.68, 142.11, 142.01, 141.71, 141.68, 133.85, 130.95, 129.45, 121.25, 121.01, 119.57, 119.54, 119.23, 119.21, 109.70, 109.51, 101.27, 83.61, 61.20, 56.95, 38.30, 32.37, 31.88, 31.41, 31.36, 30.02, 29.48, 29.45, 25.02, 25.00, 24.75, 18.19, 16.22, 16.16.

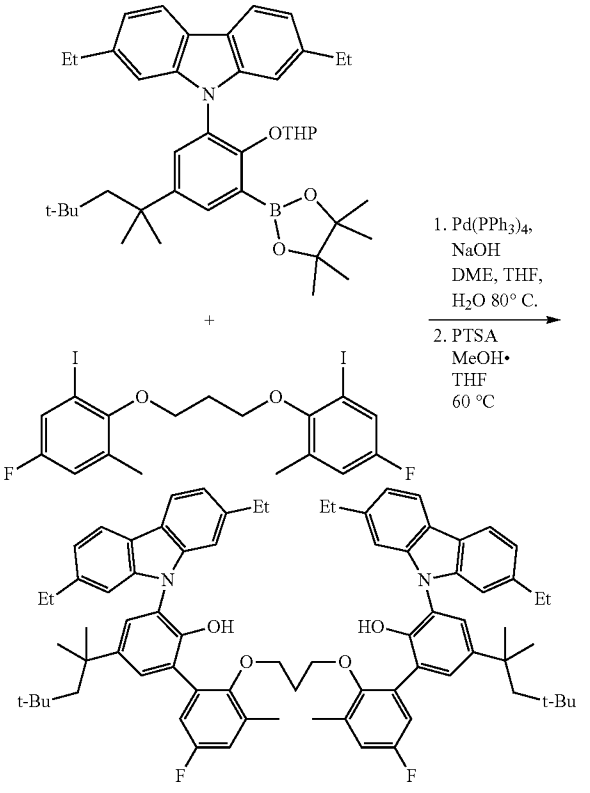

Preparation of 2',2'''-(propane-1,3-diylbis(oxy))bis(3-(2, 7-diethyl-9H-carbazol-9-yl)-5'-fluoro-3'-methyl-5-(2,4,4-trimethylpentan-2-yl)-[1, 1'-biphenyl]-2-ol): A three-necked round bottom flask was equipped with a magnetic stir bar, septa, a condenser, and a nitrogen gas inlet. The flask was charged with 2,7-diethyl-9-(2-((tetrahydro-2H-pyran-2-yl) oxy)-3-(4,4,5,5-tetramethyl-1,3,2-dioxaborolan-2-yl)-5-(2, 4,4-trimethylpentan-2-yl)phenyl)-9H-carbazole (3.6936 g 5.792 mmol), 1,2-dimethoxyethane (72 mL), a solution of NaOH (0.7647 g, 19.118 mmol) in water (21 mL), tetrahydrofuran (24 mL), and 1,3-bis(4-fluoro-2-iodo-6-methylphenoxy)propane (1.5002 g, 2.757 mmol). The mixture was purged with nitrogen for approximately 15 minutes, then tetrakis(triphenylphosphine)palladium(0) (0.2368 g, 0.2049 mmol) was added. The mixture was heated to reflux at 85 °C for 48 hours then allowed to cool to room temp. Once cooled, the ligand remained in solution. The mixture was transferred to a separatory funnel for a phase separation. The phases did not completely separate. Water (30 mL) was added to the mixture and the phase still did not completely separate. Dichloromethane (30 mL) was added to the mixture and four phases separated out. The organic phases were combined. The aqueous phases were combined and extracted with dichloromethane (30 mL). All the organic phases were combined, dried over magnesium sulfate, and filtered by vacuum filtration. The flask was washed with two 15-mL portions of dichloromethane and filtered into the filter flask containing the organic phase. The organic solution was concentrated by rotary evaporation to afford a reddish-brown oil (5.66 g) as a crude protected ligand. The ligand was analyzed by $^{1}$H NMR. The protected ligand was dissolved in a mixture of tetrahydrofuran (200 mL) and methanol (200 mL) then heated to 60 °C. To the solution was added p-toluene sulfonic acid (0.0556 g, 0.2922 mmol) and the reaction was stirred at 60 °C for 8 hours then allowed to cool to room temperature. The mixture was analyzed by $^{1}$H NMR to determine completion. The ligand was thought to be deprotected. The ligand was concentrated down to a brown sticky material (4.86 g) by rotary evaporation. The ligand would not recrystallize in room temperature acetonitrile (10 mL). The ligand was concentrated down to a brown sticky solid, dissolved in a small amount of dichloromethane, and run on a 220 Grace column on the Isco CombiFlash system using a gradient from 35-40% dichloromethane in hexanes until the ligand eluted. The fractions were analyzed by TLC (40% dichloromethane in hexanes) and the pure fractions were concentrated by rotary evaporation to afford 1.59 g of a light yellow solid. The fractions with a small impurity were also concentrated by rotary evaporation to afford 1.16 g of a light yellow solid. Both solids were analyzed by $^{1}$H NMR and were found not to be deprotected. The solids were combined and the deprotection was repeated. The ligand was dissolved in a mixture of tetrahydrofuran (200 mL) and methanol (200 mL) then heated to 60 °C. To the solution was added p-toluenesulfonic acid monohydrate (0.2864 g, 1.506 mmol) until the solution became acidic (pH=1-3). After 8 hours, the material was analyzed by $^{1}$H NMR to ensure deprotection was complete and was then cooled to room temperature. The material was concentrated down to a yellow sticky solid, dissolved in a small amount of dichloromethane and run on a 120 Grace column on the Isco CombiFlash system using a gradient from 35-40% dichloromethane in hexanes until the ligand eluted. The pure fractions were concentrated by rotary evaporation to afford 0.7084 g of a light yellow crystalline solid. The solid was analyzed by $^{1}$H NMR. The fractions with a small impurity were concentrated by rotary evaporation and dissolved a small amount of dichloromethane and run on a 220 Grace column on the Isco CombiFlash system using a gradient from 35-40% dichloromethane in hexanes. The pure fractions were concentrated by rotary evaporation to afford 1.3092 g of a light yellow crystalline solid. The solid was analyzed by $^{1}$H NMR. The overall yield was 2.0176 g (64.0%) of the product as a white crystalline solid.

$^{1}$H NMR (400 MHz, $CDCl_3$) δ7.98 (d, J=7.9 Hz, 4H), 7.43 (d, J=2.4 Hz, 2H), 7.41 (d, J=2.5 Hz, 2H), 7.07 (dd, J=8.0, 1.4 Hz, 4H), 6.98 (dd, J=8.9, 3.1 Hz, 2H), 6.88 (s, 4H), 6.81 (dd, J=8.6, 3.1 Hz, 2H), 6.56 (s, 2H), 3.65 (t, J=6.4 Hz, 4H), 2.65 (q, J=7.6 Hz, 8H), 1.94 (s, 6H), 1.77 (p, J=6.8 Hz, 2H), 1.73 (s, 4H), 1.37 (s, 12H), 1.17 (t, J=7.6 Hz, 12H), 0.79 (s, 18H). $^{13}$C NMR (101 MHz, $CDCl_3$) δ160.20, 157.78, 149.70, 149.68, 147.86, 143.01, 141.95, 141.85, 133.53, 133.44, 133.01, 132.93, 128.98, 127.92, 126.47, 126.45, 125.47, 121.40, 119.97, 119.79, 117.40, 117.18, 116.20, 115.97, 108.67, 70.80, 57.16, 38.20, 32.43, 31.81, 31.56, 30.62, 29.45, 16.30, 16.28, 16.03. [multiplicities due to carbon-fluorine coupling were not identified]. $^{19}$F NMR (376 MHz, $CDCl_3$) δ-118.04 (t, J=8.8 Hz). HRMS (ESI, $M+NH_4^+$): (m/z) calcd for $C_{77}H_{92}F_2N_3O_4$, 1160.705, found 1160.704.

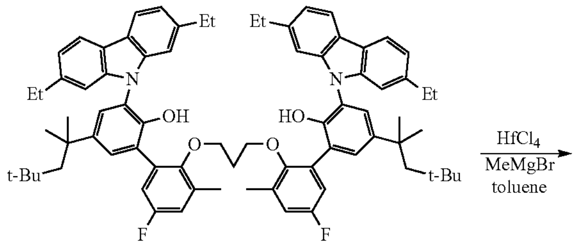

-continued

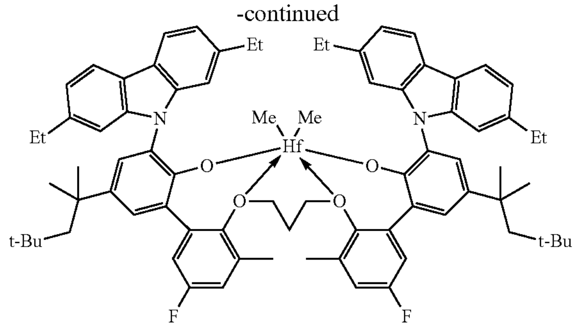

Preparation of Structure (iii): A jar was charged with $HfCl_4$ (0.1410 g, 0.4372 mmol) and toluene (27 mL). The slurry was cooled to −25 °C in the glove box freezer for 30 minutes. To the stirring cold slurry was added 3.0 M methylmagnesium bromide in diethyl ether (0.60 mL, 1.8 mmol). The mixture was stirred strongly for 2 minutes. The solid went in solution but the reaction solution was cloudy. To the solution was added the ligand (0.5000 g, 0.4372 mmol) as a solid. The vial containing the solid was rinsed with toluene (3.0 mL). The rinse solvent was added to the reaction mixture. After stirring for 2 hours, the brownish reaction mixture was filtered under vacuum using a fritted funnel. The cake was washed with two 5-mL portions of toluene. To the filtrate (transparent pale yellowish solution) was added hexanes (20 mL). The resulting cloudy solution was filtered and was concentrated under high vacuum to afford 0.5933 g (100.5%) of the product as a pale yellow solid. The excess yield was due to the presence of toluene that was difficult to remove.

$^1H$ NMR (400 MHz, $C_6D_6$) δ8.17 (d, J=7.9 Hz, 2H), 8.04 (d, J=7.9 Hz, 2H), 7.85 (d, J=2.5 Hz, 2H), 7.76 (s, 2H), 7.65 (s, 2H), 7.28-7.26 (m, 4H), 7.11 (dd, J=8.0, 1.5 Hz, 2H), 6.74 (dd, J=9.0, 3.2 Hz, 2H), 6.08 (dd, J=8.2, 3.2 Hz, 2H), 3.48 (dt, J=9.9, 4.8 Hz, 2H), 3.19 (dt, J=10.6, 5.5 Hz, 2H), 3.02-2.89 (m, 4H), 2.70-2.54 (m, 4H), 1.66 (d, J=14.6 Hz, 2H), 1.61 (d, J=14.6 Hz, 4H), 1.44 (t, J=7.6 Hz, 6H), 1.27 (m with and s, 8H), 1.22 (s, 6H), 1.19 (s, 6H), 1.13 (t, J=7.6 Hz, 6H), 0.86 (s, 18H), −0.70 (s, 6H). $^{13}C$ NMR (101 MHz, $C_6D_6$) δ161.59, 159.14, 153.64, 149.53, 149.50, 142.81, 142.46, 141.56, 141.32, 140.70, 135.72, 135.63, 135.00, 134.92, 130.50, 127.03, 123.94, 121.63, 120.90, 120.69, 120.44, 119.91, 118.02, 117.79, 117.52, 117.30, 113.22, 110.12, 76.13, 57.65, 49.77, 38.25, 32.66, 31.99, 30.97, 30.41, 30.27, 30.10, 17.14, 16.30, 16.20. [multiplicities due to carbon-fluorine coupling were not identified]. $^{19}F$ NMR (376 MHz, $C_6D_6$) δ−115.12 (d, J=8.7 Hz).

(Structure iii)

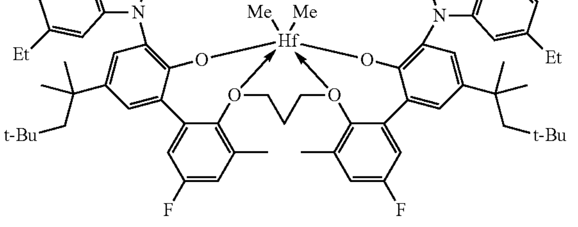

Biphenylphenol polymerization precatalyst of structure (iv) was prepared as follows.

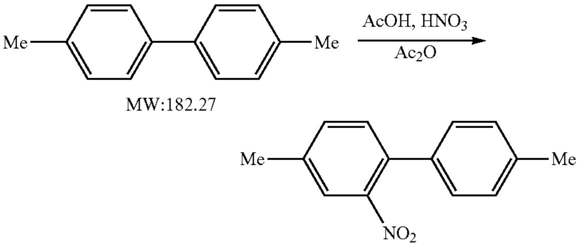

Preparation of 4,4'-dimethyl-2-nitro-1,1'-biphenyl: A three-necked round bottom flask was equipped with a magnetic stir bar, a thermowell, an addition funnel, and septa. The flask was placed under nitrogen atmosphere and was charged with 4,4'-dimethylbiphenyl (5.7972 g, 31.806 mmol) and acetic anhydride (170 mL, 1798.4 mmol). The solution was cooled via ice water bath (internal temperature 3.8 °C). A mixture of nitric acid (3.3 mL, 69.8 mmol) and acetic acid (5.3 mL, 92.5 mmol) was added dropwise continuously while monitoring the internal temperature, not to exceed 10 °C. The reaction was sampled by GC/MS after 10 minutes at 0-10 °C. The GC/MS showed conversion of the starting biphenyl to the product and the reaction was determined to be complete. At 25 minutes, the reaction mixture was poured into a beaker of ice water, mostly ice, (850 mL) and stirred for 1.5 hours. A yellow oil separated from the aqueous phase. The mixture was transferred to a separatory funnel, dichloromethane (127 mL) was added, and the phases were separated. The organic phase was washed with water (100 mL) and then washed with 1M aqueous sodium hydroxide (100 mL). The organic phase was dried over anhydrous magnesium sulfate, filtered by vacuum filtration, and concentrated by rotary evaporation to afford the product as a crude orange oil (10.8926 g). The oil was loaded onto the Isco CombiFlash system and run using a 330 g Grace column and a gradient of 15-20% dichloromethane in hexanes until product eluted. The fractions were analyzed by TLC. The pure fractions were combined, concentrated by rotary evaporation and dried under high vacuum to afford 5.07 g (70.1%) of the product as a yellow solid.

$^1H$ NMR (400 MHz, $CDCl_3$+TMS) δ7.62-7.58 (m, 1H), 7.36 (ddd, J=7.9, 1.8, 0.8 Hz, 1H), 7.28 (d, J=7.8 Hz, 1H), 7.22-7.15 (m, 4H), 2.42 (s, 3H), 2.36 (s, 3H). $^{13}C$ NMR (101 MHz, $CDCl_3$+TMS) δ149.10, 138.30, 137.76, 134.33, 133.25, 132.84, 131.59, 129.28, 127.68, 124.19, 21.11, 20.70.

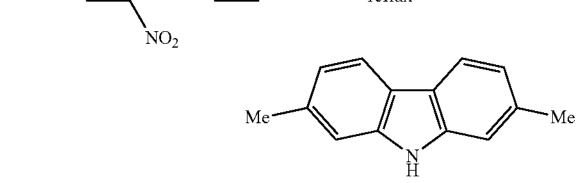

Preparation of 2,7-dimethyl-9H-carbazole: In a glove box, a three-necked round bottom flask equipped with a magnetic stir and septa was charged with 4,4'-dimethyl-2-nitro-1,1'-biphenyl (4.9855 g, 21.937 mmol) and triethylphosphite (22 mL, 128 mmol). In a fume hood, the flask was equipped with a condenser and a nitrogen gas inlet. The yellow slurry was placed under nitrogen atmosphere and was heated to reflux (175 °C heating mantle temperature) and sampled for GC/MS analysis. The yellow slurry eventually turned to a brown solution. After 2 hours, the GC/MS showed formation of the product with starting material remaining. After 5 hours, only traces of the starting material were observed and the reaction was determined to be complete. The reaction was allowed to cool to room temperature. A white crystalline precipitate was observed. The reaction mixture was stored in the freezer overnight. The white crystalline solid (crop 1) was collected by vacuum filtration, washed with cold ethanol (5×5.5 mL portions), and dried under high vacuum to afford 1.62 g of the product as a white crystalline solid. The filtrate was placed in the freezer over the weekend. A white crystalline precipitate was observed. The white crystalline solid (crop 2) was collected by vacuum filtration, washed with cold ethanol (5×5.5 mL portions), and dried under high vacuum to afford 0.62 g of the product as a white crystalline solid. The overall yield afforded was 2.24 g (52.2%) of the product as a white crystalline solid.

$^{1}$H NMR (400 MHz, DMSO-$d_6$) δ10.96 (s, 1H), 7.87 (d, J=7.9 Hz, 2H), 7.25 (s, 2H), 6.93 (d, J=7.9 Hz, 2H), 2.45 (s, 6H). $^{13}$C NMR (101 MHz, DMSO-$d_6$) δ140.23, 134.33, 120.32, 119.87, 119.47, 110.82, 21.67.

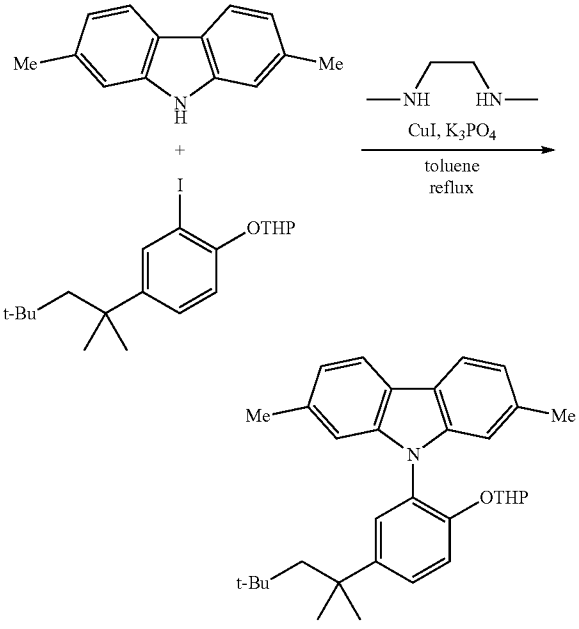

Preparation of 2,7-dimethyl-9-(2-((tetrahydro-2H-pyran-2-yl)oxy)-5-(2,4,4-trimethylpentan-2-yl)phenyl)-9H-carbazole (13) (201303282-6): A three-necked round bottom flask was equipped with a magnetic stir bar and septa. In a glove box, the flask was charged with 2-(2-iodo-4-(2,4,4-trimethylpentan-2-yl)phenoxy)tetrahydro-2H-pyran (6.9934 g, 16.797 mmol), 2,7-dimethyl-9H- carbazole (2.2032 g, 10.408 mmol), potassium phosphate tribasic (7.5577 g, 35.604 mmol), and dried toluene (25 mL). In a glove box, anhydrous copper iodide (0.0676 g, 0.3549 mmol) slurried in dried toluene (1 mL) and N,N-dimethylethylenediamine (0.1456 mL, 1.353 mmol) was added to the reaction mixture. In a fume hood, the flask was equipped with a condenser and nitrogen gas inlet. The reaction was placed under nitrogen atmosphere and was heated at 125 °C. (heating mantle temperature). After 24 hours, HPLC analysis showed formation of the product with starting carbazole remaining. Therefore, additional anhydrous copper iodide (0.0667 g, 0.3502 mmol) slurried in dried toluene (1 mL) and N,N-dimethylethylenediamine (0.1456 mL, 1.353 mmol mmol) was added. The reaction continued to stir at 125 °C for an additional 24 hours. After 48 hours, HPLC analysis showed little change in the consumption of the starting carbazole and at this point the reaction was stopped. The reaction was allowed to cool to room temperature. The reaction was filtered by vacuum filtration through a small silica plug. The plug was washed with tetrahydrofuran (3×50 mL portions), and the filtrate was concentrated by rotary evaporation to afford the product as a crude brown oil. The oil was dissolved in chloroform and silica gel was added. The slurry was concentrated by rotary evaporation to afford a dry powdery mixture. The powdery mixture was loaded onto the Isco CombiFlash system and was run using a gradient of 15-20% dichloromethane in hexanes until the product eluted. The fractions were analyzed by TLC. The pure fractions were combined and concentrated by rotary evaporation to afford a light yellow solid which was dried under high vacuum to remove solvent. The solid was analyzed by $^{1}$H NMR which showed the presence of some of the 2-(2-iodo-4-(2,4,4-trimethylpentan-2-yl)phenoxy)tetrahydro-2H-pyran starting material. The solid was recrystallized from hexanes to afford a white solid. The solid were collected by vacuum filtration and washed with cold hexanes (2×10 mL portions). To remove traces of hexanes, the solid was dissolved in dichloromethane and concentrated by rotary evaporation to afford a white crystalline solid (repeated twice). The solid was dried under high vacuum to afford 2.96 g (58.8%) of the product as a white crystalline solid.

$^{1}$H NMR (400 MHz, $CDCl_3$) δ8.01 (d, J=7.9 Hz, 2H), 7.54 (d, J=2.4 Hz, 1H), 7.50 (dd, J=8.7, 2.5 Hz, 1H), 7.39 (d, J=8.7 Hz, 1H), 7.11 (dd, J=7.9, 1.4 Hz, 2H), 7.08 (dt, J=1.5, 0.8 Hz, 1H), 7.01 (dt, J=1.6, 0.8 Hz, 1H), 5.35 (t, J=2.9 Hz, 1H), 3.80 (td, J=11.2, 2.9 Hz, 1H), 3.57 (dt, J=11.1, 3.4 Hz, 1H), 2.52 (s, 6H), 1.82 (s, 2H), 1.63-1.50 (m, 2H), 1.47 (s, 3H), 1.45 (s, 3H), 0.90 (s, 9H). $^{13}$C NMR (101 MHz, $CDCl_3$) δ150.91, 144.07, 141.90, 141.88, 134.94, 134.84, 127.68, 126.71, 126.05, 121.00, 120.85, 120.63, 120.60, 119.39, 119.30, 116.06, 110.82, 110.18, 96.67, 61.43, 57.00, 38.18, 32.39, 31.85, 31.60, 31.52, 29.95, 25.10, 22.05, 21.96, 17.57.

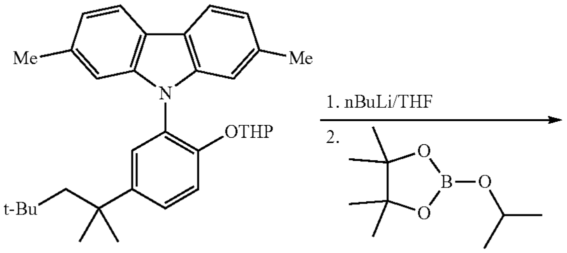

-continued

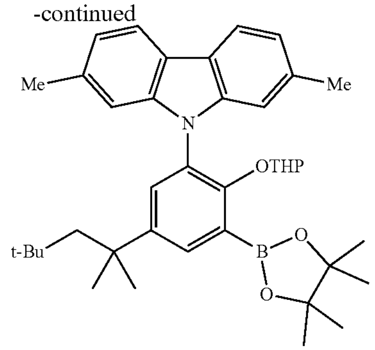

Preparation of 2,7-dimethyl-9-(2-((tetrahydro-2H-pyran-2-yl)oxy)-3-(4,4,5,5-tetramethyl-1,3,2-dioxaborol n-2-yl)-5-(2,4,4-trimethylpentan-2-yl)phenyl)-9H-carbazole (16) (201303282-23): A three-necked round bottom flask was equipped with a magnetic stir bar, septa, and a nitrogen gas inlet. The flask was placed under nitrogen atmosphere and was charged with 2,7-dimethyl-9-(2-((tetrahydro-2H-pyran-2-yl)oxy)-5-(2,4,4-trimethylpentan-2-yl)phenyl)-9H-carbazole (2.8580 g, 5.912 mmol) and dried tetrahydrofuran (40 mL). This solution was cooled to 0-10 °C. (ice-water bath) for about 15 minutes and 2.5 M n-butyllithium in hexanes (6.2 mL, 15.500 mmol) was added slowly. After stirring for 4 hours at 0-10 °C, 2-iso-propoxy-4,4,5,5-tetramethyl-1,3,2-dioxaborolane (3.1 mL, 15.195 mmol) was added slowly. The mixture was stirred for 1 hour at 0-10 °C before allowing the reaction to warm to room temperature and stir overnight. To the reaction mixture was added cold saturated aqueous sodium bicarbonate (40 mL). The aqueous phase was extracted with dichloromethane (4×20 mL). The organic phases were combined and washed with cold saturated aqueous sodium bicarbonate (90 mL) and then washed with brine (90 mL). The organic phase was dried over anhydrous magnesium sulfate, filtered by vacuum filtration, concentrated by rotary evaporation and then placed under high vacuum to afford the product as a crude white crystalline solid (3.8902 g). The crude was analyzed by $^1H$ NMR. The crude was slurried in acetonitrile (30 mL) and stirred 30 minutes at room temperature before isolating the white solids by vacuum filtration. The solids were washed with cold acetonitrile (2×10 mL portions). To remove traces of acetonitrile, the solid was dissolved in dichloromethane and concentrated by rotary evaporation to afford an off white crystalline solid (repeated twice). The solid was dried under high vacuum to afford 2.24 g (62.2%) of the product as an off white crystalline solid.

$^1H$ NMR (400 MHz, $CDCl_3$) δ7.96, (d, J=7.9 Hz, 1H), 7.95 (d, J=7.9 Hz, 1H), 7.88 (d, J=2.6 Hz, 1H), 7.45 (d, J=2.6 Hz, 1H), 7.08 (dd, J=8.0, 1.4 Hz, 1H), 7.07 (dd, J=8.0, 1.4 Hz, 1H), 7.01 (d, J=0.8 Hz, 1H), 4.99-4.95 (m, 1H), 2.77 (td, J=10.9, 3.0 Hz, 1H), 2.61 (dt, J=11.3, 4.0 Hz, 1H), 2.50 (s, 3H), 2.48 (s, 3H), 1.76 (s, 2H), ~1.73 (m, 1H), 1.43 and 1.42 (overlapping singlets, 15H), 1.40 (s, 3H), 1.40-1.00 (m's, 5H), 0.84 (s, 9H). $^{13}C$ NMR (101 MHz, $CDCl_3$) δ156.66, 145.86, 142.08, 141.96, 135.05, 134.09, 131.09, 129.45, 120.95, 120.68, 120.61, 119.15, 119.10, 110.80, 110.71, 101.55, 83.66, 61.18, 56.87, 38.29, 32.37, 31.87, 31.46, 31.36, 30.02, 25.05, 24.96, 24.72, 24.70, 22.10, 22.07, 18.23.

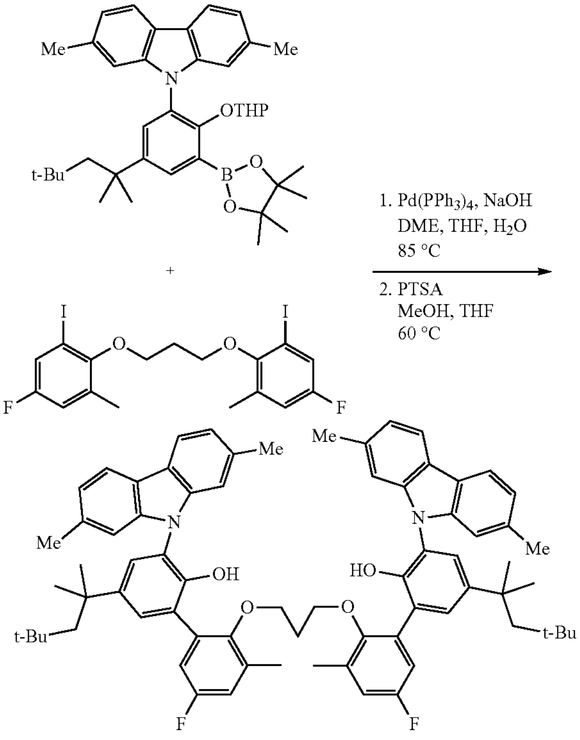

Preparation of 2',2'''-(propane-1,3-diylbis(oxy))bis(3-(2,7-dimethyl-9H-carbazol-9-yl)-5'-fluoro-3'-methyl-5-(2,4,4-trimethylpentan-2-yl)-[1,1'-biphenyl]-2-ol): A three-necked round bottom flask was equipped with a magnetic stir bar, septa, a condenser, and a nitrogen gas inlet. The flask was placed under nitrogen atmosphere and was charged with 2,7-dimethyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (2.1304 g, 3.494 mmol), 1,2-dimethoxyethane (44 mL), a solution of sodium hydroxide (0.4680 g, 11.700 mmol) in water (13 mL), tetrahydrofuran (15 mL), and 1,3-bis(4-fluoro-2-iodo-6-methylphenoxy)propane (0.9055 g, 1.664 mmol). The mixture was purged with nitrogen for approximately 15 minutes, then tetrakis(triphenylphosphine)palladium(0) (0.1373 g, 0.1188 mmol) was added. The mixture was heated to reflux at 85 °C for 20 hours and was analyzed by HPLC for completion. After 2 hours, the HPLC showed formation of the protected product and consumption of the bridge. After 20 hours, there was no change in the HPLC analysis and the reaction was determined to be complete. The reaction was allowed to cool to room temperature. Once cooled, the protected product remained in solution. The mixture was transferred to a separatory funnel for a phase separation. The phases were separated. The organic phase was dried over magnesium sulfate and filtered by vacuum filtration. The solids were washed with dichloromethane and the filtrate was concentrated by rotary evaporation to afford the protected product as a crude sticky golden orange solid (3.3180 g). The protected product was analyzed by $^1H$ NMR. The protected product was dissolved in a mixture of tetrahydrofuran (17.5 mL) and methanol (17.5 mL) then heated to 60 °C. To the solution was added p-toluenesulfonic acid monohydrate (0.0663 g, 0.3485 mmol). The reaction was stirred at 60 °C overnight and was analyzed by $^{19}F$ NMR for completion. The reaction was allowed to cool to room temperature. The solution was concentrated by rotary evaporation to afford the deprotected product as a crude golden orange sticky solid (2.8889 g). The solid was dissolved in chloroform and silica gel was added. The slurry was concentrated by rotary evaporation to afford a dry powdery mixture. The powdery mixture was loaded onto the Isco CombiFlash system and was run using a 330 Grace column and a gradient of 40-50% dichloromethane in hexanes until the product eluted. The fractions were analyzed by TLC. The pure fractions were combined and concentrated by rotary evaporation to afford an orange crystalline solid. To remove traces of hexanes, the solid was dissolved in dichloromethane and concentrated by rotary evaporation to afford an orange crystalline solid (repeated twice). The solid was dried under high vacuum to afford 1.35 g (74.9%) of the product as an orange crystalline solid.

$^{1}H$ NMR (400 MHz, $CDCl_3$) δ8.04 (d, J=7.9 Hz, 4H), 7.52 (d, J=2.4 Hz, 2H), 7.50 (d, J=2.4 Hz, 2H), 7.12 (dd, J=8.0, 1.4 Hz, 4H), 7.06 (dd, J=8.9, 3.1 Hz, 2H), 6.94 (s, 4H), 6.91 (dd, J=8.8, 2.9 Hz, 2H), 6.73 (s, 2H), 3.75 (t, J=6.4 Hz, 4H), 2.44 (s, 12H), 2.05 (s, 6H), 1.87 (p, J=6.3 Hz, 2H), 1.82 (s, 4H), 1.47 (s, 12H), 0.88 (s, 18H). $^{13}C$ NMR (101 MHz, $CDCl_3$) δ160.25, 157.82, 149.58, 149.55, 147.82, 143.12, 141.81, 135.32, 133.52, 133.43, 133.01, 132.92, 128.94, 127.97, 126.49, 125.52, 121.14, 121.09, 119.70, 117.44, 117.21, 116.21, 115.98, 109.87, 70.77, 57.12, 38.21, 32.42, 31.80, 31.55, 30.56, 22.07, 16.28. [multiplicities due to carbon-fluorine coupling were not identified]. $^{19}F$ NMR (376 MHz, $CDCl_3$) δ-118.04 (t, J=8.8 Hz).

minutes. To the stirring cold slurry was added 3.0 M methylmagnesium bromide in diethyl ether (0.14 mL, 0.42 mmol). The mixture was stirred strongly for 2 minutes. The solid went in solution but the reaction solution was cloudy. To the solution was added a solution of the ligand (0.1076 g, 0.0990 mmol) in toluene (2 mL). The vial containing the ligand solution was rinsed with toluene (2.0 mL). The rinse solvent was added to the reaction mixture. After stirring for 1.5 hours, the brownish reaction mixture was filtered under vacuum using a fitted funnel. The cake was washed with two 4-mL portions of toluene. To the filtrate (transparent pale yellowish solution) was added hexanes (10 mL). The resulting cloudy solution was filtered (syringe filter) and concentrated under high vacuum to afford 0.1097 g (85.7%) of the product.

$^{1}H$ NMR (400 MHz, $C_6D_6$) δ8.15 (d, J=8.0 Hz, 2H), 8.00 (dt, J=7.9, 0.5 Hz, 2H), 7.87 (d, J=2.5 Hz, 2H), 7.76-7.75 (m, 2H), 7.63 (dt, J=1.4, 0.7 Hz, 2H) 7.29-7.21 (m, 4H), 7.05 (ddd, J=7.9, 1.4, 0.6 Hz, 3H), 6.73 (ddd, J=9.0, 3.2, 0.7 Hz, 2H), 6.07 (ddd, J=8.2, 3.2, 0.8 Hz, 2H), 3.49 (dt, J=9.9, 4.9 Hz, 2H), 3.19 (ddd, J=10.6, 6.1, 5.1 Hz, 2H), 2.64 (s, 6H), 2.27 (s, 6H), 1.67 (d, J=14.5 Hz, 2H), 1.58 (d, J=14.5 Hz, 2H), 1.27 (broad s, 8H), 1.22 (s, 6H), 1.19 (t, J=0.7 Hz, 6H), 0.85 (s, 18H), -0.69 (s, 6H). $^{13}C$ NMR (101 MHz, $C_6D_6$) δ161.49, 159.04, 153.43, 149.47, 149.44, 142.21, 141.32, 140.70, 136.21, 135.59, 135.50, 134.90, 134.81, 134.47, 130.43, 126.91, 123.66, 121.99, 121.37, 120.55, 119.66, 118.07, 117.84, 117.52, 117.29, 114.42, 111.20, 76.10, 57.48, 49.01, 38.19, 32.57, 31.94, 31.66, 31.29, 30.19, 22.50, 22.13, 16.17, 1.38. [multiplicities due to carbon-fluorine coupling were not identified]

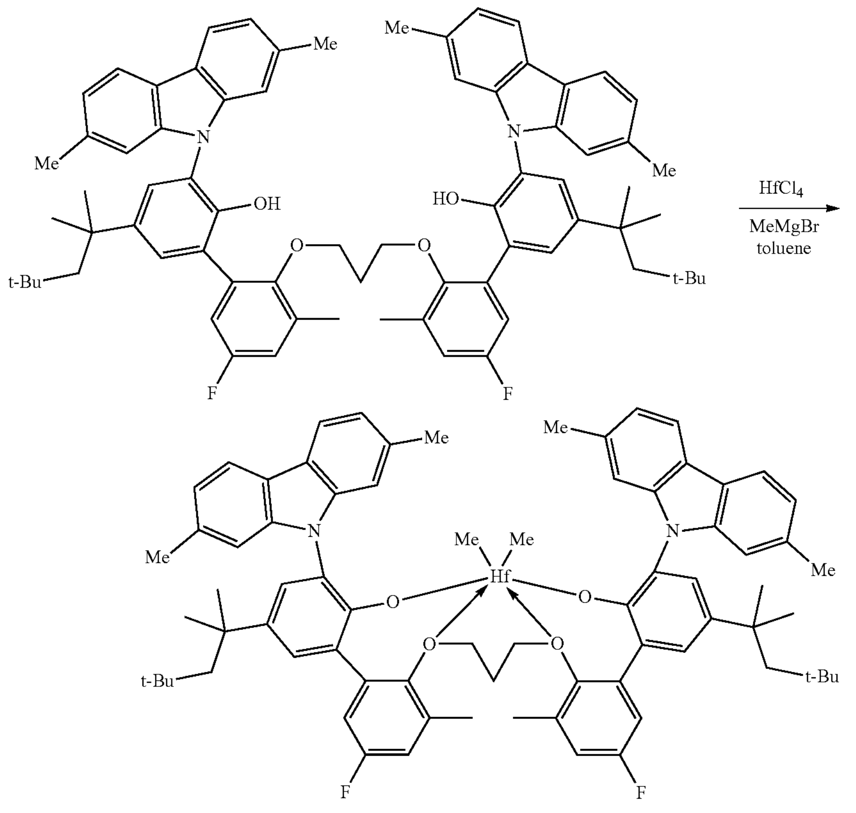

Preparation of Structure (iv): Reaction was set up in a glove box under nitrogen atmosphere. A jar was charged with $HfCl_4$ (0.0335 g, 1.046 mmol) and toluene (6 mL). The slurry was cooled to −25 °C in the glove box freezer for 30

(Structure iv)

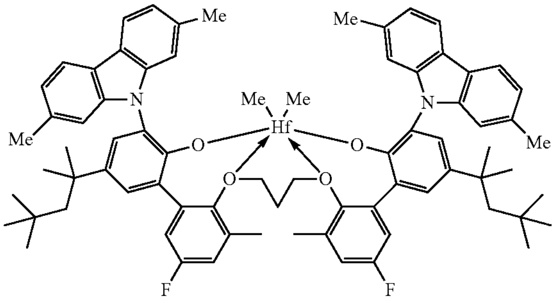

Biphenylphenol polymerization precatalyst of structure (v) was prepared as follows.

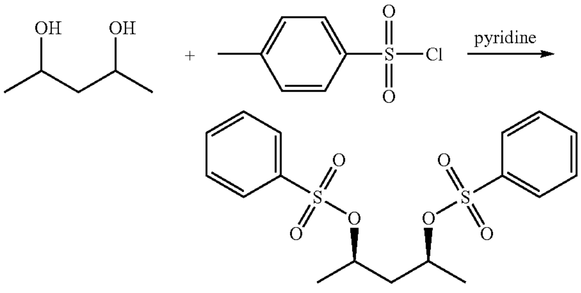

Preparation of meso-pentane-2,4-diyldibenzenesulfonate: A 250-mL three-necked round-bottomed flask was equipped with two septa, stir bar and placed under nitrogen. The flask was charged with 2,4-pentanediol (7.5 mL, 69.1 mmol) and pyridine (110 mL, this pyridine was placed over molecular sieves 3A prior to use). The colorless solution was cooled to about 0 °C. (ice-water bath). p-Toluenesulfonyl chloride (39.5903 g, 0.2077 mol) was added in portions over a 10 minutes period. The solution turned yellow. The ice bath was removed and the mixture was allowed to stir overnight. After stirring overnight, the reaction mixture was poured into 550 mL of ice-water and stirred for 3 hours. The white precipitate was collected by vacuum filtration. The solids were washed with two 50-mL portions of water. The solids were left to air dried. $^1$H-NMR of the crude showed about 1:1 ratio of meso:rac isomers based on the intergration of the sextets at 4.57 and 4.70 ppm. The crude bis-tosylate (23.8423 g) was obtained as a white solid. The solid was transferred to a jar and diethyl ether was added (50 mL). The mixture was stirred vigorously for 10 minutes. The solid was isolated by vacuum filtration. The cake was washed with two 10-mL portions of diethyl ether. This extraction procedure was repeated three more times. The collected white solid was left air dried. $^1$H-NMR of the solid showed that it was not enriched in the meso isomer. Therefore, the solid was suspended in diethyl ether (240 mL) and left to stir strongly overnight. The solid was filtered and small sample was analyzed by $^1$H-NMR. The spectra showed ~2:1 meso to rac ratio. Therefore, the solid was suspended in diethyl ether (240 mL) and left to stir strongly overnight. This procedure was repeated two times. Then, after stirring strongly for another 66 hours, the solid was filtered and small sample was analyzed by $^1$H-NMR. The spectra showed a ratio of about 6:1 meso:rac. The solid was left under high vacuum to remove the diethyl ether to afford 10.08 g (35.3%) of the meso-enriched bis tosylate as a white solid.

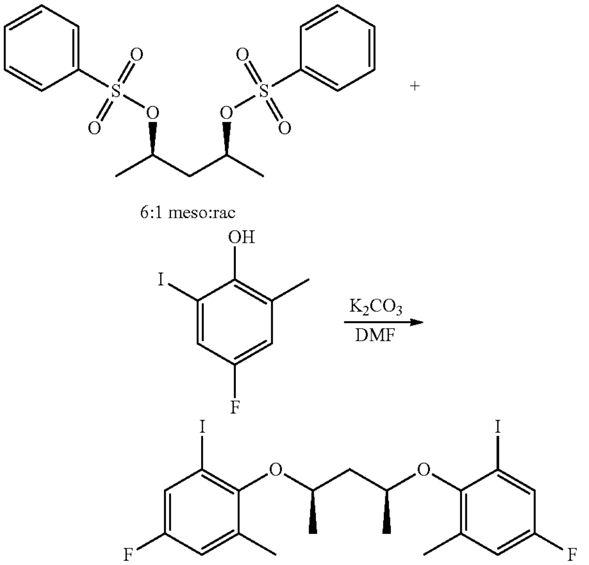

Preparation of 2,2'-(((meso)-pentane-2,4-diyl)bis(oxy))bis(5-fluoro-1-iodo-3-methylbenzene): A 250-mL round-bottomed flask was equipped with a condenser, two septa, magnetic stir bar and a gas inlet on top of the condenser. The flask was charged with meso-pentane-2,4-diyldibenzenesulfonate (3.0041 g, 7.2823 mmol), 4-fluoro-2-iodo-6-methylphenol (3.6751 g, 14.582 mmol) [prepared as described in US20150291713A1], potassium carbonate (4.0220 g, 29.101 mmol) and N,N-dimethylformamide (55 mL). The reaction was placed under nitrogen and heated to 100 °C. After heating for 2 hours, the brown mixture was sample for GC/MS analysis which showed peak corresponding to molecular weight fragment of the product and the starting phenol appear to be consumed. The reaction mixture was allowed to cool to room temperature and concentrated on the roto-evaporator (bath temperature 25-70 °C) to afford a wet brown solid. The solid was partitioned between dichloromethane (50 mL) and water (50 mL). The phases were separated. The aqueous phase was extracted with three 30-mL portions of dichloromethane. The combined organic phases were washed with 1M aqueous sodium hydroxide (60 mL), water (60 mL) and saturated aqueous sodium chloride (60 mL). The organic phase was dried over anhydrous magnesium sulfate, filtered and concentrated under vacuum to afford 4.02 g of a brown oil. The oil was chromatographed using a 120 g Grace column and automated ISCO instrument. The column was eluted with a gradient of 0-2% ethyl acetate in hexanes. Fractions containing the product were identified by a combination of TLC and GC/MS. The fractions were combined and concentrated under high vacuum to afford the product (2.2653 g, 54.4%) as a yellow oil.

$^1$H NMR (400 MHz, $CDCl_3$) δ7.32 (m, 2H), 6.86 (m, 2H), 4.69 (m, 2H), 2.48 (m, 1H), 2.28 (s, 6H), 2.27 (s, 1H), 1.96 (m, 1H), 1.31 (d, 6H), 1.27 (d, 1H).

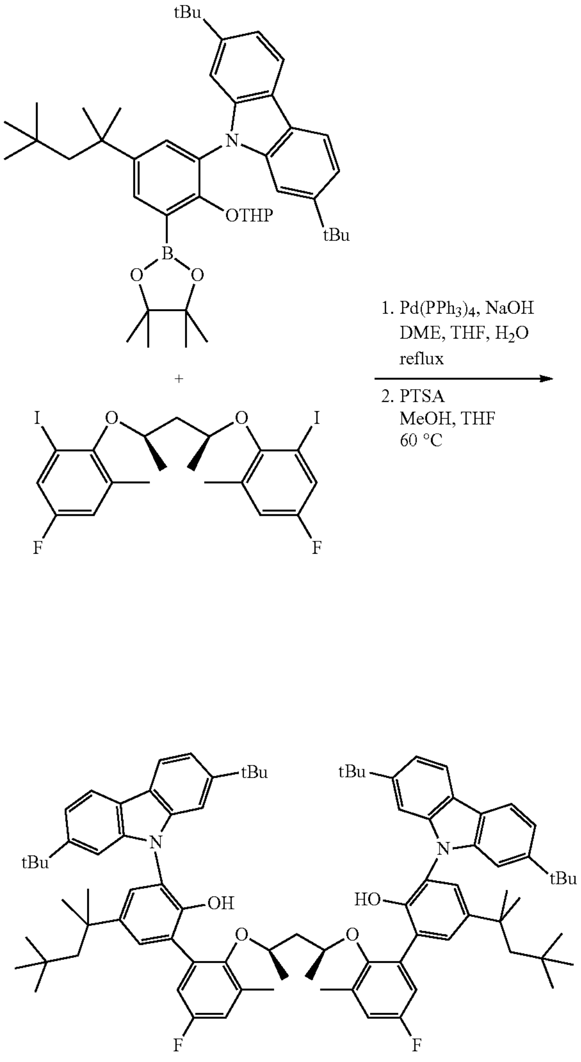

Preparation of 2',2'''-(((meso)-pentane-2,4-diyl)bis(oxy))bis(3-(2,7-di-tert-butyl-9H-carbazol-9-yl)-5'-fluoro-3'-methyl-5-(2,4,4-trimethylpentan-2-yl)[1,1'-biphenyl]-2-ol): To 1,2-dimethoxyethane (125 mL) was added 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (5.20 g, mmol) (described in the synthesis of structure (iv)) (allow to warm to room temp.), 2,2'-(((meso)-pentane-2,4-diyl)bis(oxy))bis(5-fluoro-1-iodo-3-methylbenzene) (2.037 g, mmol), a solution of NaOH (0.8994 g, mmol) in water (30 mL), and THF (70 mL). Everything went into solution prior to the addition of NaOH. The reaction mixture was sparged with N2 for about 15 minutes then Pd(PPh3)4 was added and heated to 85 °C overnight then cooled. $^{19}F$ NMR spectroscopy was used to determine if the reaction was complete. The reaction was concentrated with the residue taken up in methylene chloride (200 mL), washed with brine (200 mL), dried over anhydrous magnesium sulfate, filtered through a pad of silica gel and concentrated to afford crude protected ligand. To the crude protected ligand was added THF (50 mL), methanol (50 mL) and approximately 100 mg of PTSA. PTSA is added until the solution is acidic (pH paper). The solution was heated to 60 °C overnight then cooled and concentrated. The crude ligand was taken up in methylene chloride (100 mL), washed with brine (100 mL), dried with anhydrous magnesium sulfate, filtered through a pad of silica gel then concentrated to afford the ligand as a brown crystalline powder. This ligand showed traces of impurities so it was run through a 330 g ISCO column using methylene chloride: hexanes gradient to produce 1.92 g of white crystals. There was a small overlap between an impurity and the desired product so the impure fractions were run through the ISCO using the same conditions on a 330 g column.

$^1H$ NMR (400 MHz, $CDCl_3$) δ8.01 (dd, 4H), 7.41 (dd, 4H), 7.30 (dd, 4H), 7.04 (dd, 4H), 6.99 (dd, 2H), 6.79 (dd, 2H), 6.49 (br s, 2H), 3.96 (br s, 2H), 1.94 (s, 6H), 1.74 (s, 4H), 1.37 (d, 12H), 1.29 (s, 36H), 0.85 (d, 6H), 0.80 (s, 18H). $^{19}F$ NMR (376 MHz, $CDCl_3$) δ−118.66 (s)

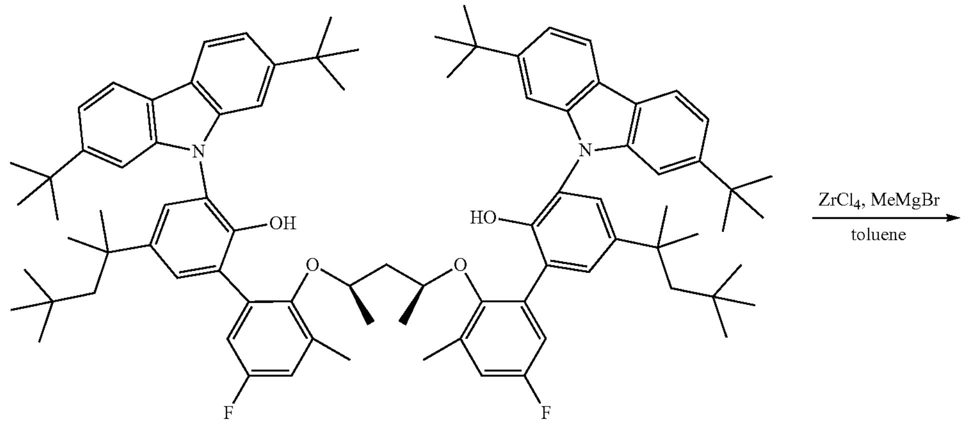

-continued

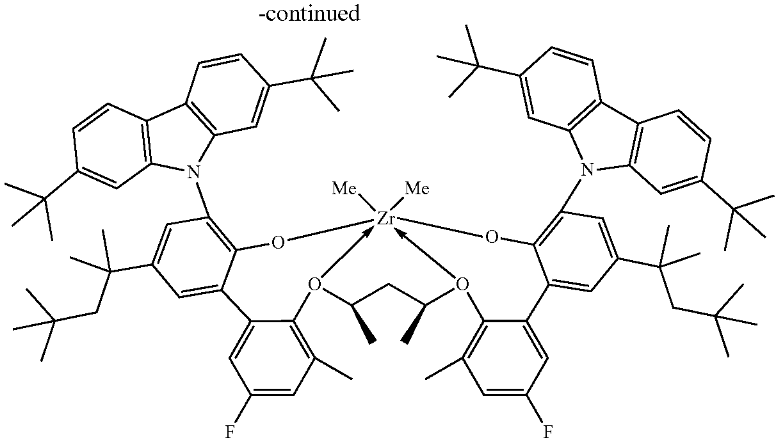

To a jar equipped with a stir bar in a nitrogen-purged glovebox was added $ZrCl_4$ (0.0399 g, 0.171 mmol) and toluene (10 mL). The resulting slurry was cooled in a glovebox freezer at −25 °C. To the stirring cooled slurry was added methylmagnesium bromide in diethyl ether (3.0 M, 0.25 mL, 0.75 mmol). The mixture was vigorously stirred for about 4 minutes. The solid went into solution and the mixture turned to a light brown color. To this mixture was then added the ligand (0.2007 g, 0.1561 mmol) as a solid. The resulting mixture was stirred at ambient temperature for 5 hours. To the mixture was then added hexane (10 mL) and the mixture was filtered. The solution was concentrated under vacuum to afford 0.2248 g of the structure v product as a white solid. Some residual solvent remained in the final product.

(Structure v)

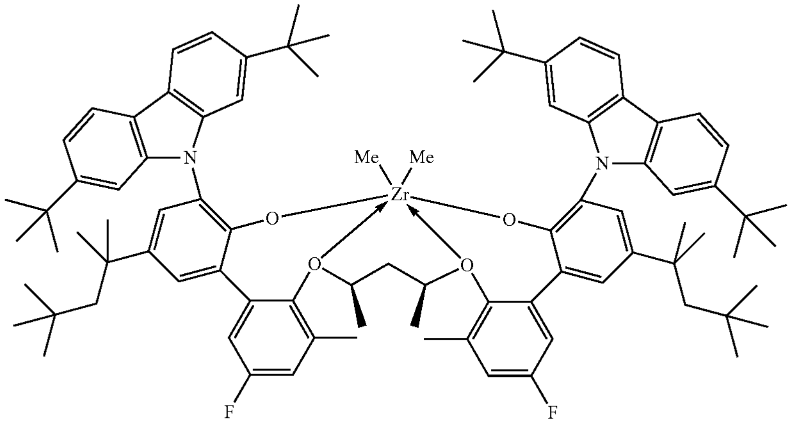

Biphenylphenol polymerization precatalyst of structure (vi) was prepared as described in WO 2017/004462 A1, and the entire contents of WO 2017/004462 A1 are incorporated herein by reference.

(Structure vi)
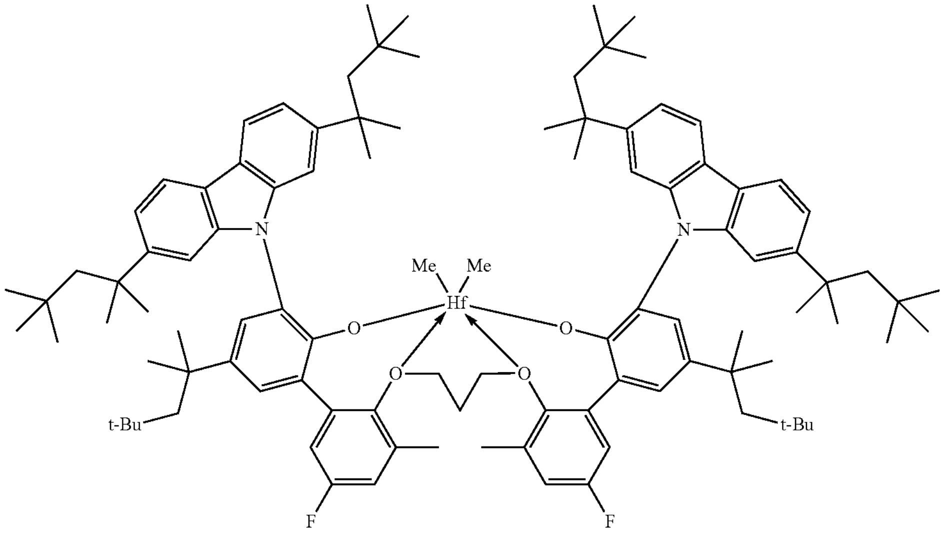
Biphenylphenol polymerization precatalyst of Structure (vii) was prepared as follows. The ligand was prepared as described in as described in WO 2017/004462 A1.
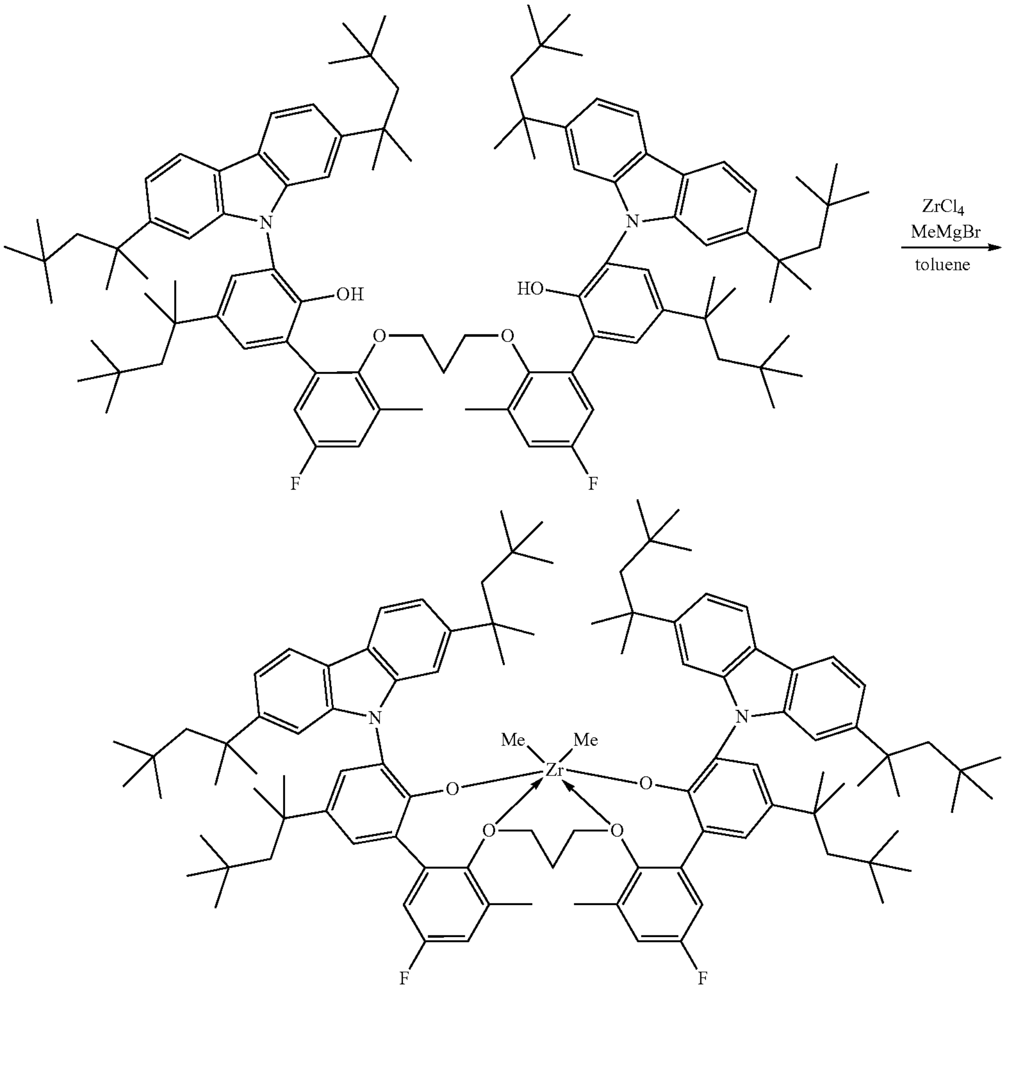

Reaction was set up in a glove box under nitrogen atmosphere. A jar was charged with $ZrCl_4$ (0.0333 g, 0.1429 mmol) and toluene (10 mL). The slurry mixture was cooled to −25 °C in the glove box freezer. To the stirring slurry cool mixture was added 3.0 M methylmagnesium bromide in diethyl ether (0.22 mL, 0.66 mmol). The mixture was stirred strongly for about 4 minutes. The solid went in solution and it turned brown. To the mixture was added the ligand (0.2002 g, 0.1353 mmol) as a solid. The resulting mixture was stirred at room temperature for 4 hours. To the mixture was then added hexane and filtered. The solution was concentrated under vacuum to afford 0.1942 g (theorical yield:0.2164; 90%) of the product as an off-white solid. Product was further purified. To the solid was added hexanes and then toluene until most of the solid dissolved. The mixture was filtered (syringe filter Whatman 0.45 μL) and solution was concentrated to afford the product.

$^1H$ NMR (400 MHz, $C_6D_6$) δ8.10 (d, 2H), 7.99 (d, 2H), 7.81 (br s, 2H), 7.76 (br, 4H), 7.41 (d, 2H), 7.32 (d, 2H), 7.27 (d, 2H), 6.85 (dd, 2H), 6.08 (dd, 2H), 3.38 (m, 2H), 3.20 (m, 2H), 1.83 (d, 2H), 1.56 (m, 18H), 1.36 (d, 12H), 1.23 (br s, 9H), 1.16 (s, 12H), 1.05 (br m, 6H), 0.93 (s, 18H), 0.81 (s, 18H), 0.59 (s, 18H), -0.55 (s, 6H).

(Structure vii)

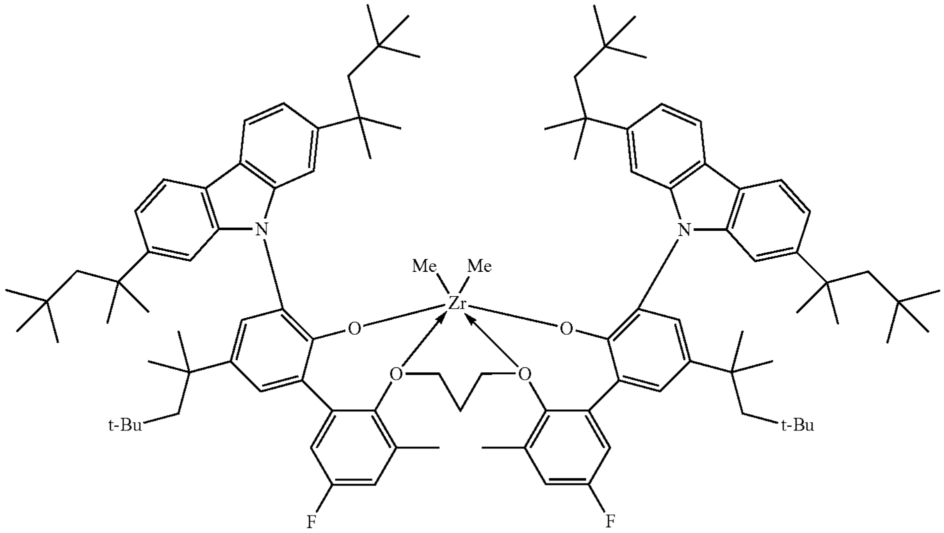

Biphenylphenol polymerization precatalyst of Structure (viii) was prepared as described in WO2017/004456 A1, and the entire contents of WO2017/004456 A1 are incorporated herein by reference.

(Structure viii)

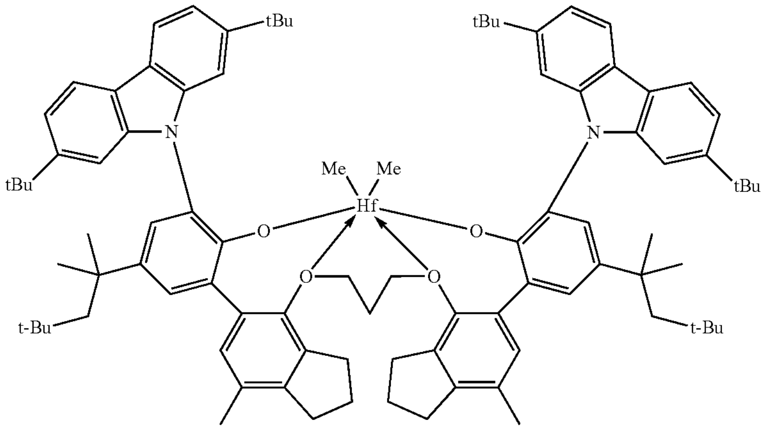

Biphenylphenol polymerization precatalyst of structure (ix) was prepared as follows.

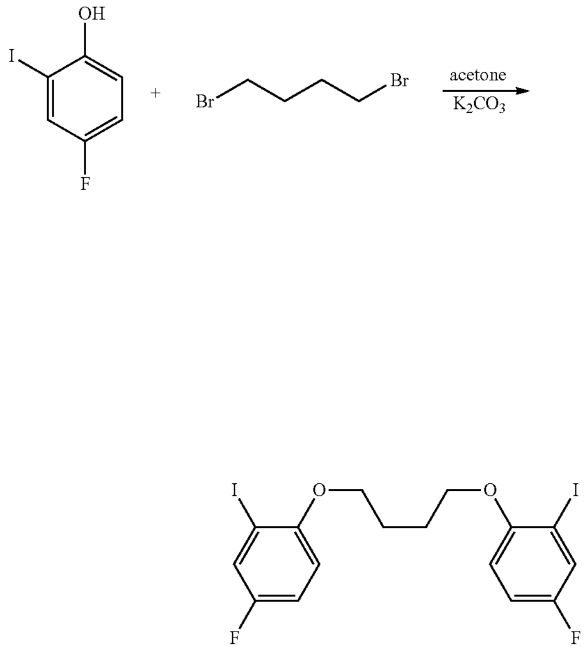

2-Iodo-4-fluorophenol, 1,4-dibromobutane, $K_2CO_3$, and 100 mL of acetone were placed in a 250 mL flask equipped with a stir bar and condenser. The reaction mixture was stirred and refluxed overnight (60 °C) and checked by GC and GCMS. Both analyses showed reaction completeness so the mixture was cooled, filtered through a pad of silica gel, and concentrated by rotary evaporation. The residue was recrystallized from hot acetone to yield 7.137 g of white crystals. The filtrate was recrystallized to produce 0.6 g of the total mass although it did have an orange tint to it and was 98% pure with a few impurities.

$^1H$ NMR (400 MHz, $CDCl_3$) δ7.49 (dd, 2H), 7.00 (m, 2H), 6.75 (dd, 2H), 4.07 (m, 4H), 2.09 (m, 4H).

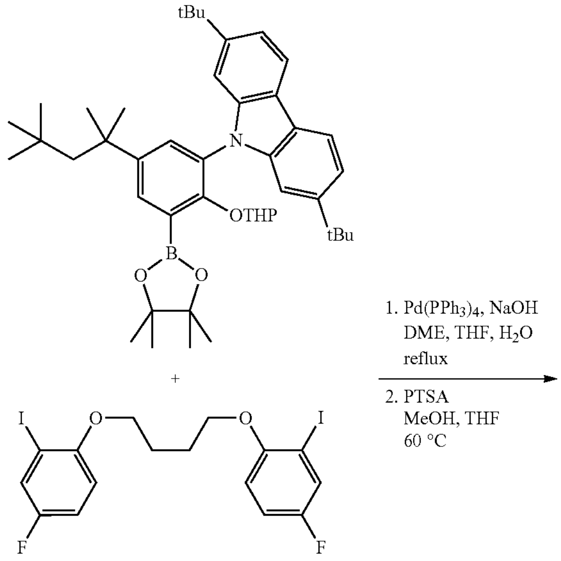

-continued

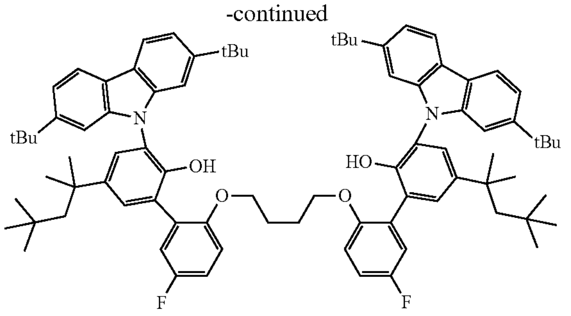

Preparation of 6',6'''-(butane-1,4-diylbis(oxy))bis(3-(2,7-di-tert-butyl-9H-carbazol-9-yl)-3'-fluoro-5-(2,4,4-trimethyl-pentan-2-yl)[1,1'-biphenyl]-2-ol): To 45 mL of DME was added 2.69 g (3.58 mmol) of 2,7-di-tert-butyl-9-(2-((tetra-hydro-2H-pyran-2-yl)oxy)-3-(4,4,5,5-tetramethyl-1,3,2-di-oxaborolan-2-yl)-5-(2,4,4-trimethylpentan-2-yl)phenyl)-9H-carbazole (prepared as described in US20150291713A1), 0.901 g (1.70 mmol) of 1,4-bis(4-fluoro-2-iodophenoxy)butane, 0.45 g (11.25 mmol) of NaOH, 13 mL of water and 13 mL of THF. The system was sparged with $N_2$ and then 130 mg of $Pd(Ph_3)_4$ was added and heated to 85 °C for 48 hours then cooled and concentrated. Upon cooling the protected ligand precipitated from the solution so it was isolated by vacuum filtration and dried further under high vacuum for about an hour to give crude ligand as a gray powder. This ligand was used as such on the next step. To the crude protected ligand was added 100 mL of 1:1 methanol/THF and approximately 100 mg of PTSA. The solution was heated to 60 °C for 8 hours then cooled and concentrated. The residue was taken up in methylene chloride (200 mL), washed with brine (200 mL), dried over anhydrous magnesium sulfate, filtered through a pad of silica gel then concentrated to afford a yellow powder. This compound was purified by flash chromatography using an ISCO purification system eluting with 2% ethyl acetate in hexanes to afford 1.70 g (54.4%) of pure compound as a white powder

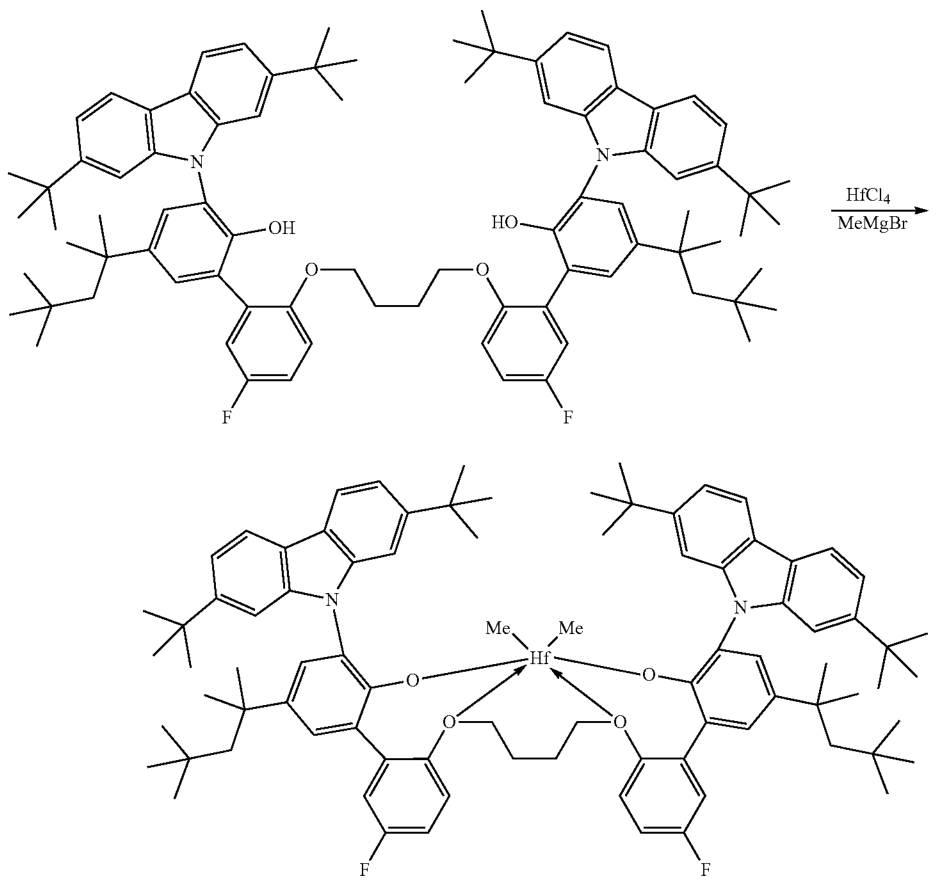

To a jar equipped with a stir bar in a nitrogen-purged glovebox was added $HfCl_4$ (0.0795 g, 0.248 mmol) and toluene (15 mL). The resulting slurry was cooled in a glovebox freezer at −25 °C. To the stirring cooled slurry was added methylmagnesium bromide in diethyl ether (3.0 M, 0.34 mL, 1.02 mmol). The mixture was vigorously stirred for about 4 minutes. The solid went into solution and the mixture turned to a pale yellow color. To this mixture was then added the ligand (0.3007 g, 0.237 mmol) as a solid. The resulting mixture was stirred at ambient temperature for 2.5 hours. To the mixture was then added hexane (15 mL) and the mixture was filtered. The light yellow solution was concentrated under vacuum to afford 0.3866 g of the product as a brown solid. To the solid was added hexanes (10 mL) and the mixture was stirred for 2.5 hours at room temperature. The solid was then collected by filtration. The solid was dried under vacuum to afford 0.3280 g of the structure ix product as an off-white solid (yield=93.8%).

(Structure ix)

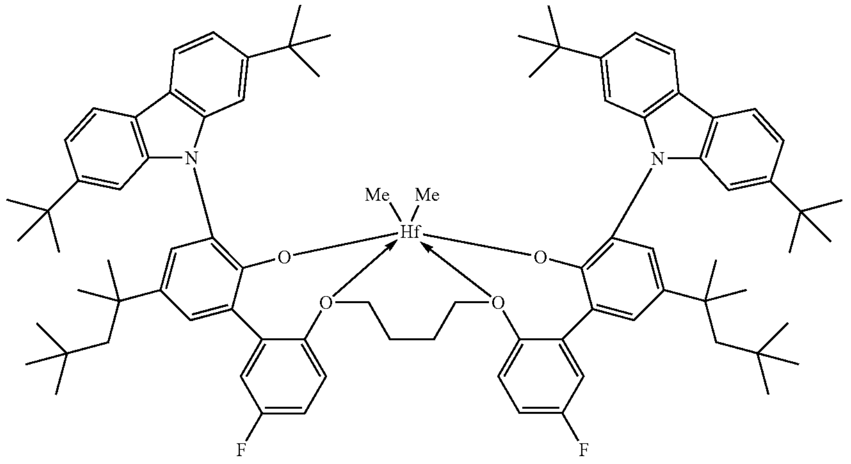

Biphenylphenol polymerization precatalyst of structure (x) was prepared as described in WO2017/058858, and the entire contents of WO2017/058858 are incorporated herein by reference as follows.

(Structure x)

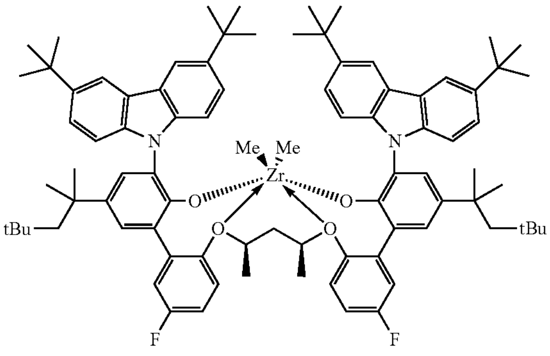

Biphenylphenol polymerization precatalyst of structure (xi) was prepared as described in WO2017/058858, and the entire contents of WO2017/058858 are incorporated herein by reference.

Biphenylphenol polymerization precatalyst of structure (xiii) was prepared as follows.

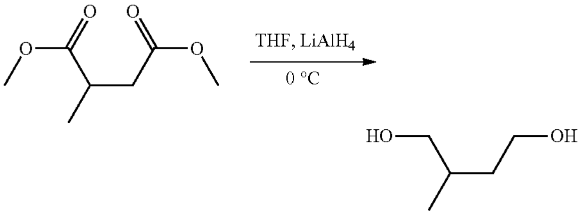

Synthesis of 2-methylbutane-1,4-diol: In a nitrogen filled glovebox, a three-necked round bottom flask equipped with a stir bar and septa was charged with 2.0 M lithium aluminum hydride in tetrahydrofuran (109 mL, 217.72 mmol) and tetrahydrofuran (240 mL). The flaks was sealed and was taken out of the glovebox to the hood. The flaks was equipped with a nitrogen gas inlet. The solution was cooled to 0 °C. (ice water bath). A solution of dimethyl 2-methylsuccinate (9.00 g, 56.19 mmol) in tetrahydrofuran (70 mL) was added slowly via syringe to the cooled solution. The resulting mixture was stirred for 17 hours at room tempera- (Structure xi)

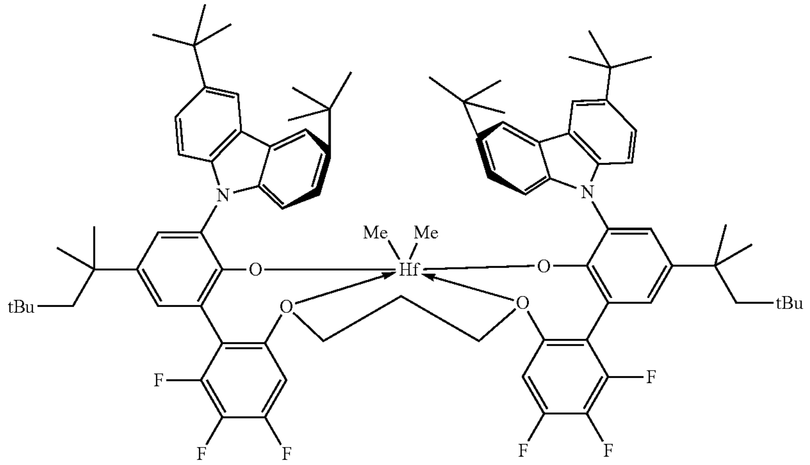

Biphenylphenol polymerization precatalyst of structure (xii) was prepared as described in U.S. Pat. No. 8,609,794, and the entire contents of U.S. Pat. No. 8,609,794 are incorporated herein by reference.

(Structure xii)

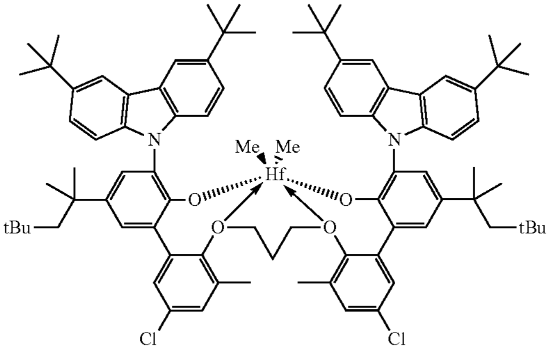

ture. The mixture was cooled to 0 °C. (ice water bath) and the excess lithium aluminum hydride was quenched by successive addition of water (4.1 mL), 10% aqueous sodium hydroxide solution (8.4 mL), and water (12.6 mL). The mixture was then stirred for 3 hours at room temperature, filtered. The solids were washed with diethyl ether. The filtrate was dried over magnesium sulfate, filtered, and concentrated by rotary evaporation to afford a crude yellow oil with precipitates. The oil was dried under high vacuum to afford 3.41 g (58.3%) of the product as a yellow oil with precipitates.

$^1H$ NMR (400 MHz, Chloroform-d) δ4.69 (p, J=5.1 Hz, 1H), 3.70 (dq, J=9.5, 5.0 Hz, 0H), 3.60 (tt, J=7.6, 4.3 Hz, 0H), 3.48 (dt, J=9.8, 4.6 Hz, 0H), 3.37 (ddd, J=10.7, 7.1, 3.6 Hz, 0H), 1.76 (heptd, J=6.8, 5.0 Hz, 0H), 1.62 (dddd, J=14.6, 8.0, 6.6, 5.6 Hz, 0H), 1.48 (dtd, J=14.1, 6.0, 5.2 Hz, 0H), 0.91 (d, J=6.8 Hz, 1H). $^{13}C$ NMR (101 MHz, Chloroform-d) δ67.62, 60.34, 37.00, 33.53, 16.98.

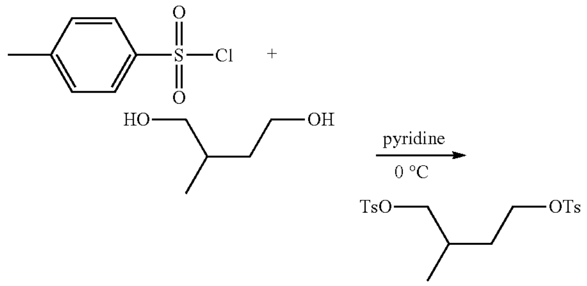

Synthesis of 2-methylbutane-1,4-diyl bis(4-methylbenzenesulfonate): A three-necked round bottom flask equipped with a stir bar, septa, and a nitrogen gas inlet was charged with p-toluenesulfonyl chloride (15.06 g, 78.99 mmol) and anhydrous pyridine (26 mL). The solution was cooled to 0 °C. (ice water bath). A solution of 2-methylbutane-1,4-diol (3.41 g, 32.70 mmol) in anhydrous pyridine (6.5 mL) was dropwise added via syringe. The resulting mixture was stirred for 5 hours at 0 °C. (ice water bath). The reaction was poured into a beaker of stirred ice water (65 mL) forming a thick peach colored oil phase at the bottom. The phases were separated. The aqueous phase was extracted with dichloromethane (3x65 mL portions). The combined organic phase was washed with water (25 mL), 10 wt. % sulfuric acid (25 mL), 1 M sodium carbonate, then water (25 mL). The organic phase was dried over magnesium sulfate, filtered, and concentrated by rotary evaporation to afford a crude peach oil with precipitates. To remove excess pyridine, the oil was dissolved in dichloromethane, washed with 10 wt. % sulfuric acid (25 mL), then water (25 mL). The organic phase was dried over magnesium sulfate, filtered, and concentrated by rotary evaporation to afford a crude peach oil with precipitates. The oil was dried under high vacuum to afford 8.89 g (65.9%) of the product as a peach oil with precipitates. $^1$H NMR (500 MHz, Chloroform-d) δ7.75 (dt, J=8.4, 2.0 Hz, 4H), 7.35 (d, J=7.9 Hz, 4H), 4.08-3.94 (m, 2H), 3.87-3.74 (m, 2H), 2.44 (s, 6H), 1.92 (h, J=6.5 Hz, 1H), 1.79-1.69 (m, 1H), 1.51-1.42 (m, 1H), 0.85 (dd, J=6.8, 1.6 Hz, 3H).

$^{13}$C NMR (126 MHz, Chloroform-d) δ144.81, 144.79, 132.62, 132.56, 129.77, 127.64, 73.88, 67.75, 31.57, 29.27, 21.46, 15.70.

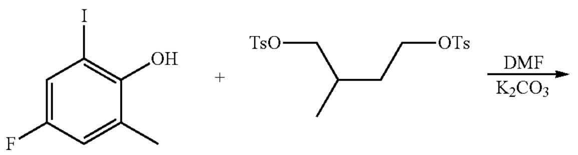

-continued

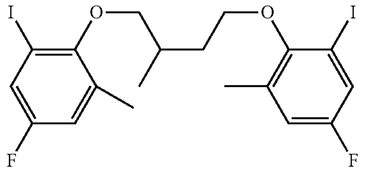

Synthesis of 2,2'-((2-methylbutane-1,4-diyl)bis(oxy))bis (5-fluoro-1-iodo-3-methylbenzene): A three-necked round bottom flask equipped with a stir bar, septa, a condenser, and a nitrogen gas inlet was charged with 2-methylbutane-1,4-diyl bis(4-methylbenzenesulfonate) (3.00 g, 7.27 mmol), 4-fluoro-2-iodo-6-methylphenol (3.67 g, 14.56 mmol, preparation published on US2015/0291713A1), anhydrous potassium carbonate (4.02 g, 29.08 mmol), and N,N-dimethylformamide (58 mL). The mixture was stirred at 100 °C for 5 hours and was then allowed to cool to room temperature. The mixture was concentrated by rotary evaporation to dryness. The residue was taken up in 50:50 dichloromethane: water (30 mL). The phases were separated. The aqueous phase was extracted with dichloromethane (3×30 mL portions). The combined organic phase was washed with 2N aqueous sodium hydroxide solution (115 mL), water (115 mL), then brine (115 mL). The organic phase was dried over magnesium sulfate, filtered, and concentrated by rotary evaporation to afford a crude reddish-brown oil (4.12 g). The oil was dissolved in a minimal amount of hexanes and was purified by flash column chromatography (ISCO, 220 g silica gel, 5-10% dichloromethane in hexanes). The fractions containing the product were combined and concentrated by rotary evaporation to afford a thick yellow oil. To remove traces of hexanes, the oil was dissolved in dichloromethane and concentrated by rotary evaporation to afford a thick yellow oil (repeated twice). The oil was dried under high vacuum to afford 2.55 g (61.3%) of the product as a thick yellow oil. $^1$H NMR (400 MHz, Chloroform-d) δ7.30 (ddd, J=7.5, 3.1, 0.7 Hz, 2H), 6.86 (ddt, J=8.7, 3.1, 0.7 Hz, 2H), 3.96 (t, J=6.6 Hz, 2H), 3.79-3.71 (m, 2H), 2.44-2.34 (m, 1H), 2.32 (dt, J=1.5, 0.7 Hz, 6H), 2.25 (dtd, J=13.9, 6.9, 5.6 Hz, 1H), 1.86 (ddt, J=14.0, 7.7, 6.3 Hz, 1H), 1.24 (d, J=6.8 Hz, 3H). $^{13}$C NMR (101 MHz, Chloroform-d) δ159.57, 159.55, 157.12, 157.09, 153.58, 153.55, 153.23, 153.20, 133.15, 133.12, 133.07, 133.04, 123.50, 123.41, 123.25, 123.17, 118.01, 117.94, 117.79, 117.72, 91.45, 91.35, 91.30, 91.21, 77.46, 77.45, 71.25, 71.23, 33.98, 31.22, 17.36. Multiplicities due to carbon fluorine couplings were not assigned.

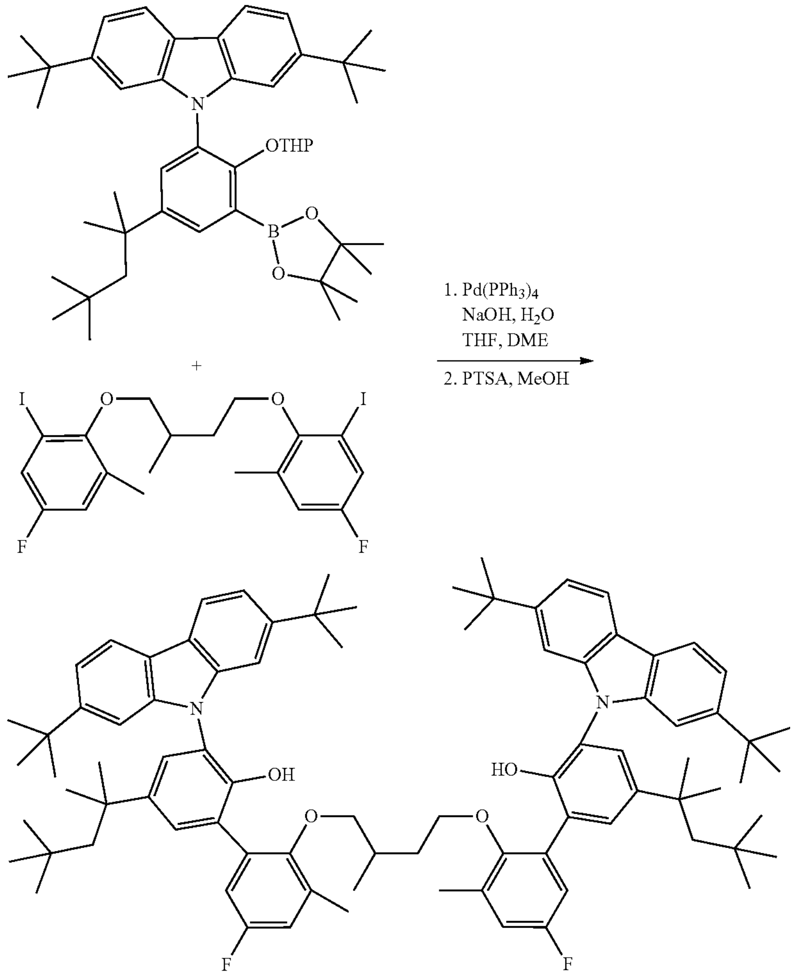

Synthesis of 2',2'''-((2-methylbutane-1,4-diyl)bis(oxy))bis(3-(2,7-di-tert-butyl-9H-carbazol-9-yl)-5'-fluoro-3'-methyl-5-(2,4,4-trimethylpentan-2-yl)-[1,1'-biphenyl]-2-ol): A three-necked round bottom flask equipped with a stir bar, septa, a condenser, and a nitrogen gas inlet was charged with 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazol-9-yl (5.86 g, 8.45 mmol, preparation published on US2015/0291713A1), 2,2'-((2-methylbutane-1,4-diyl)bis(oxy))bis(5-fluoro-1-iodo-3-methylbenzene) (2.30 g, 4.02 mmol), 1,2-dimethoxyethane (105 mL), tetrahydrofuran (36 mL) and a solution of sodium hydroxide (1.12 g, 27.98 mmol) in water (31 mL). The mixture was purged with nitrogen for 15 minutes, then tetrakis(triphenylphosphine)palladium(0) (0.36 g, 0.31 mmol) was added. The mixture was heated at 85 °C for 20 hours; a precipitation was formed. The reaction was allowed to cool to room temperature and was filtered. The solids were dissolved in dichloromethane and the solution was concentrated by rotary evaporation to afford a brownish-yellow crystalline solid. The solid was dissolved in a mixture of tetrahydrofuran (43 mL), methanol (43 mL), and chloroform (60 mL). The solution was heated to 60 °C and p-toluenesulfonic acid, monohydrate (0.16 g, 0.82 mmol) was added. The reaction was heated at 60 °C overnight and was allowed to cool to room temperature. The reaction was concentrated by rotary evaporation to afford crude a brown crystalline solid. The solid was recrystallized from acetonitrile, filtered and washed with cold acetonitrile (2×10 mL portions). The ligand was dissolved in dichloromethane and concentrated by rotary evaporation to afford a light brown crystalline solid. The solid was dried under high vacuum to afford 4.50 g (87.1%) of the product as a light brown crystalline solid. $^1$H NMR (400 MHz, Chloroform-d) δ8.00 (dt, J=8.3, 2.4 Hz, 4H), 7.46-7.39 (m, 4H), 7.34-7.25 (m, 4H), 7.09 (dt, J=3.7, 1.8 Hz, 4H), 7.00 (dt, J=8.9, 3.3 Hz, 2H), 6.86 (dd, J=8.8, 3.1 Hz, 2H), 6.30 (s, 2H), 3.54 (td, J=9.3, 4.2 Hz, 2H), 3.27 (d, J=5.9 Hz, 2H), 2.05 (s, 3H), 2.01 (s, 3H), 1.74 (s, 4H), 1.67 (m, 1H), 1.39 (d, J=2.8 Hz, 12H), 1.34-1.24 (m, 36H), 1.24-1.09 (m, 2H), 0.81 (s, 9H), 0.80 (s, 9H), 0.56 (d, J=6.6 Hz, 3H). $^{13}$C NMR (101 MHz, cdcl$_3$) δ160.07, 160.04, 157.65, 157.62, 150.02, 149.99, 149.96, 148.93, 148.90, 148.88, 148.86, 147.74, 147.70, 142.81, 141.62, 141.60, 133.60, 133.51, 133.03, 132.95, 129.01, 127.44, 127.39, 126.51, 126.49, 126.38, 126.36, 125.23, 125.19, 121.05, 121.01, 119.47, 117.68, 117.66, 117.63, 117.35, 117.22, 117.13, 116.99, 116.18, 116.12, 115.95, 115.89, 106.32, 79.01, 71.64, 57.18, 57.13, 38.25, 35.06, 33.34, 32.54, 32.51, 31.96, 31.91, 31.87, 31.79, 31.64, 30.40, 16.45, 16.40. Multiplicities due to carbon fluorine couplings were not assigned.

Reaction was set up in a glove box under nitrogen atmosphere. A jar was charged with zirconium tetrachloride (0.054 g, 0.23 mmol) and toluene (15 mL). The slurry mixture was cooled to −25 °C in the glove box freezer. To the stirring slurry cool mixture was added 3.0 M methylmagnesium bromide in diethyl ether (0.35 mL, 1.05 mmol). The mixture was stirred strongly for about 4 minutes. The solid went in solution and it turned light yellow. To the mixture was added the ligand (0.30 g, 0.23 mmol) as a solid. The resulting mixture was stirred at room temperature for 2 hours. To the mixture was then added hexane (15 mL) and filtered. The solution was concentrated under vacuum to afford 0.36 g of the product as an almost black color solid. To the solid was added hexanes (15 mL) and the mixture was stirred for 4 hours at room temperature. Black solids were observed. The mixture continued to stir for 2 days at room temperature. To the mixture was added toluene in 2 mL increments to dissolve most of the solid for a total of 16 mL of toluene. The mixture was filtered through a syringe filter and was concentrated under vacuum to afford 0.29 g of the product as a brown color solid. To the brown solid was added hexanes (10 mL) and the mixture was stirred overnight at room temperature. The mixture was filtered, the solids were placed in a glass vial, and was dried under high vacuum to afford 0.19 g (56.6%) of the product as an off white color solid. $^1$H-NMR of the product showed that it is a mixture of isomers.

$^1$H NMR (500 MHz, Benzene-$d_6$) δ8.19 (m, 5H), 8.12 (d, J=8.0 Hz, 5H), 7.95-7.82 (m, 11H), 7.79 (s, 4H), 7.53-7.45 (m, 6H), 7.43-7.32 (m, 10H), 6.99-6.86 (m, 6H), 6.09 (s, 5H), 4.03-3.91 (m, 3H), 3.49 (t, J=9.9 Hz, 1H), 3.36-3.20 (m, 7H), 1.89-1.61 (m, 6H), 1.57 (s, 13H), 1.53 (d, J=4.7 Hz, 41H), 1.27 (d, J=2.6 Hz, 34H), 1.25-1.15 (m, 32H), 1.05 (d, J=6.8 Hz, 6H), 1.00 (d, J=10.7 Hz, 9H), 0.90 (s, 22H), 0.84 (d, J=3.5 Hz, 32H), 0.44 (d, J=7.1 Hz, 6H), 0.17 (d, J=7.1 Hz, 3H), −0.36 (d, J=3.7 Hz, 8H), −0.46 (s, 5H), −0.54 (s, 3H). Isomers were not identified and integrations are not normalized per the ratio of protons.

(Structure xiii)

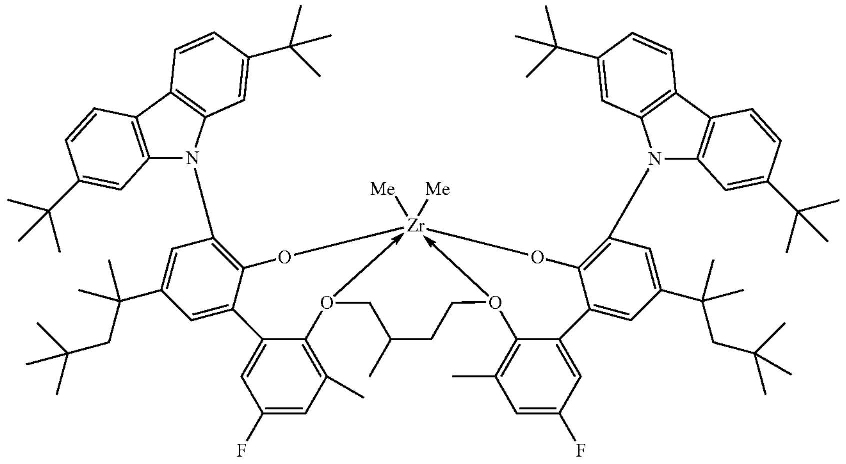

Biphenylphenol polymerization precatalyst of structure (xiv) was prepared as follows. Reaction was set up in a glove box under nitrogen atmosphere. A jar was charged with $ZrCl_4$ (0.0561 g, 0.241 mmol) and toluene (15 mL). The slurry mixture was cooled to −25 °C in the glove box freezer. To the stirring slurry cool mixture was added 3.0 M methylmagnesium bromide in diethyl ether (0.36 mL, 1.080 mmol). The mixture was stirred strongly for about 4 minutes. The solid went in solution and it turned yellow. To the mixture was added the ligand (0.3002 g, 0.239 mmol) as a solid. The resulting mixture was stirred at room temperature for 2 hours. To the mixture was then added hexane (15 mL) and filtered. The solution was concentrated under vacuum to afford 0.3793 g of the product as a yellow color solid. To the solid was added haxanes (10 mL) and toluene was added in 2 mL increments to dissolve most of the solid for a total of 8 mL of toluene. The brown cloudy solution was left to stir overnight. Then it was filtered through a syringe filter and was concentrated under vacuum to afford 0.3345 g of the product as a brown color solid. To remove excess toluene, hexanes (10 mL) was added to the solid, the mixture was stirred vigorously for 1 hour, and was placed under vacuum to afford 0.2985 g (90.81%) of the product as a brown color solid.

$^1$H NMR (400 MHz, Benzene-$d_6$) δ8.56 (d, J=1.9 Hz, 2H), 8.38 (d, J=1.9 Hz, 2H), 7.95 (d, J=8.6 Hz, 2H), 7.90 (d, J=2.5 Hz, 2H), 7.79 (d, J=8.8 Hz, 2H), 7.76 (dd, J=8.6, 1.9 Hz, 2H), 7.46 (dd, J=8.8, 1.9 Hz, 2H), 7.29 (d, J=2.5 Hz, 2H), 6.83 (dd, J=8.9, 3.2 Hz, 2H), 6.15 (dd, J=8.2, 3.2 Hz, 2H), 3.47 (dt, J=9.8, 4.7 Hz, 2H), 3.24 (dt, J=10.5, 5.4 Hz, 2H), 2.11 (s, 3H), 1.58 (m with a s, 24H), 1.33 (s, 18H), 1.26 (s, 7H), 1.23 (s, 7H), 1.19 (s, 6H), 0.84 (s, 18H), −0.50 (s, 6H).

(Structure xiv)

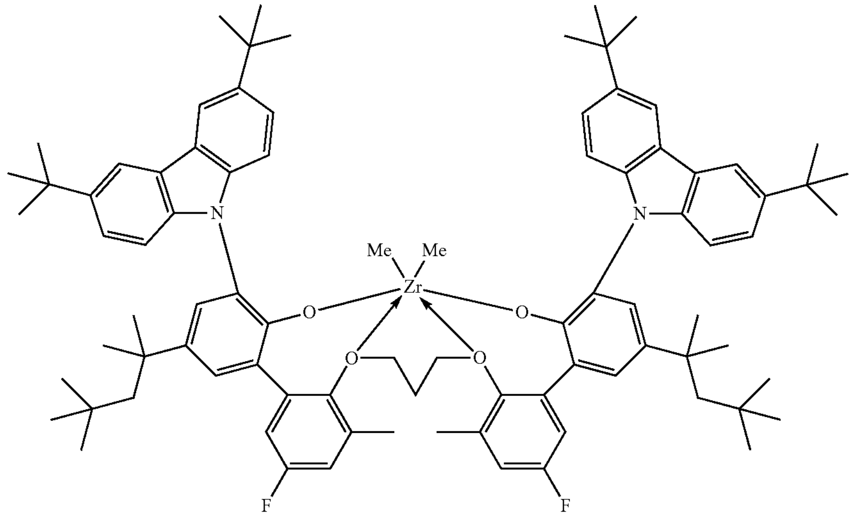

Biphenylphenol polymerization precatalyst of structure (xv) was prepared as follows.

Reaction was set up in a glove box under nitrogen atmosphere. A jar was charged with $ZrCl_4$ (0.0563 g, 0.242 mmol) and toluene (15 mL). The slurry mixture was cooled to −25 °C in the glove box freezer. To the stirring slurry cool mixture was added 3.0 M methylmagnesium bromide in diethyl ether (0.36 mL, 1.080 mmol). The mixture was stirred strongly for about 5 minutes. The solid went in solution and it turned brown. To the mixture was added the ligand (0.3008 g, 0.242 mmol) as a solid. The resulting mixture was stirred at room temperature for 2 hours. To the mixture was then added hexane (15 mL) and filtered. The pale brown solution was concentrated under vacuum to afford 0.3548 g of the product as a brown solid. To the solid was added hexanes (10 ml) and toluene (2.5 mL). The gray cloudy solution was filtered and concentrated under high vacuum to afford 0.1860 g (56.53%) of the product as a white solid.

$^1$H NMR (400 MHz, Benzene-$d_6$) δ8.53 (dd, J=1.9, 0.7 Hz, 2H), 8.35 (dd, J=1.9, 0.7 Hz, 2H), 7.66-7.56 (m, 8H), 7.41 (d, J=1.9 Hz, 1H), 7.39 (d, J=1.9 Hz, 1H), 7.22 (d, J=2.5 Hz, 2H), 6.89 (dd, J=9.0, 3.1 Hz, 2H), 6.57 (ddd, J=9.0, 7.3, 3.2 Hz, 2H), 4.93 (dd, J=9.0, 4.8 Hz, 2H), 4.05 (t, J=9.9 Hz, 2H), 3.44 (d, J=12.3 Hz, 2H), 1.56 (s, 4H), 1.42 (s, 18H), 1.24 (s, 18H), 1.20 (s, 6H), 1.15 (s, 6H), 0.81-091 (m, 4H), 0.77 (s, 18H), −0.83 (s, 6H).

(Structure xv)

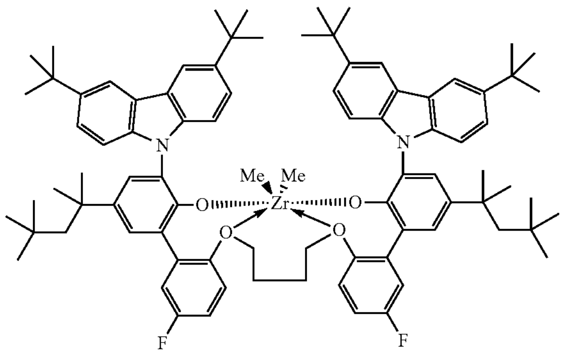

Comparative polymerization catalysts (other than those made from polymerization precatalyst of Formula (I)) were prepared as follows.

Comparative polymerization precatalyst of structure (xxi) can be prepared as described in US patent application number 2018/0298128 (A1) and the entire contents of US patent application number 2018/0298128 (A1) are incorporated herein by reference.

(Structure xxi)

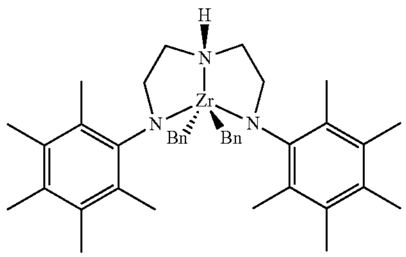

In various embodiments, the biphenylphenol polymerization catalysts made from the precatalysts of structures (i), (ii), (iii), (iv), (v), (vi), (vii), (viii), (ix), (x), (xi), (xii), (xiii), (xiv), and/or (xv) can be employed to make a polymer.

Example 1 (EX1), an activated and supported biphenylphenol polymerization catalyst of Formula I, was prepared as follows.

General procedure for catalyst preparation—supporting reaction of precatalyst onto SMAO: All work is performed in a nitrogen purge box on Core Module 3 (CM3) high throughput unit. Prior to starting the experiment, pre-catalyst stock solutions were prepared to the desired concentration in toluene. To each reaction vial, the desired amount of SMAO was manually weighed to reach 45 μmol catalyst per 1 g SMAO (about 1:108 equivalent ratio) and added along with the tumble stir disc. Toluene was dispensed by the CM3, followed by the desired amount of pre-catalyst stock solution. Certain pre-catalyst stock solutions were delivered by hand, due to the limited volume of solution available. After adding all the reaction components, the vials were capped, stirred to 300 rpm and heated to 50 °C. After 30 minutes, the vials were cooled to room temperature, caps removed and the reaction plate placed in a CM3 vortexing deck position. Reaction vials were allowed to mix with vortexing at 800 rpm for 3 minutes, allowing homogeneous slurry to form. The desired amount of each supported catalyst slurry was then daughtered in into 8 mL vials and diluted with Isopar E™ (an isoparaffin solvent including a mixture of $C_8$ saturated hydrocarbons). When multiple daughter samples were required, a new PDT tip was utilized for each subsequent daughtering step. Reactions were daughter to the desired concentration for the PPR.

Example 2 (EX2) was prepared the same as Example 1 with the change that the activated and supported biphenylphenol polymerization catalyst of Example 2 was utilized, as indicated in Table 1.

Example 3 (EX3), was prepared the same as Example 1 with the change that the activated and supported biphenylphenol polymerization catalyst of Example 3 was utilized, as indicated in Table 1.

Example 4 (EX4), was prepared the same as Example 1 with the change that the activated and supported biphenylphenol polymerization catalyst of Example 4 was utilized, as indicated in Table 1.

Example 5 (EX5), was prepared the same as Example 1 with the change that the activated and supported biphenylphenol polymerization catalyst of Example 5 was utilized, as indicated in Table 1.

Example 6 (EX6), was prepared the same as Example 1 with the change that the activated and supported biphenylphenol polymerization catalyst of Example 6 was utilized, as indicated in Table 1.

Example 7 (EX7), was prepared the same as Example 1 with the change that the activated and supported biphenylphenol polymerization catalyst of Example 7 was utilized, as indicated in Table 1.

Example 8 (EX8), was prepared the same as Example 1 with the change that the activated and supported biphenylphenol polymerization catalyst of Example 8 was utilized, as indicated in Table 1.

Example 9 (EX9), was prepared the same as Example 1 with the change that the activated and supported biphenylphenol polymerization catalyst of Example 9 was utilized, as indicated in Table 1.

Example 10 (EX10), was prepared the same as Example 1 with the change that the activated and supported biphenylphenol polymerization catalyst of Example 10 was utilized, as indicated in Table 1.

Example 11 (EX11), was prepared the same as Example 1 with the change that the activated and supported biphenylphenol polymerization catalyst of Example 11 was utilized, as indicated in Table 1.

Example 12 (EX12), was prepared the same as Example 1 with the change that the activated and supported biphenylphenol polymerization catalyst of Example 12 was utilized, as indicated in Table 1.

Example 13 (EX13), was prepared the same as Example 1 with the change that the activated and supported biphenylphenol polymerization catalyst of Example 13 was utilized, as indicated in Table 1.

Example 14 (EX14), was prepared the same as Example 1 with the change that the activated and supported biphenylphenol polymerization catalyst of Example 14 was utilized, as indicated in Table 1.

Example 15 (EX15), was prepared the same as Example 20 with the change that the activated and supported biphenylphenol polymerization catalyst of Example 15 was prepared at the conditions as indicated in Table 1.

Example 16 (EX16), was prepared the same as Example 1 with the change that the activated and supported biphenylphenol polymerization catalyst of Example 16 was utilized, as indicated in Table 1.

Comparative Example 1 (CE1), was prepared the same as Example 1 with the change that the catalyst of Comparative Example 1 was utilized, as indicated in Table 1.

Ethylene/1-hexene copolymerizations of each of the individual catalysts of EX1-16 and CE1 were conducted in the slurry-phase as follows.

General Parallel Pressure Reactor (PPR) procedure for slurry-phase polymerization: All and PPR solutions were prepared in an inert atmosphere glove box under nitrogen. Isopar E™, ethylene, and hydrogen was purified by passage through 2 columns, the first containing A2 alumina and the second containing Q5 reactant. The 48 PPR-A reactor cells were prepared the weekday prior to the actual PPR run as follows: A tared library of glass tubes were manually inserted into the reactor wells, the stirrer paddles attached to the module heads, and the module heads attached to the module bodies. The reactors were heated to 150 °C, purged with nitrogen for 10 hours, and cooled to 50 °C. On the day of the experiment, the reactors were purged twice with ethylene and vented completely to purge the lines. The reactors were then heated to 50 °C and the stirrers turned on at 400 rpm. The reactors were filled to the appropriate solvent level with Isopar-E™ using the robotic needle to give a final reaction volume of 5 mL. The solvent injections to modules 1-3 were performed using the left robotic arm and the solvent injections to modules 4-6 used the right robotic arm with both arms operating simultaneously. Following solvent injection, the reactors were heated to final desired temperature and stirring increased to the set points programmed in the Library Studio design. When the reactors reached the temperature set point, which required about 10-30 minutes depending on the desired temperature, the cells were pressurized to the desired set point with either pure ethylene or a mixture of ethylene and hydrogen from the gas accumulator and the solvent saturated (as observed by the gas uptake). If an ethylene-hydrogen mixture was used, once the solvent was saturated in all cells, the gas feed line was switched from the ethylene-hydrogen mixture to pure ethylene for the remainder of the run. The robotic synthesis protocol was then initiated whereby the comonomer solution (1-hexene) was injected first, followed by the scavenger solution (SMAO), and finally the biphenylphenol polymerization catalyst solutions in Isopar-E™. All of the injections to modules 1-3 were performed using the left robotic arm and the injections to modules 4-6 used the right robotic arm with both arms operating simultaneously. All three injections for a given cell completed before the robot started the injection of the next cell in the sequence. Each reagent addition was chased with 500 µl of Isopar-E™ solvent to ensure the complete injection of the reagent. After each reagent addition, the needles were washed with Isopar-E™ inside and outside the needle. At the moment of the biphenylphenol polymerization catalyst injection in each individual cell, the reaction timer was started. The polymerization reactions proceeded for 60-180 minutes or to the set ethylene uptake of 60-180 psi, whichever occurred first, and then were quenched by adding a 40 psi overpressure of 10% (v/v) CO2 in argon. Data collection continued for 5 minutes after the quench of each cell. The reactors were cooled down to 50 °C, vented, and the PPR tubes removed from the module blocks. The PPR library was removed from the drybox and the volatiles then removed using the Genevac rotary evaporator. Once the library vials were re-weighed to obtain the yields, the library was submitted for analytical.

The runs were conducted at Condition B or K as detailed below in Table 1. The results for EX1-16 and CE1 are shown in Tables 1 and 2.

In various embodiments the biphenylphenol polymerization catalysts made from the precatalyst of structure (i), (ii), (iii), (iv), (v), (vi), (vii), (viii), (ix), (x), (xi), (xii), (xiii), (xiv), and (xv) can be employed in the polymerization catalyst system s herein to make a high molecular weight polyethylene component in a multimodal (e.g., bimodal) polyethylene composition.

Mn (number average molecular weight) and Mw (weight average molecular weight), z-average molecular weight (Mz) were determined by gel permeation chromatography (GPC), as is known in the art.

Comonomer content (i.e., 1-hexene) incorporated in the polymers (weight %)) was determined by rapid FT-IR spectroscopy on the dissolved polymer in a GPC measurement.

Productivity (kilograms polymer/kilograms catalyst) was determined as the ratio of polymer made to the amount of catalyst and activator added to the reactor.

Melt temperature (i.e., Tm) can be determined via Differential Scanning calorimetry according to ASTM D 3418-08. For instance, using a scan rate of 10 °C/min on a sample of 10 mg and using the second heating cycle.

B-conditions as follows: Temperature=100 °C; Ethylene=100 pounds per square inch (psi); $H_2/C_2$=0.0017; $C_6/C_2$=0.4.

K-conditions are as follows: Temperature=100 °C; Ethylene=100 psi; $H_2/C_2$=0.0068; $C_6/C_2$=0.4.

TABLE 1

| | Precatalyst Structures | Conditions | Catalyst Charge (mg or umol) |
|---|---|---|---|
| EX1 | (i) | B | 0.0155 umol |
| EX2 | (ii) | B | 0.0062 umol |
| EX3 | (iii) | B | 0.0155 umol |
| EX4 | (iv) | B | 0.0155 umol |
| EX5 | (v) | B | 0.0062 umol |
| EX6 | (vi) | B | 0.0155 umol |
| EX7 | (vii) | B | 0.0062 umol |
| EX8 | (viii) | B | 0.0155 umol |
| EX9 | (ix) | B | 0.0194 umol |
| EX10 | (x) | B | 0.0047 umol |
| EX11 | (xi) | B | 0.0465 umol |
| EX12 | (xii) | B | 0.0194 umol |
| EX13 | (xiii) | B | 0.0062 umol |
| EX14 | (xiv) | B | 0.0046 umol |

TABLE 1-continued

| | Precatalyst Structures | Conditions | Catalyst Charge (mg or umol) |
|---|---|---|---|
| EX15 | (xiv) | K | 0.0046 umol |
| EX16 | (xv) | B | 0.0062 umol |
| CE1 | (xxi) | B | 13.9 mg |

TABLE 2

| | Precatalyst Structure | Mn (da) | Mw (da) | Mw/Mn | Tm (°C) |
|---|---|---|---|---|---|
| EX1 | (i) | 83,500 | 454,500 | 5.5 | 131.5 |
| EX2 | (ii) | 42,800 | 149,200 | 3.5 | 133.3 |
| EX3 | (iii) | 40,300 | 289,500 | 7.5 | 126.8 |
| EX4 | (iv) | 36,700 | 222,500 | 6.4 | 124.8 |
| EX5 | (v) | 108,800 | 488,800 | 5.0 | 127.3 |
| EX6 | (vi) | 42,400 | 263,900 | 6.3 | 129.3 |
| EX7 | (vii) | 92,000 | 287,300 | 6.0 | 131.0 |
| EX8 | (viii) | 21,200 | 414,400 | 20.8 | 130.0 |
| EX9 | (ix) | 41,000 | 199,000 | 4.8 | ** |
| EX10 | (x) | 102,600 | 360,100 | 3.6 | 113.1 |
| EX11 | (xi) | 72,500 | 275,500 | 3.8 | 120.0 |
| EX12 | (xii) | 28,300 | 184,900 | 6.5 | 124.5 |
| EX13 | (xiii) | 27,500 | 234,000 | 14.1 | ** |
| EX14 | (xiv) | 111,300 | 457,400 | 4.3 | 133.0 |
| EX15 | (xiv) | 58,500 | 331,400 | 5.8 | 134.0 |
| EX16 | (xv) | 72,300 | 215,900 | 3.0 | 101.8 |
| CE1 | (xxi) | 107,095 | 788,704 | 7.36 | 131.18 |

As detailed in Tables 1 and 2, EX1-16 provide for the use of a supported biphenylphenol polymerization catalyst to make a polymer via a slurry-phase polymerization process, where the supported biphenylphenol polymerization catalyst is made from a biphenylphenol polymerization precatalyst of Formula I. Notably, each of EX1-16 provide a polymer having a molecular weight (e.g., a molecular weight in a range of from about 150,000 Daltons to about 800,000 Daltons at B-conditions and/or less than about 500,000 at K-conditions), which may be desirable for certain applications. For instance, each of EX1-16 provide a polymer that is made at conditions which are also suitable for use with a metallocene olefin polymerization catalyst. That is, each of the supported biphenylphenol polymerization catalyst of EX1-16 can be employed with a metallocene olefin polymerization catalyst to make a polymerization catalyst system which can be used in a single slurry-phase polymerization reactor to make a multimodal (e.g., bimodal) polymer.

The supported biphenylphenol polymerization catalyst of Formula I can be used to make a polymer via a slurry-phase polymerization process that has an improved comonomer incorporation relative to an amount of comonomer incorporation in a polymer made via solution-phase polymerization process using a biphenylphenol polymerization catalyst of Formula I (e.g., the same supported biphenylphenol polymerization catalyst of Formula I). The supported biphenylphenol polymerization catalyst of Formula I can be used to make a polymer via a slurry-phase polymerization process that has an improved comonomer incorporation relative to an amount of comonomer incorporation in a polymer made from a comparative catalyst under similar slurry-phase conditions.

What is claimed is:

1. A method of making a polymer, comprising:

polymerizing an olefin monomer in a slurry-phase polymerization reactor in the presence of a supported biphenylphenol polymerization catalyst, wherein the supported biphenylphenol polymerization catalyst is made from a biphenylphenol polymerization precatalyst of Formula I:

(Formula I)

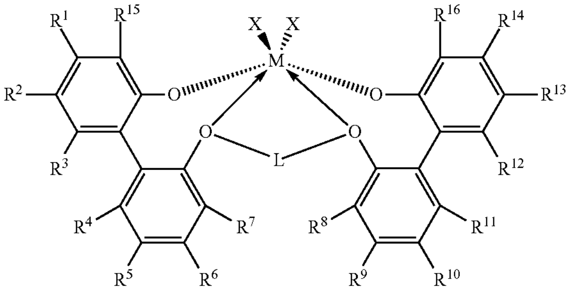

wherein each of $R^5$, $R^7$, $R^8$, and $R^{10}$ independently is a ($C_1$ to $C_{20}$) alkyl, aryl, aralkyl, halogen, or a hydrogen;

wherein each of $R^4$ and $R^{11}$ independently is a halogen or a hydrogen;

wherein each of $R^2$ and $R^{13}$ independently is a ($C_1$ to $C_{20}$) alkyl, aryl or aralkyl or a hydrogen;

wherein each of $R^{15}$ and $R^{16}$ independently is a 2,7-disubstituted carbazol-9-yl or a 3,6-disubstituted carbazol-9-yl;

wherein L is a $C_3$ alkylene or $C_4$ alkylene that forms a bridge between the two oxygen atoms to which L is covalently bonded;

wherein each of $R^1$, $R^3$, $R^{12}$, and $R^{14}$ independently is a ($C_1$-$C_8$) alkyl, halogen, or a hydrogen;

wherein each of $R^6$ and $R^9$ is a hydrogen, ($C_1$-$C_8$) alkyl, or halogen, optionally, $R^6$ can be linked with $R^7$ and $R^8$ can be linked to $R^9$ to form a cyclic structure;

wherein each X independently is a halogen, a hydrogen, a ($C_1$-$C_{20}$) alkyl, a ($C_7$-$C_{20}$) aralkyl, a ($C_1$-$C_6$) alkyl-substituted ($C_6$-$C_{12}$) aryl, or a ($C_1$-$C_6$) alkyl-substituted benzyl, $—CH_2Si(R^C)_3$, where $R^C$ is ($C_1$-$C_{12}$) hydrocarbon;

wherein M is Zr or Hf; and wherein the polymer formed at B-conditions ($H_2$/$C_2$=0.0017 and $C_6$/$C_2$=0.4 at 100 °C and 100 pounds per square inch (psi) ethylene) has a molecular weight (Mw) in a range of from about 150,000 Daltons to about 800,000 Daltons.

2. The method of claim 1, wherein the biphenylphenol polymerization precatalyst of Formula I is selected from a group consisting of the structures of (i), (ii), (iii), (iv), (v), (vi), (vii), (viii), (ix), (x), (xi), (xii), (xiii), (xiv), and (xv).

(i)

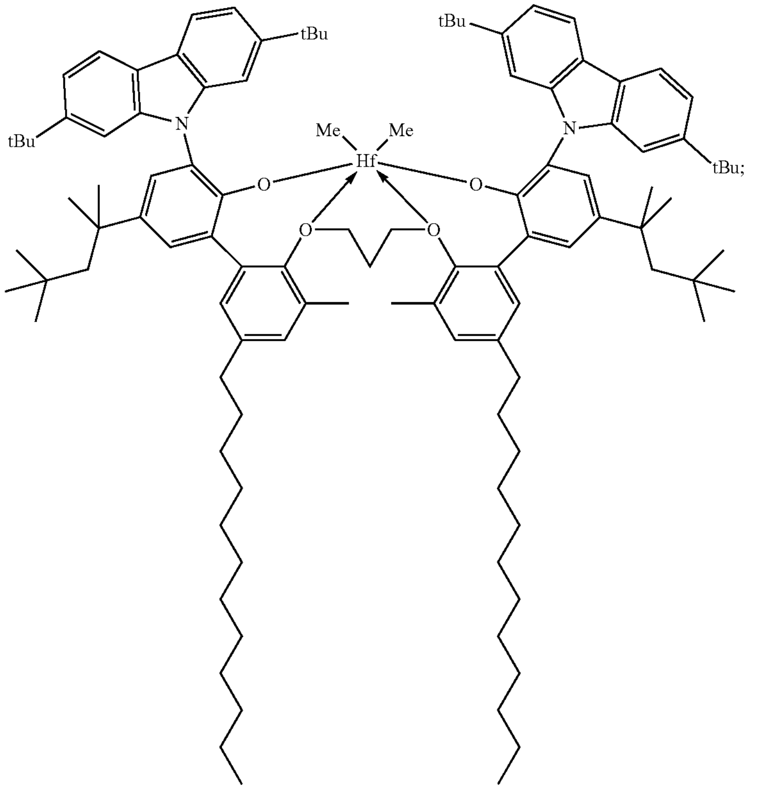

-continued
(ii)
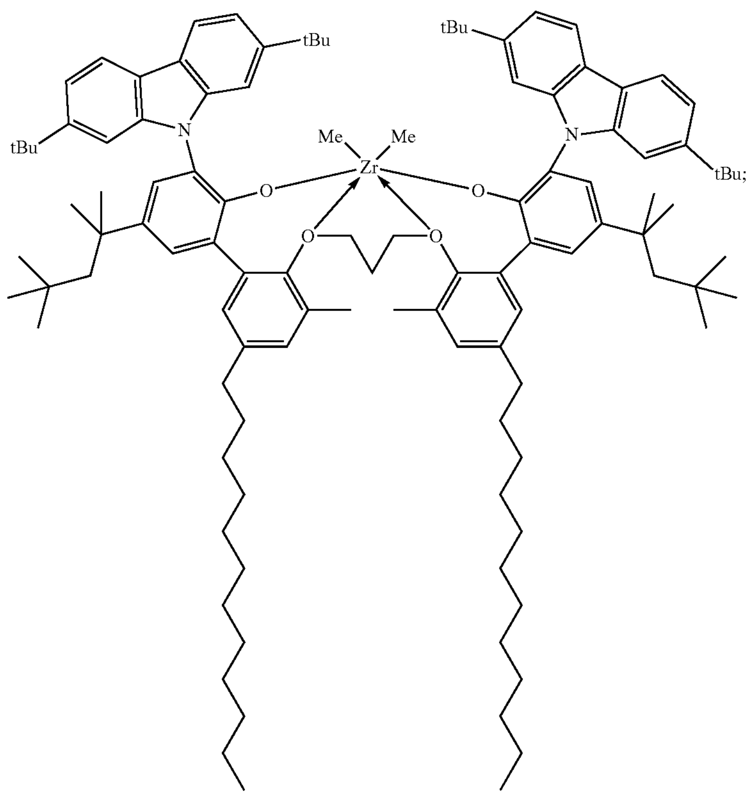
(iii)
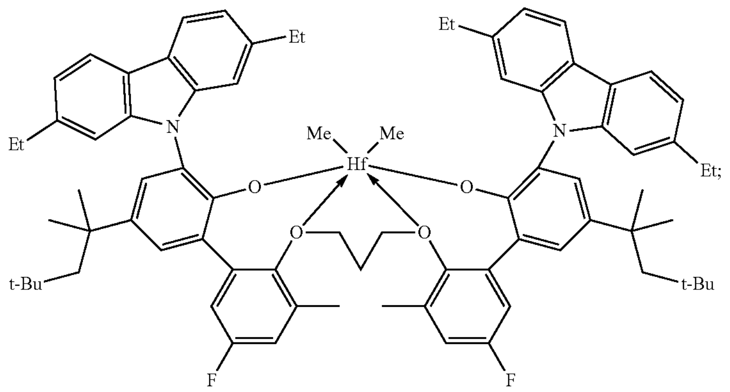
(iv)
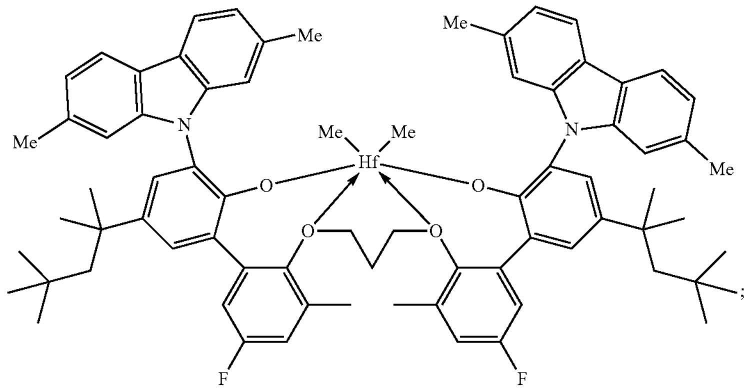

-continued
(v)
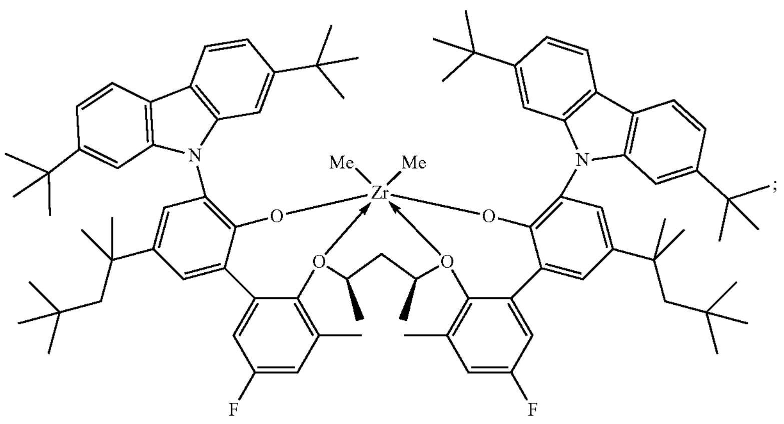
(vi)
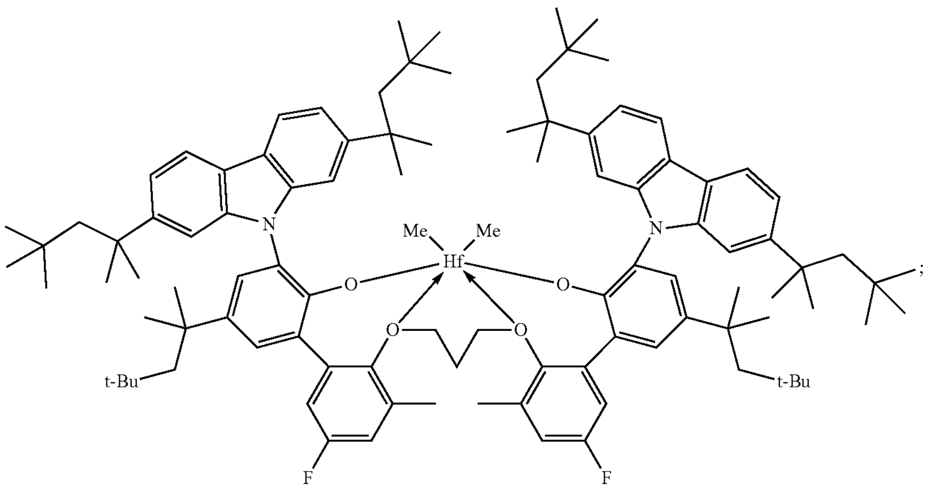
(vii)
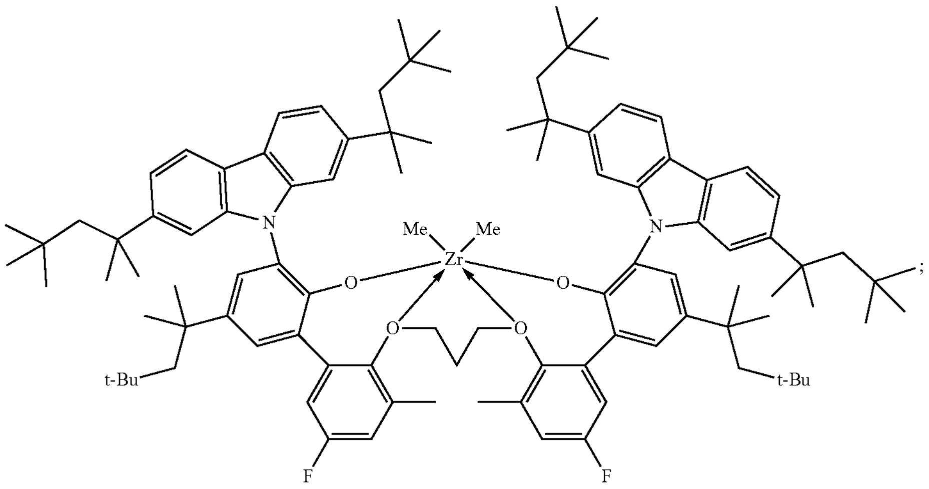

-continued
(viii)
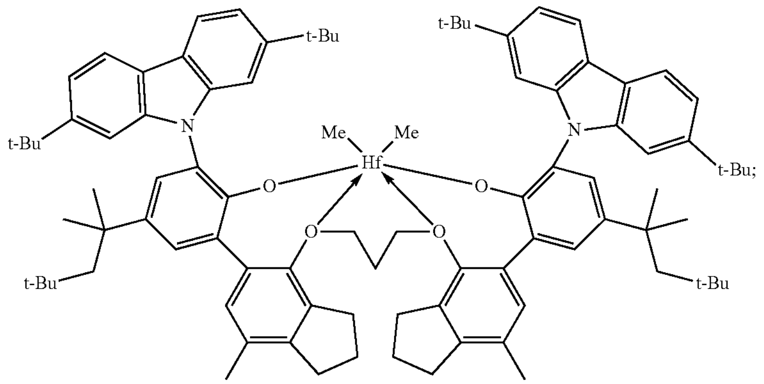
(ix)
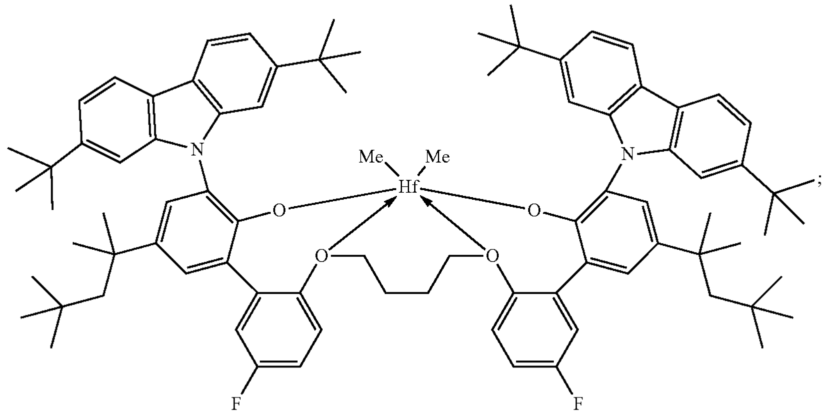
(x)
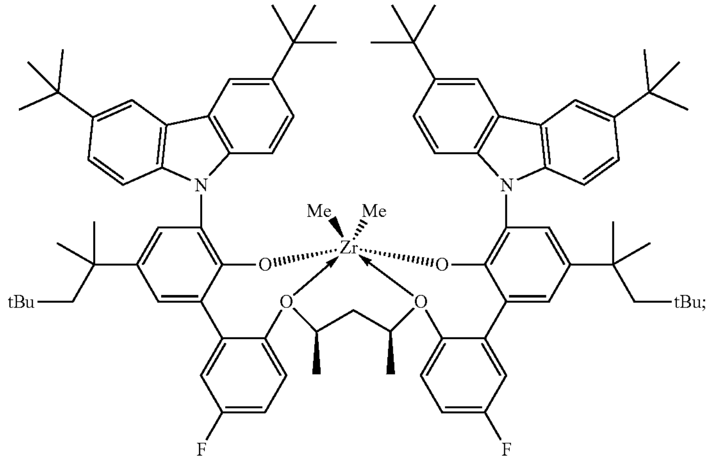

-continued
(xi)
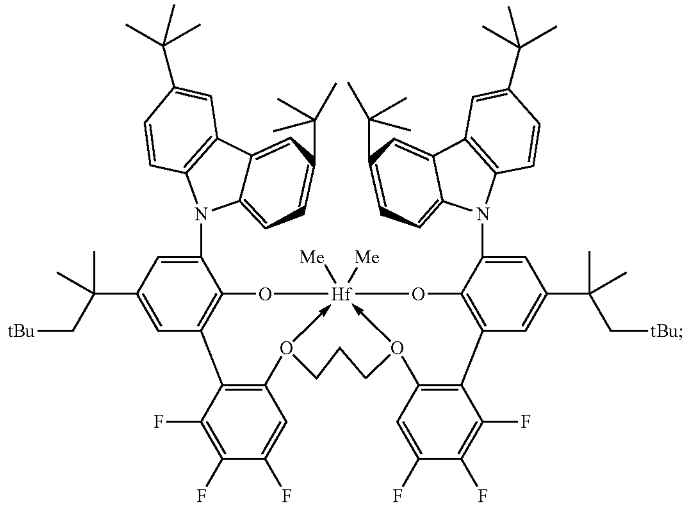
(xii)
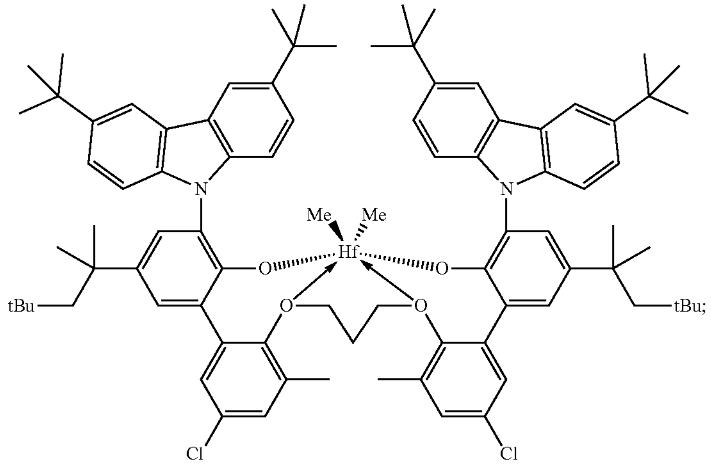
(xiii)
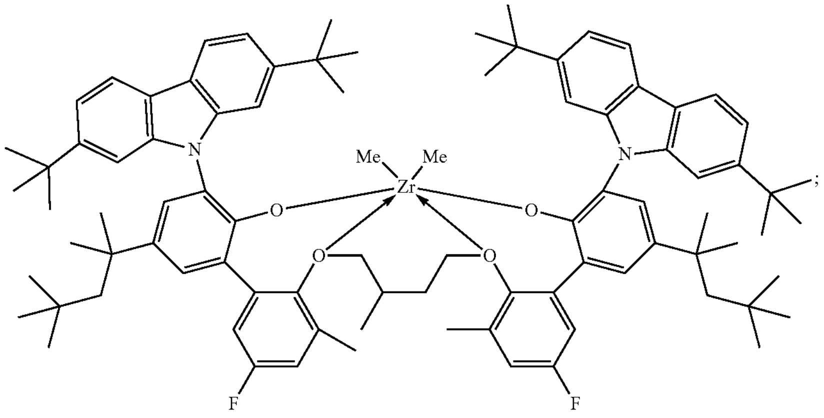

-continued (xiv)

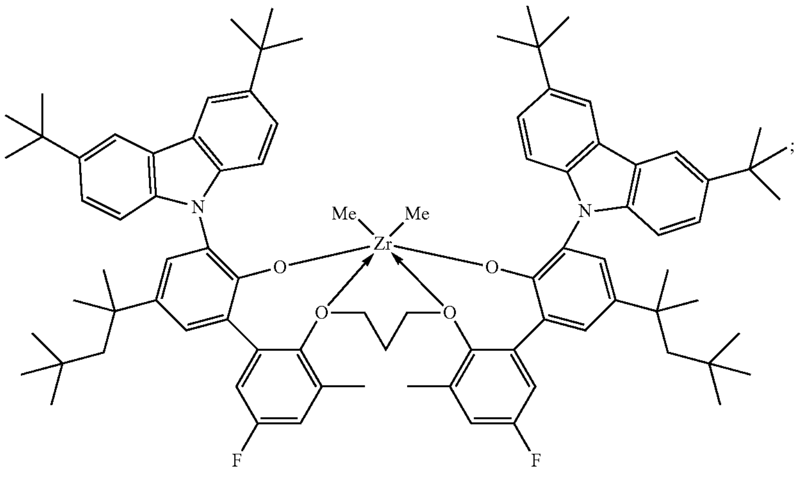

; and (xv)

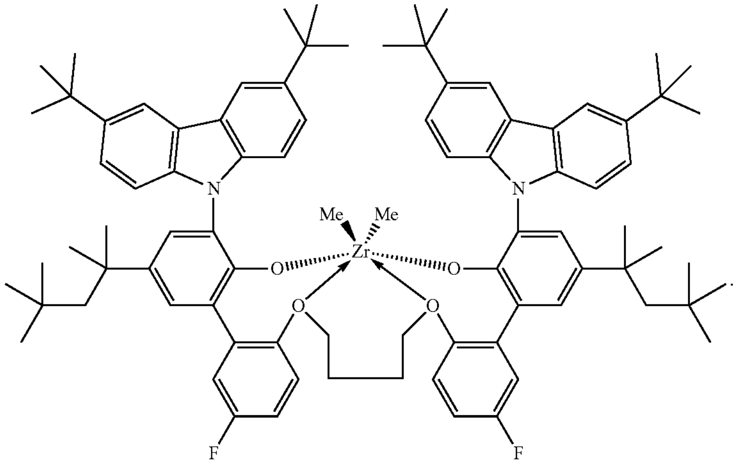

3. A method of making a polymer, comprising:

polymerizing an olefin monomer in a slurry-phase polymerization reactor in the presence of a supported biphenylphenol polymerization catalyst, wherein the supported biphenylphenol polymerization catalyst is made from a biphenylphenol polymerization precatalyst of Formula I:

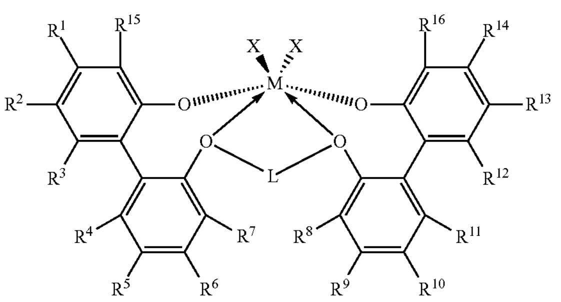

wherein each of $R^5$, $R^7$, $R^8$, and $R^{10}$ independently is a ($C_1$ to $C_{20}$) alkyl, aryl, aralkyl, halogen, or a hydrogen;

wherein each of $R^4$ and $R^{11}$ independently is a halogen or a hydrogen;

wherein each of $R^2$ and $R^{13}$ independently is a ($C_1$ to $C_{20}$) alkyl, aryl or aralkyl or a hydrogen;

wherein each of $R^{15}$ and $R^{16}$ independently is a 2,7-disubstituted carbazol-9-yl or a 3,6-disubstituted carbazol-9-yl;

wherein L is a $C_3$ alkylene or $C_4$ alkylene that forms a bridge between the two oxygen atoms to which L is covalently bonded;

wherein each of $R^1$, $R^3$, $R^{12}$, and $R^{14}$ independently is a ($C_1$-$C_8$) alkyl, halogen, or a hydrogen;

wherein each of $R^6$ and $R^9$ is a hydrogen, ($C_1$-$C_8$) alkyl, or halogen, optionally, $R^6$ can be linked with $R^7$ and $R^8$ can be linked to $R^9$ to form a cyclic structure;

wherein each X independently is a halogen, a hydrogen, a ($C_1$-$C_{20}$) alkyl, a ($C_7$-$C_{20}$) aralkyl, a ($C_1$-$C_6$) alkyl-substituted ($C_6$-$C_{12}$) aryl, or a ($C_1$-$C_6$) alkyl-substituted benzyl, $-CH_2Si(R^C)_3$, where $R^C$ is ($C_1$-$C_{12}$) hydrocarbon;

wherein M is Zr or Hf; and wherein the polymer formed at K-conditions ($H_2$/$C_2$=0.0068 and $C_6$/$C_2$=0.4 at 100 °C and 100 psi) has a molecular weight (Mw) of less than about 500,000 Daltons.

4. The method of claim 3, wherein the biphenylphenol polymerization precatalyst of Formula I is selected from a group consisting of the structures of (i), (ii), (iii), (iv), (v), (vi), (vii), (viii), (ix), (x), (xi), (xii), (xiii), (xiv), and (xv).
(i)
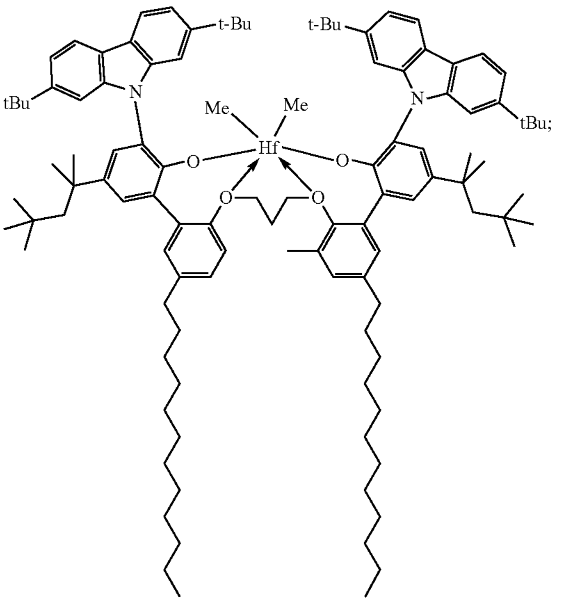
(ii)
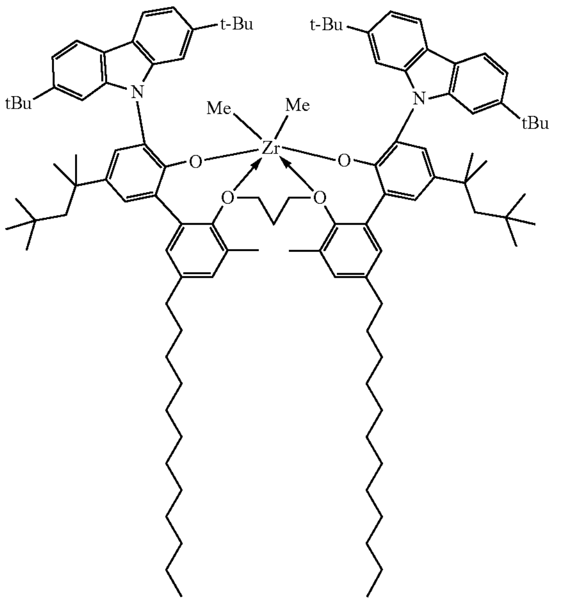
(iii)
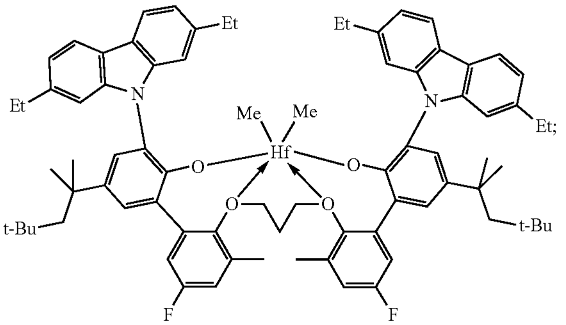
(iv)
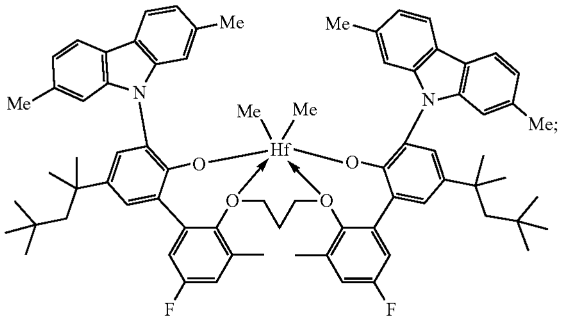
(v)
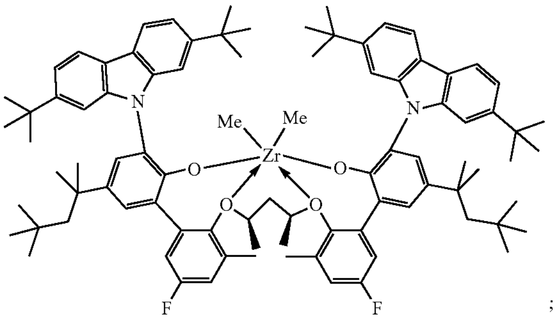
;

-continued
(vi)
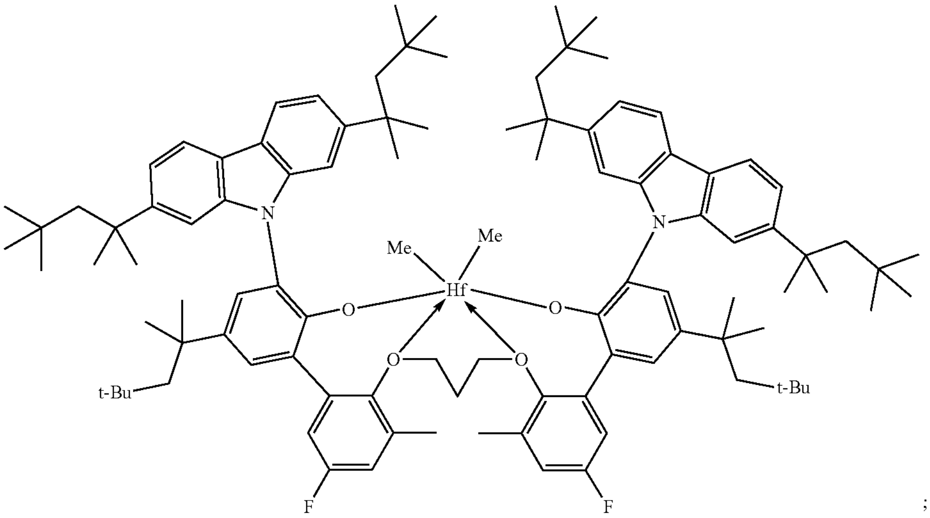
;
(vii)
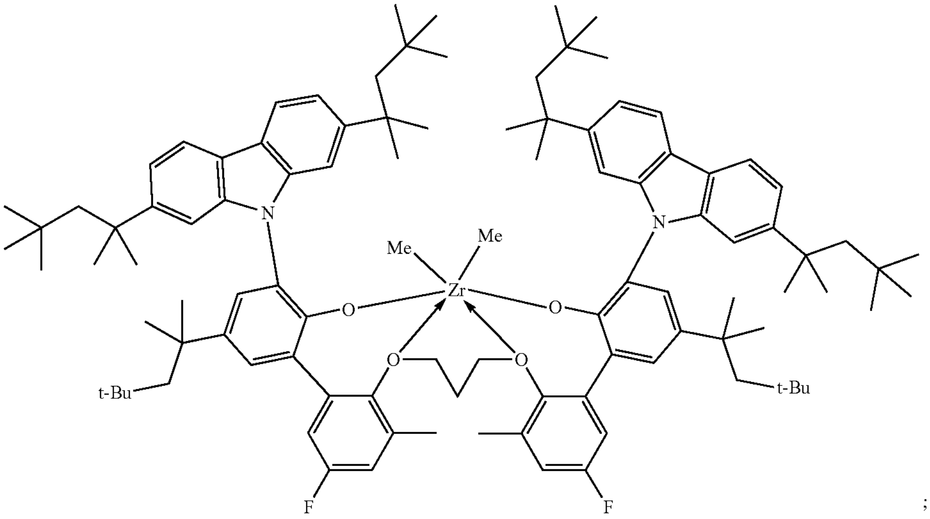
;
(viii)
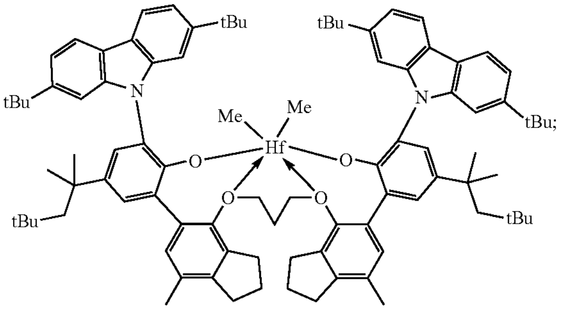
(ix)
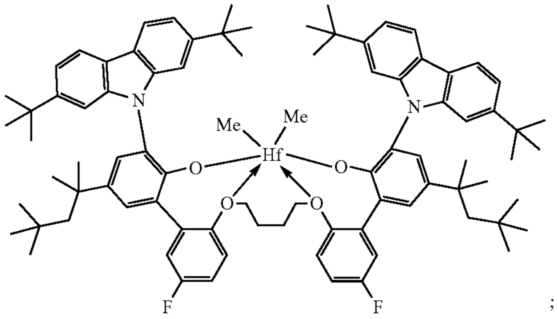
;

-continued
(x)
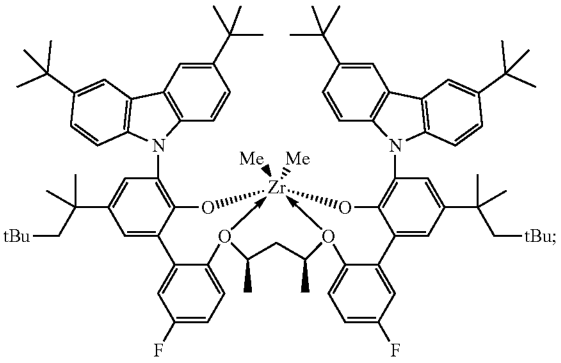
(xi)
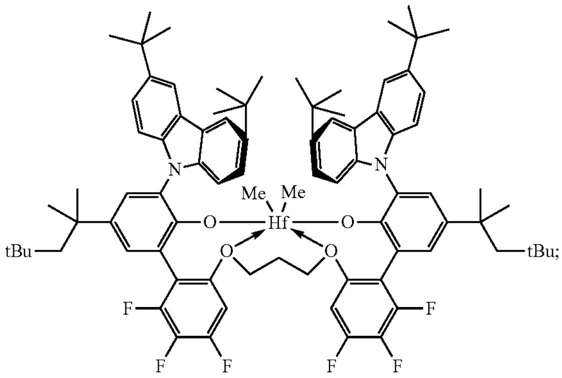
(xii)
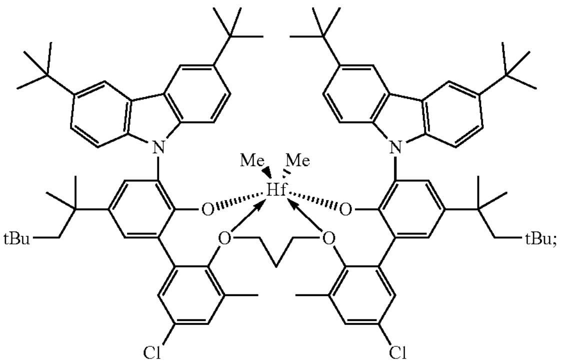
(xiii)
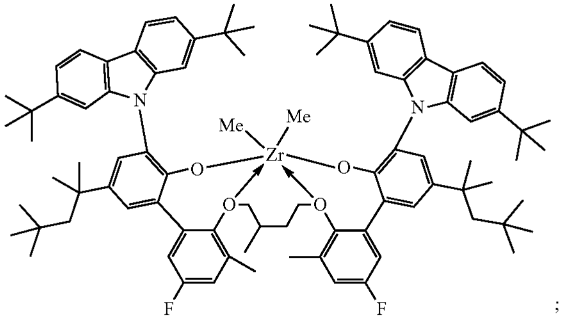
;
(xiv)
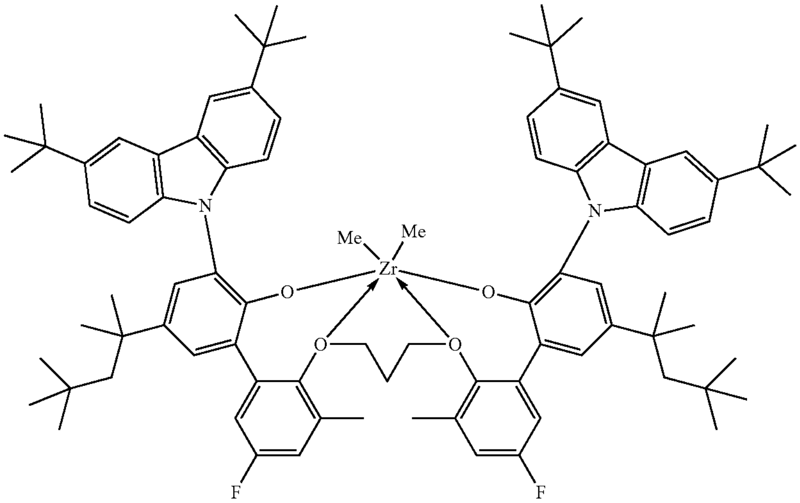
; and -continued
(xv)
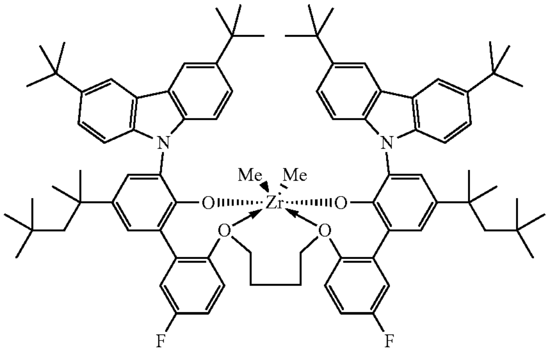
.
* * * * *